US012700977B2

(12) United States Patent
Rahman et al.

(10) Patent No.: US 12,700,977 B2
(45) Date of Patent: Aug. 4, 2026

(54) METHOD AND APPARATUS FOR CSI REPORTING BASED ON A WINDOW OF BASIS VECTORS

(71) Applicant: Samsung Electronics Co., Ltd., Suwon-si (KR)

(72) Inventors: Md. Saifur Rahman, Plano, TX (US); Eko Onggosanusi, Coppell, TX (US); Gilwon Lee, McKinney, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 275 days.

(21) Appl. No.: 18/453,935

(22) Filed: Aug. 22, 2023

(65) Prior Publication Data

US 2024/0121065 A1      Apr. 11, 2024

Related U.S. Application Data

(60) Provisional application No. 63/471,686, filed on Jun. 7, 2023, provisional application No. 63/441,350, filed
(Continued)

(51) Int. Cl.
| | |
|---|---|
| *H04B 7/024* | (2017.01) |
| *H04B 7/06* | (2006.01) |
| *H04L 5/00* | (2006.01) |

(52) U.S. Cl.
CPC ......... *H04L 5/0057* (2013.01); *H04B 7/0626* (2013.01); *H04B 7/0639* (2013.01)

(58) Field of Classification Search
CPC ..... H04L 5/0057; H04L 5/005; H04L 5/0094; H04L 27/261; H04B 7/0626;
(Continued)

(56) References Cited

U.S. PATENT DOCUMENTS

| | | | |
|---|---|---|---|
| 2018/0183503 A1* | 6/2018 | Rahman ............... | H04B 7/0645 |
| 2022/0006494 A1 | 1/2022 | Rahman et al. | |

(Continued)

FOREIGN PATENT DOCUMENTS

WO          2022086309 A1      4/2022

OTHER PUBLICATIONS

Yin, Haifan, and David Gesbert. "A partial channel reciprocity-based codebook for wideband FDD massive MIMO." IEEE Transactions on Wireless Communications 21.9 (2022): 7696-7710. (Year: 2021).*

(Continued)

*Primary Examiner* — Christopher M Crutchfield
*Assistant Examiner* — Syed Ahmed

(57) ABSTRACT

Method and apparatuses for channel state information (CSI) reporting based on a window of basis vectors are provided. A method includes receiving a configuration about a CSI report including information about $N_{TRP}$ non-zero power (NZP) CSI-reference signal (RS) resources, where $N_{TRP} \geq 1$, and a parameter codebookType set to type-II-CJT-r18 or type-II-PortSelection-CJT-r18. The method further includes determining, for each layer l=1, . . . , v, an indicator for indicating an index of a strongest coefficient among $$K_l^{NZ}$$

coefficients, where $$K_l^{NZ}$$

(Continued)

1700

Receive a configuration about a CSI report. —1710

Determine, for each layer, an indicator for indicating an index of a strongest coefficient. —1720

Determine, for each layer, a number of bits for the indicator. —1730

Transmit the CSI report including, for each layer, the bits for the indicator. —1740 is a total number of non-zero coefficients that are associated with Z NZP CSI-RS resources and $Z \leq N_{TRP}$, and a number of bits $P_l$ for the indicator. The method further includes transmitting the CSI report including, for each layer, $P_l$ bits for the indicator. When codebookType=type-II-CJT-r18, a value of $P_l$ depends on a value of $$K_l^{NZ}$$

or a value of $$\Sigma_{r=1}^{Z} L_r.$$

When codebookType=type-II-PortSelection-CJT-r18, the value of $P_l$ depends on a value of $$2M_v \Sigma_{r=1}^{Z} L_r.$$

20 Claims, 12 Drawing Sheets

Related U.S. Application Data on Jan. 26, 2023, provisional application No. 63/403, 176, filed on Sep. 1, 2022.

(58) Field of Classification Search
CPC .... H04B 7/0639; H04B 7/0658; H04B 7/024; H04B 7/0478; H04B 7/048
USPC ........................................................ 370/252
See application file for complete search history.

(56) References Cited

U.S. PATENT DOCUMENTS

| | | | |
|---|---|---|---|
| 2022/0239356 A1 | 7/2022 | Rahman et al. | |
| 2023/0261714 A1 | 8/2023 | Kim et al. | |
| 2023/0291454 A1* | 9/2023 | Chou ....................... | H04B 7/10 |
| 2024/0022289 A1* | 1/2024 | Rupasinghe ......... | H04B 7/0417 |
| 2024/0088967 A1* | 3/2024 | Gao ....................... | H04B 7/024 |
| 2024/0235637 A1* | 7/2024 | Rupasinghe ......... | H04B 7/0639 |
| 2024/0364400 A1* | 10/2024 | Muruganathan ...... | H04L 5/0023 |
| 2025/0080176 A1* | 3/2025 | Zhang .................... | H04B 7/024 |
| 2025/0159518 A1* | 5/2025 | Muruganathan ...... | H04L 5/0051 |
| 2025/0226865 A1* | 7/2025 | Ahmed ................ | H04B 7/0639 |
| 2025/0254008 A1* | 8/2025 | Hao ....................... | H04L 5/0053 |

OTHER PUBLICATIONS

Jeongho Jeon; Gilwon Lee; Ahmad A.I. Ibrahim; Jin Yuan; Gary Xu; Joonyoung Cho et al., "MIMO Evolution toward 6G: Modular Massive MIMO in Low-Frequency Bands," in IEEE Communications Magazine, vol. 59, No. 11, pp. 52-58, Nov. 2021 (Year: 2021).*

Apple, Views on Rel-18 MIMO CSI enhancement; 3GPP TSG RAN WG1 #110; R1-2207322; Toulouse, France, Aug. 22-26, 2022 (Year: 2022).*

Lee, Gilwon, Md Saifur Rahman, and Eko Onggosanusi. "CSI feedback for distributed MIMO." 2022 IEEE Wireless Communications and Networking Conference (WCNC). IEEE, 2022. (Year: 2022).*

"3rd Generation Partnership Project; Technical Specification Group Radio Access Network; Evolved Universal Terrestrial Radio Access (E-UTRA); Physical channels and modulation (Release 17)," 3GPP TS 36.211 V17.0.0, Dec. 2021, 250 pages.

"3rd Generation Partnership Project; Technical Specification Group Radio Access Network; Evolved Universal Terrestrial Radio Access (E-UTRA); Multiplexing and channel coding (Release 17)," 3GPP TS 36.212 V17.0.0, Dec. 2021, 258 pages.

"3rd Generation Partnership Project; Technical Specification Group Radio Access Network; Evolved Universal Terrestrial Radio Access (E-UTRA); Physical layer procedures (Release 17)," 3GPP TS 36.213 V17.0.0, Dec. 2021, 582 pages.

"3rd Generation Partnership Project; Technical Specification Group Radio Access Network; Evolved Universal Terrestrial Radio Access (E-UTRA); Medium Access Control (MAC) protocol specification (Release 17)," 3GPP TS 36.321 V17.0.0, Mar. 2022, 146 pages.

"3rd Generation Partnership Project; Technical Specification Group Radio Access Network; Evolved Universal Terrestrial Radio Access (E-UTRA); Radio Resource Control (RRC); Protocol specification (Release 17)," 3GPP TS 36.331 V17.0.0, Mar. 2022, 1119 pages.

"3rd Generation Partnership Project; Technical Specification Group Services and System Aspects; Feasibility Study on New Services and Markets Technology Enablers; Stage 1 (Release 14)," 3GPP TR 22.891 V1.2.0, Nov. 2015, 96 pages.

"3rd Generation Partnership Project; Technical Specification Group Radio Access Network; NR; Multiplexing and channel coding (Release 17)," 3GPP TS 38.212 V17.0.0, Dec. 2021, 190 pages.

"3rd Generation Partnership Project; Technical Specification Group Radio Access Network; NR; Physical layer procedures for data (Release 17)," 3GPP TS 38.214 V17.0.0, Dec. 2021, 217 pages.

Fraunhofer IIS et al., "Measurement results on Doppler spectrum for various UE mobility environments and related CSI enhancements", 3GPP TSG RAN WG#86, RP-192978, Dec. 2019, 13 pages.

"3rd Generation Partnership Project; Technical Specification Group Radio Access Network; NR; Physical channels and modulation (Release 17)," 3GPP TS 38.211 V17.0.0, Dec. 2021, 134 pages.

International Search Report and Written Opinion issued Dec. 4, 2023 regarding International Application No. PCT/KR2023/012911, 7 pages.

Qualcomm Incorporated, "CSI enhancements for high/medium UE velocities and Coherent-JT", 3GPP TSG RAN WG1 #110, R1-2207217,Aug. 2022, 23 pages.

ZTE, "CSI enhancement for high/medium UE velocities and CJT", 3GPP TSG RAN WG1 #110, R1-2205920, Aug. 2022, 24 pages.

CATT, "On Rel-18 CSI enhancements for high/medium UE velocities and coherent JT", 3GPP TSG RAN WG1 #110, R1-2206377, Aug. 2022, 19 pages.

Huawei et al., "CSI enhancement for coherent JT and mobility", 3GPP TSG-RAN WG1 Meeting #110, R1-2205881, Aug. 2022, 23 pages.

Extended European Search Report issued Sep. 9, 2025 regarding Application No. 23860882.2, 14 pages.

* cited by examiner

1300

Port layout in a panel 3D grid of beams in
($1^{st}$ port dim., $2^{nd}$ port dim., freq. dim.)

$O_3 N_3 - 1$

Frequency dim.

$2^{nd}$ port dim.

$O_2 N_2 - 1$

1

0

1

0

0   1   2

$O_1 N_1 - 1$ $1^{st}$ port dim.

1500

8 ports

RRH1

8 ports

RRH2

8 ports

RRH3

RRH4

8 ports

Location B

UE moving on a
trajectory

Location A

1600

Set/Window of FD basis vectors 0     1     ....   Minit          ....          Minit+N-1          N3-1

1700

Receive a configuration about a CSI report. ~1710

Determine, for each layer, an indicator for indicating an index of a strongest coefficient. ~1720

Determine, for each layer, a number of bits for the indicator. ~1730

Transmit the CSI report including, for each layer, the bits for the indicator. ~1740

METHOD AND APPARATUS FOR CSI REPORTING BASED ON A WINDOW OF BASIS VECTORS

CROSS-REFERENCE TO RELATED APPLICATION AND CLAIM OF PRIORITY

This application claims priority under 35 U.S.C. § 119(e) to U.S. Provisional Patent Application No. 63/403,176 filed on Sep. 1, 2022, U.S. Provisional Patent Application No. 63/441,350 filed on Jan. 26, 2023, and U.S. Provisional Patent Application No. 63/471,686 filed on Jun. 7, 2023. The above-identified provisional patent applications are hereby incorporated by reference in their entirety.

TECHNICAL FIELD

The present disclosure relates generally to wireless communication systems and, more specifically, to methods and apparatuses for channel state information (CSI) reporting based on a window of basis vectors.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to compression-based CSI reporting.

In one embodiment, a user equipment (UE) is provided. The UE includes a transceiver configured to receive a configuration about a CSI report. The configuration includes information about (i) $N_{TRP}$ non-zero power (NZP) CSI-reference signal (RS) resources, where $N_{TRP} \geq 1$, and (ii) a parameter codebookType set to type-II-CJT-r18 or type-II-PortSelection-CJT-r18. The UE further includes a processor operably coupled to the transceiver. The processor, based on the configuration, is configured to determine, for each layer $l=1, \ldots, v$, an indicator $i_{1,8,l}$ for indicating an index $$(i_l^*, f_l^*, r_l^*)$$

of a strongest coefficient among $$K_l^{NZ}$$

coefficients, where $$K_l^{NZ}$$

is a total number of non-zero coefficients that are associated with Z NZP CSI-RS resources, and $Z \leq N_{TRP}$, and a number of bits $P_l$ for the indicator $i_{1,8,l}$. The transceiver is further configured to transmit the CSI report including, for each layer $l=1, \ldots, v$, $P_l$ bits for the indicator $i_{1,8,l}$. When codebookType=type-II-CJT-r18, a value of $P_l$ depends on: a value of $$K_l^{NZ},$$

when v=1, and a value of $$\sum_{r=1}^{Z} L_r,$$

when $1 < v \leq 4$. When codebookType=type-II-PortSelection-CJT-r18, the value of $P_l$ depends on a value of $$2M_v \sum_{r=1}^{Z} L_r$$

for all values of v. Here, v is a total number of layers, $L_r$ is a number of first basis vectors associated with an r-th NZP CSI-RS resource from the Z NZP CSI-RS resources, where $r=1, \ldots, Z$, $M_v$ is a number of second basis vectors, $$i_l^* \in \{0, \ldots, 2L_{r_l^*} - 1\}, f_l^* \in \{0, 1, \ldots, M_v - 1\}, \text{ and } r_l^* \in \{1, \ldots, Z\}.$$

In another embodiment, a base station (BS) is provided. The BS includes a processor and a transceiver operably coupled to the processor. The transceiver is configured to transmit a configuration about a CSI report and receive the CSI report including, for each layer $l=1, \ldots, v$, a number of $P_l$ bits for an indicator $i_{1,8,l}$. The configuration include information about (i) $N_{TRP}$ NZP CSI-RS resources, where $N_{TRP} \geq 1$, and (ii) a parameter codebookType set to type-II-CJT-r 18 or type-II-PortSelection-CJT-r18. The indicator $i_{1,8,l}$ is for indicating an index $$(i_l^*, f_l^*, r_l^*)$$

of a strongest coefficient among $$K_l^{NZ}$$

coefficients, where $$K_l^{NZ}$$

is a total number of non-zero coefficients that are associated with Z NZP CSI-RS resources, and $Z \leq N_{TRP}$. When codebookType=type-II-CJT-r18, a value of $P_l$ depends on: a value of $$K_l^{NZ},$$

when v=1 and a value of $$\sum_{r=1}^{Z} L_r,$$

when $1 < v \leq 4$. When codebookType=type-II-PortSelection-CJT-r18, the value of $P_l$ depends on a value of $$2M_v \sum_{r=1}^{Z} L_r$$

for all values of v. Here, v is a total number of layers, $L_r$ is a number of first basis vectors associated with an r-th NZP CSI-RS resource from the Z NZP CSI-RS resources, where r=1, . . . , Z, $M_v$ is a number of second basis vectors, $$i_l^* \in \{0, \dots, 2L_{r_l^*} - 1\}, f_l^* \in \{0, 1, \dots, M_v - 1\}, \text{ and } r_l^* \in \{1, \dots, Z\}.$$

In yet another embodiment, a method performed by a UE is provided. The method includes receiving a configuration about a CSI report. The configuration includes information about (i) $N_{TRP}$ NZP CSI-RS resources, where $N_{TRP} \geq 1$, and (ii) a parameter codebookType set to type-II-CJT-r18 or type-II-PortSelection-CJT-r18. The method further includes determining, based on the configuration, for each layer l=1, . . . , v, an indicator $i_{1,8,l}$ for indicating an index $$(i_l^*, f_l^*, r_l^*)$$

of a strongest coefficient among $$K_l^{NZ}$$

coefficients, where $$K_l^{NZ}$$

is a total number of non-zero coefficients that are associated with Z NZP CSI-RS resources, and $Z \leq N_{TRP}$ and a number of bits $P_l$ for the indicator $i_{1,8,l}$. The method further includes transmitting the CSI report including, for each layer l, $P_l$ bits for the indicator $i_{1,8,l}$. When codebookType=type-II-CJT-r18, a value of $P_l$ depends on a value of $$K_l^{NZ},$$

when v=1 and a value of $$\sum_{r=1}^{Z} L_r,$$

when $1 < v \leq 4$. When codebookType=type-II-PortSelection-CJT-r18, the value of $P_l$ depends on a value of $$2M_v \sum_{r=1}^{Z} L_r$$

for all values of v. Here, v is a total number of layers, $L_r$ is a number of first basis vectors associated with an r-th NZP CSI-RS resource from the Z NZP CSI-RS resources, where r=1, . . . , Z, $M_v$ is a number of second basis vectors, $$i_l^* \in \{0, \dots, 2L_{r_l^*} - 1\}, f_l^* \in \{0, 1, \dots, M_v - 1\}, \text{ and } r_l^* \in \{1, \dots, Z\}.$$

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
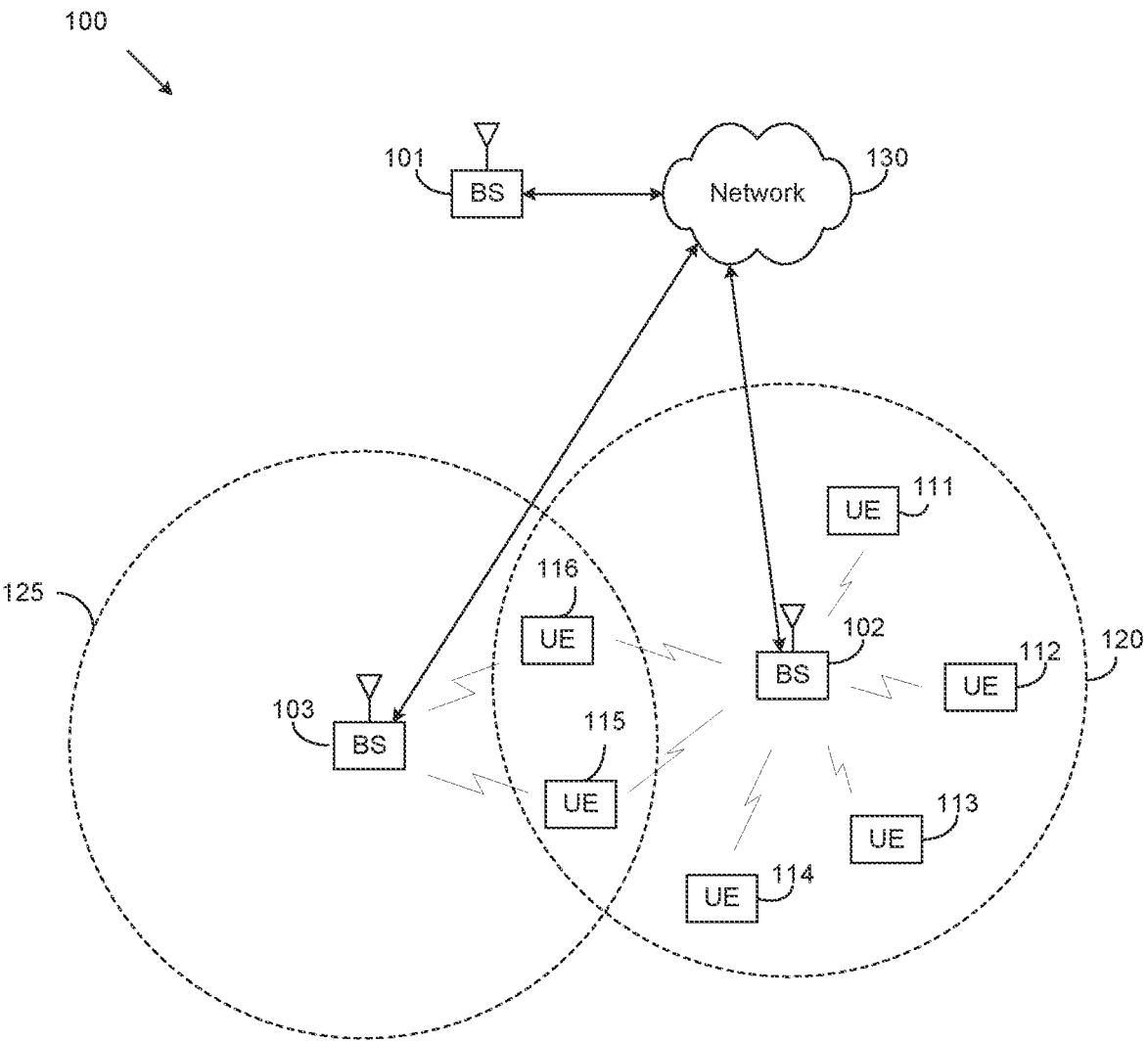
FIG. 1 illustrates an example wireless network according to embodiments of the present disclosure.

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents and standards descriptions are hereby incorporated by reference into the present disclosure as if fully set forth herein: 3GPP TS 36.211 v17.0.0, "E-UTRA, Physical Channels and Modulation" (herein "REF 1"); 3GPP TS 36.212 v17.0.0, "E-UTRA, Multiplexing and Channel Coding" (herein "REF 2"); 3GPP TS 36.213 v17.0.0, "E-UTRA, Physical Layer Procedures" (herein "REF 3"); 3GPP TS 36.321 v17.0.0, "E-UTRA, Medium Access Control (MAC) Protocol Specification" (herein "REF 4"); 3GPP TS 36.331 v17.0.0, "E-UTRA, Radio Resource Control (RRC) Protocol Specification" (herein "REF 5"); 3GPP TR 22.891 v1.2.0 (herein "REF 6"); 3GPP TS 38.212 v17.0.0, "E-UTRA, NR, Multiplexing and Channel Coding" (herein "REF 7"); 3GPP TS 38.214 v17.0.0, "E-UTRA, NR, Physical Layer Procedures for Data" (herein "REF 8"); RP-192978, "Measurement Results on Doppler Spectrum for Various UE Mobility Environments and Related CSI Enhancements," Fraunhofer IIS, Fraunhofer HHI, Deutsche Telekom (herein "REF 9"); and 3GPP TS 38.211 v17.0.0, "E-UTRA, NR, Physical Channels and Modulation" (herein "REF 10").

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 2:
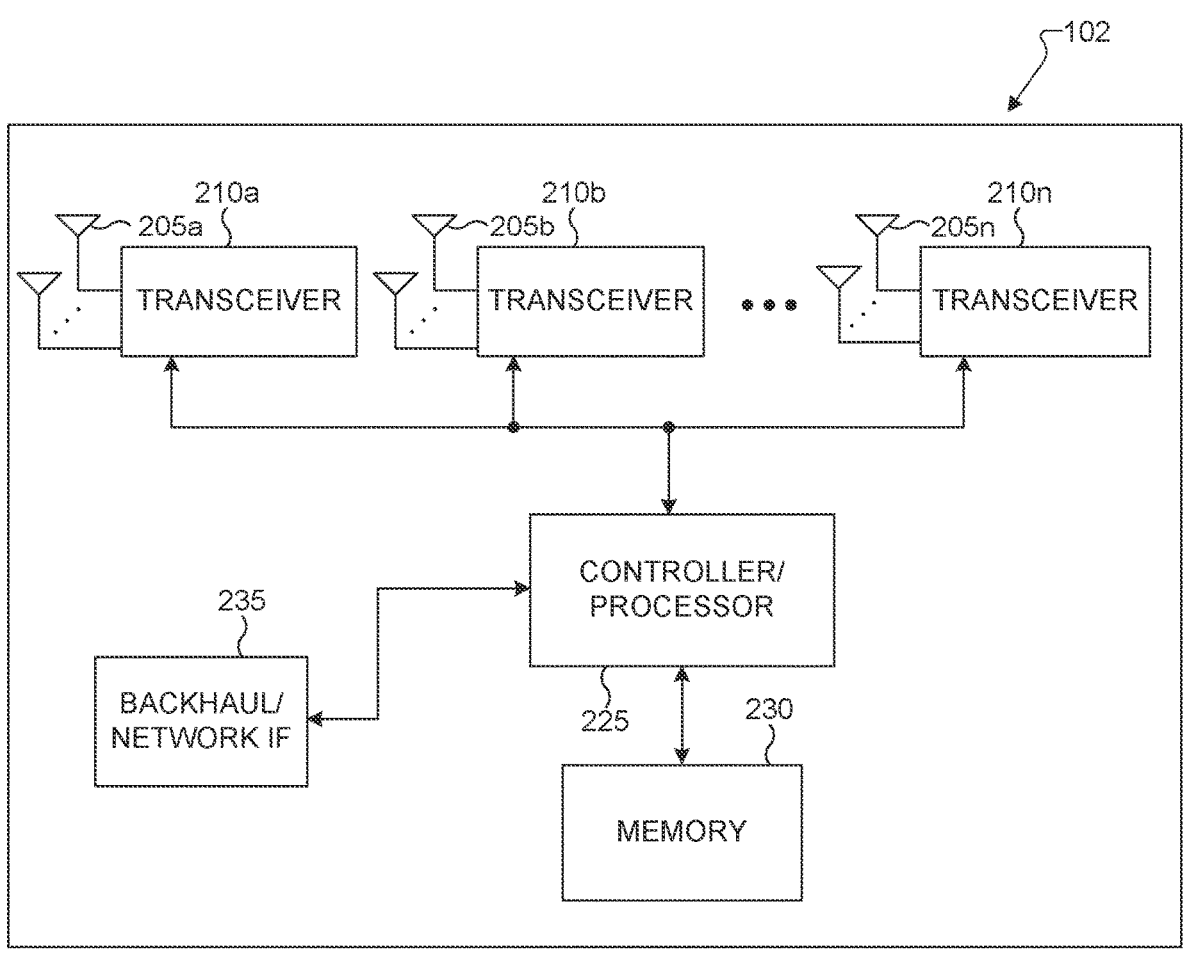
FIG. 2 illustrates an example base station according to embodiments of the present disclosure.
Figure 3:
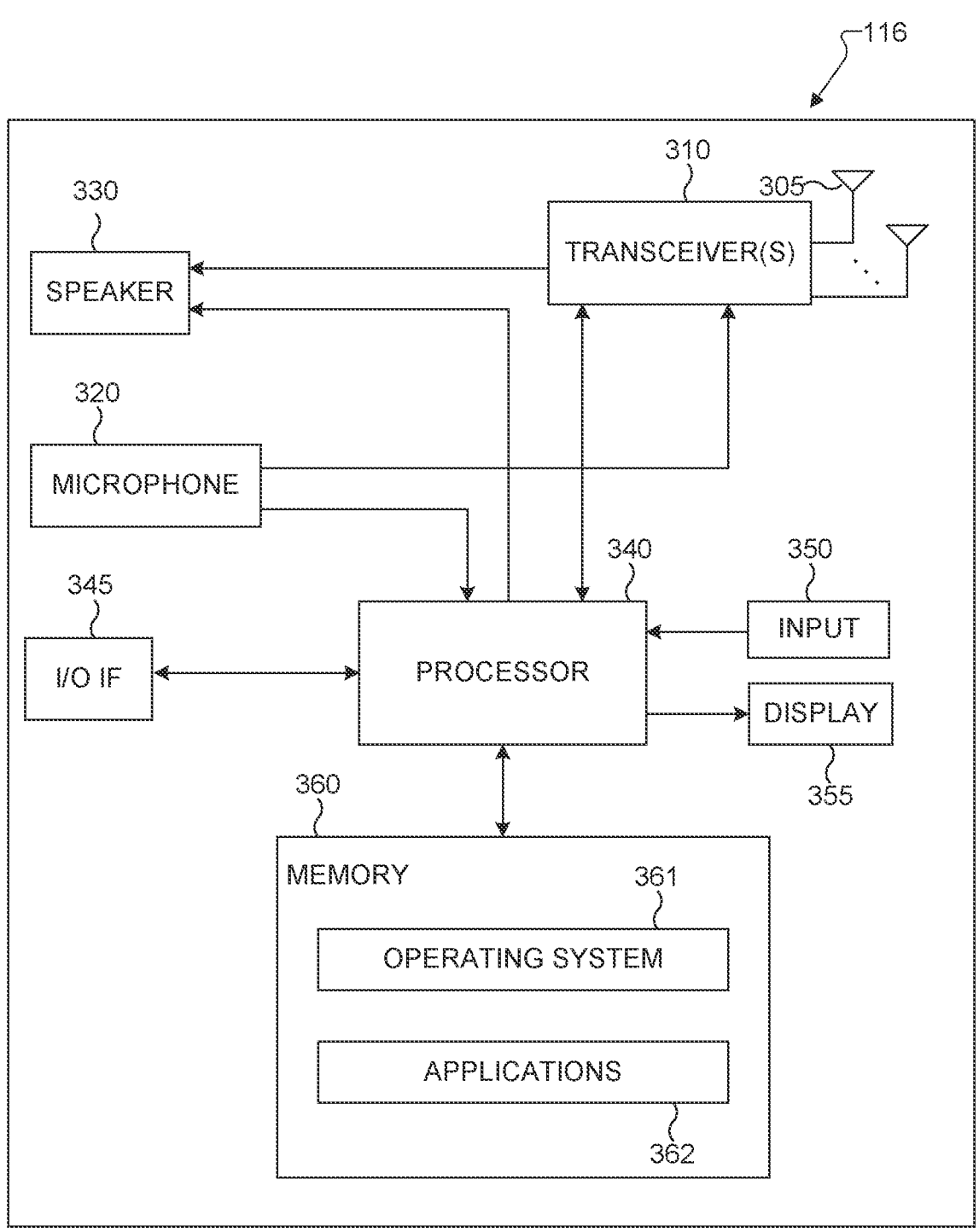
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR $3^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof preforming CSI reporting based on a window of basis vectors. In certain embodiments, one or more of the BSs 101-103 include circuitry, programing, or a combination thereof for supporting CSI reporting based on a window of basis vectors.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as processes to support CSI reporting based on a window of basis vectors in accordance with various embodiment of the present disclosure. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360. For example, the processor 340 may execute processes for CSI reporting based on a window of basis vectors as described in embodiments of the present disclosure. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figures 4, 5:
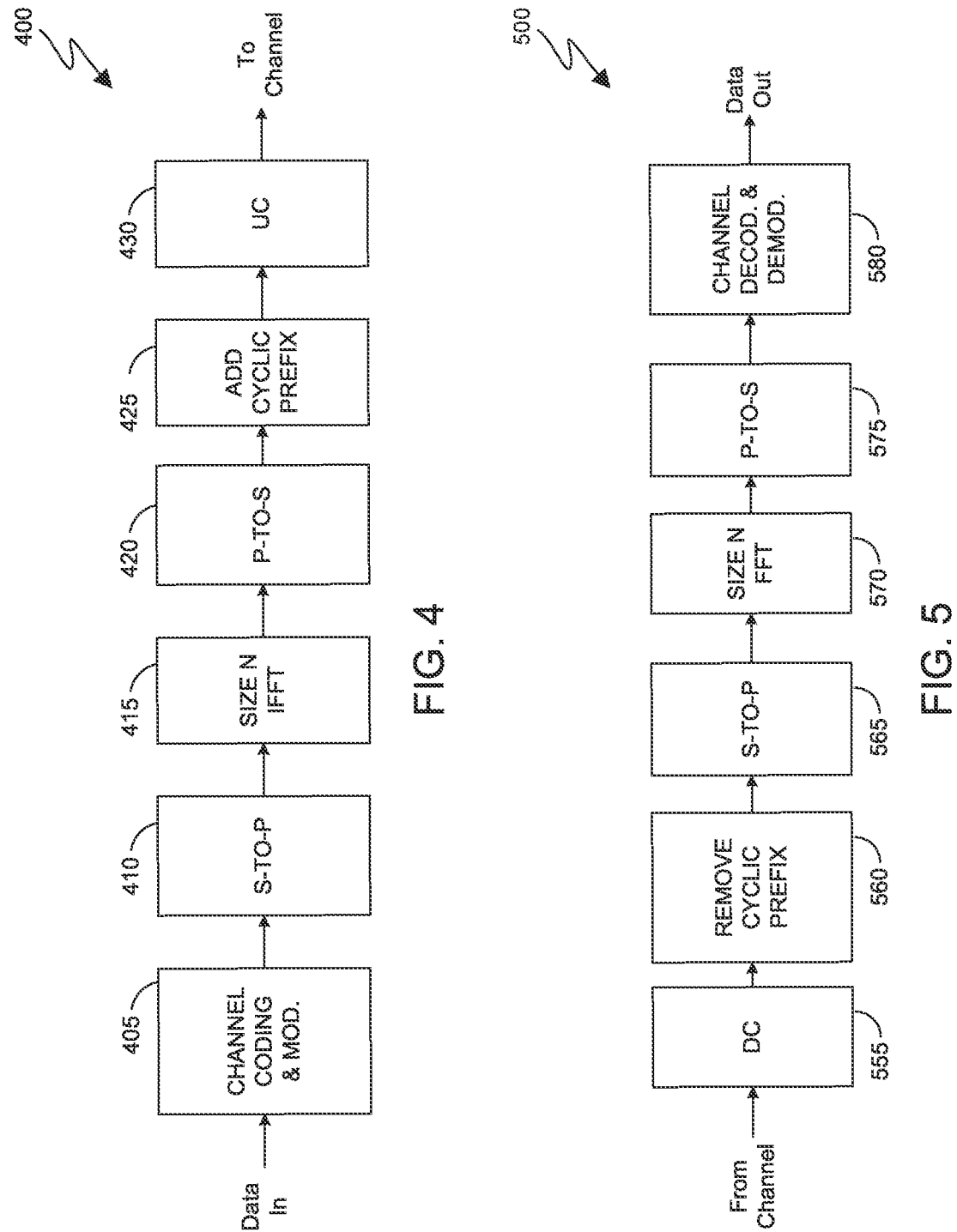
FIGS. 4 and 5 illustrate example wireless transmit and receive paths according to embodiments of the present disclosure.

FIG. 4 and FIG. 5 illustrate example wireless transmit and receive paths according to this disclosure. In the following description, a transmit path 400, of FIG. 4, may be described as being implemented in an gNB or TRP (such as the gNB 102 or TRP 200), while a receive path 500, of FIG. 5, may be described as being implemented in a UE (such as a UE 116). However, it may be understood that the receive path 500 can be implemented in a BS or TRP and that the transmit path 400 can be implemented in a UE. In various embodiments, one or more of the receive path 500 and/or transmit path 400 may be implemented in a repeater. In some embodiments, the transmit path 400 is configured to perform CSI reporting based on a window of basis vectors as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNB s 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A communication system includes a downlink (DL) that conveys signals from transmission points such as base stations (BSs) or NodeBs to user equipments (UEs) and an uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred to as an eNodeB.

In a communication system, such as LTE, DL signals can include data signals conveying information content, control signals conveying DL control information (DCI), and reference signals (RS) that are also known as pilot signals. An eNodeB transmits data information through a physical DL Shared channel (PDSCH). An eNodeB transmits DCI through a physical DL control channel (PDCCH) or an enhanced PDCCH (EPDCCH)—see also REF 3. An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe (or slot) and can have, for example, duration of 1 millisecond.

DL signals also include transmission of a logical channel that carries system control information. A BCCH is mapped to either a transport channel referred to as a broadcast channel (BCH) when it conveys a master information block (MIB) or to a DL shared channel (DL-SCH) when it conveys a system information block (SIB)—see also REF 3 and REF 5. Most system information is included in different SIB s that are transmitted using DL-SCH. A presence of system information on a DL-SCH in a subframe (or slot) can be indicated by a transmission of a corresponding PDCCH conveying a codeword with a CRC scrambled with a special system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $$N_{sc}^{RB}$$

sub-carriers, or resource elements (REs), such as 12 REs. A unit of one RB over one subframe is referred to as a PRB. A UE can be allocated $M_{PDSCH}$ RBs for a total of $$M_{sc}^{PDSCH} = M_{PDSCH} \cdot N_{sc}^{RB}$$

REs for the PDSCH transmission BW.

UL signals can include data signals conveying data information, control signals conveying UL control information (UCI), and UL RS. UL RS includes DMRS and sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a physical UL control channel (PUCCH). If a UE needs to transmit data information and UCI in a same UL subframe, the UE may multiplex both in a PUSCH. UCI includes hybrid automatic repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH (see also REF 3).

An UL subframe (or slot) includes two slots. Each slot includes $$N_{symb}^{UL}$$

symbols for transmitting data information, UCI, DMRS, or SRS. A frequency resource unit of an UL system BW is an RB. A UE is allocated $N_{RB}$ RBs for a total of $$N_{RB} \cdot N_{sc}^{sRB}$$

REs for a transmission BW. For a PUCCH, $N_{RB}$=1. A last subframe symbol can be used to multiplex SRS transmissions from one or more UEs. A number of subframe symbols that are available for data/UCI/DMRS transmission is $$N_{symb} = 2 \cdot \left( N_{symb}^{UL} - 1 \right) - N_{SRS},$$

where $N_{SRS}$=1 if a last subframe symbol is used to transmit SRS and $N_{SRS}$=0 otherwise.

Figure 6:
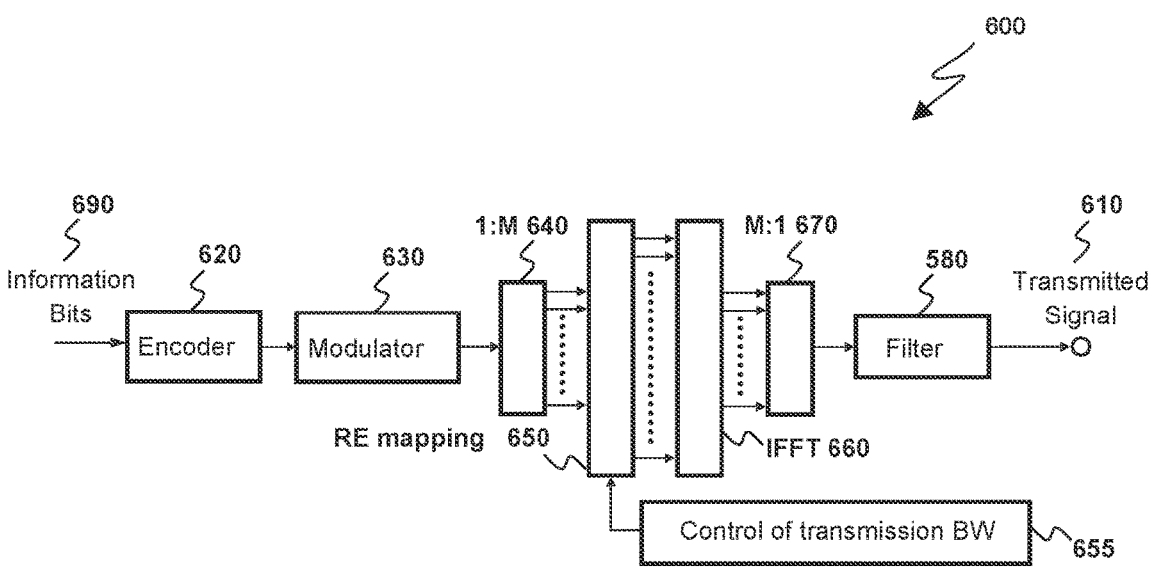
FIG. 6 illustrates a transmitter block diagram for a physical downlink shared channel (PDSCH) in a slot according to embodiments of the present disclosure.

FIG. 6 illustrates a transmitter block diagram 600 for a PDSCH in a slot according to embodiments of the present disclosure. The embodiment of the transmitter block diagram 600 illustrated in FIG. 6 is for illustration only. One or more of the components illustrated in FIG. 6 can be implemented in specialized circuitry configured to perform the noted functions or one or more of the components can be implemented by one or more processors executing instructions to perform the noted functions. FIG. 6 does not limit the scope of this disclosure to any particular implementation of the transmitter block diagram 600.

As shown in FIG. 6, information bits 610 are encoded by encoder 620, such as a turbo encoder, and modulated by modulator 630, for example using quadrature phase shift keying (QPSK) modulation. A serial to parallel (S/P) converter 640 generates M modulation symbols that are subsequently provided to a mapper 650 to be mapped to REs selected by a transmission BW selection unit 655 for an assigned PDSCH transmission BW, unit 660 applies an Inverse fast Fourier transform (IFFT), the output is then serialized by a parallel to serial (P/S) converter 670 to create a time domain signal, filtering is applied by filter 680, and a signal transmitted 690. Additional functionalities, such as data scrambling, cyclic prefix insertion, time windowing, interleaving, and others are well known in the art and are not shown for brevity.

Figure 7:
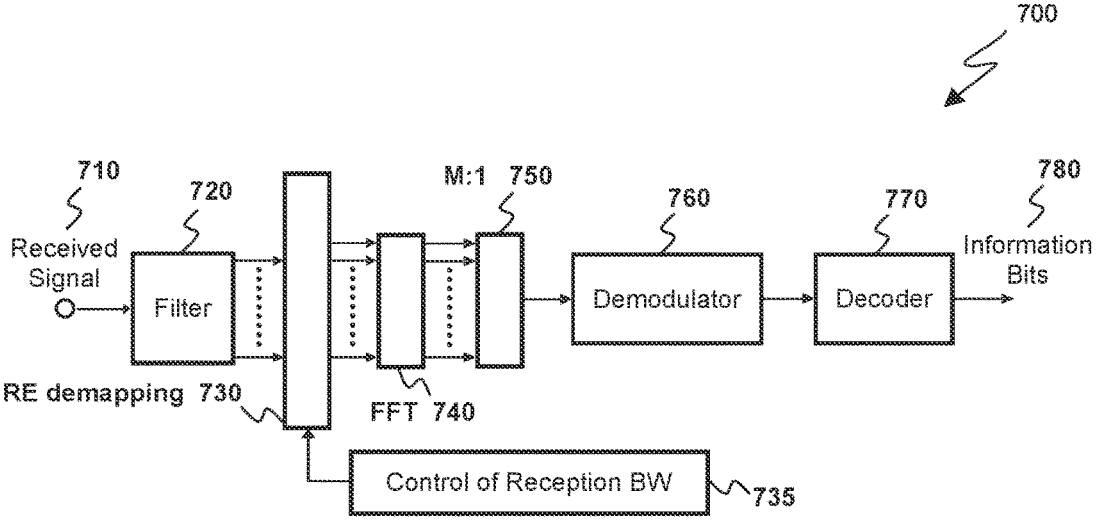
FIG. 7 illustrates a receiver block diagram for a PDSCH in a slot according to embodiments of the present disclosure.

FIG. 7 illustrates a receiver block diagram 700 for a PDSCH in a slot according to embodiments of the present disclosure. The embodiment of the diagram 700 illustrated in FIG. 7 is for illustration only. One or more of the components illustrated in FIG. 7 can be implemented in specialized circuitry configured to perform the noted functions or one or more of the components can be implemented by one or more processors executing instructions to perform the noted functions. FIG. 7 does not limit the scope of this disclosure to any particular implementation of the diagram 700.

As shown in FIG. 7, a received signal 710 is filtered by filter 720, REs 730 for an assigned reception BW are selected by BW selector 735, unit 740 applies a fast Fourier transform (FFT), and an output is serialized by a parallel-to-serial converter 750. Subsequently, a demodulator 760 coherently demodulates data symbols by applying a channel estimate obtained from a DMRS or a CRS (not shown), and a decoder 770, such as a turbo decoder, decodes the demodulated data to provide an estimate of the information data bits 780. Additional functionalities such as time-windowing, cyclic prefix removal, de-scrambling, channel estimation, and de-interleaving are not shown for brevity.

Figure 8:
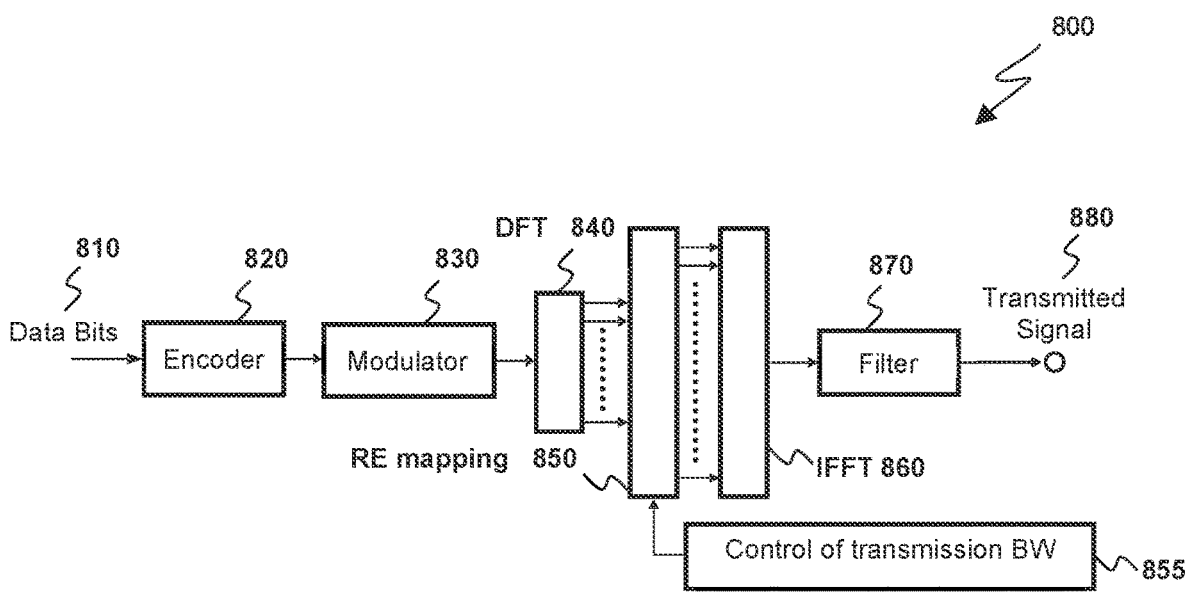
FIG. 8 illustrates a transmitter block diagram for a physical uplink shared channel (PUSCH) in a slot according to embodiments of the present disclosure.

FIG. 8 illustrates a transmitter block diagram 800 for a PUSCH in a slot according to embodiments of the present disclosure. The embodiment of the block diagram 800 illustrated in FIG. 8 is for illustration only. One or more of the components illustrated in FIG. 6 can be implemented in specialized circuitry configured to perform the noted functions or one or more of the components can be implemented by one or more processors executing instructions to perform the noted functions. FIG. 8 does not limit the scope of this disclosure to any particular implementation of the block diagram 800.

As shown in FIG. 8, information data bits 810 are encoded by encoder 820, such as a turbo encoder, and modulated by modulator 830. A discrete Fourier transform (DFT) unit 840 applies a DFT on the modulated data bits, REs 850 corresponding to an assigned PUSCH transmission BW are selected by transmission BW selection unit 855, unit 860 applies an IFFT and, after a cyclic prefix insertion (not shown), filtering is applied by filter 870 and a signal transmitted 880.

Figure 9:
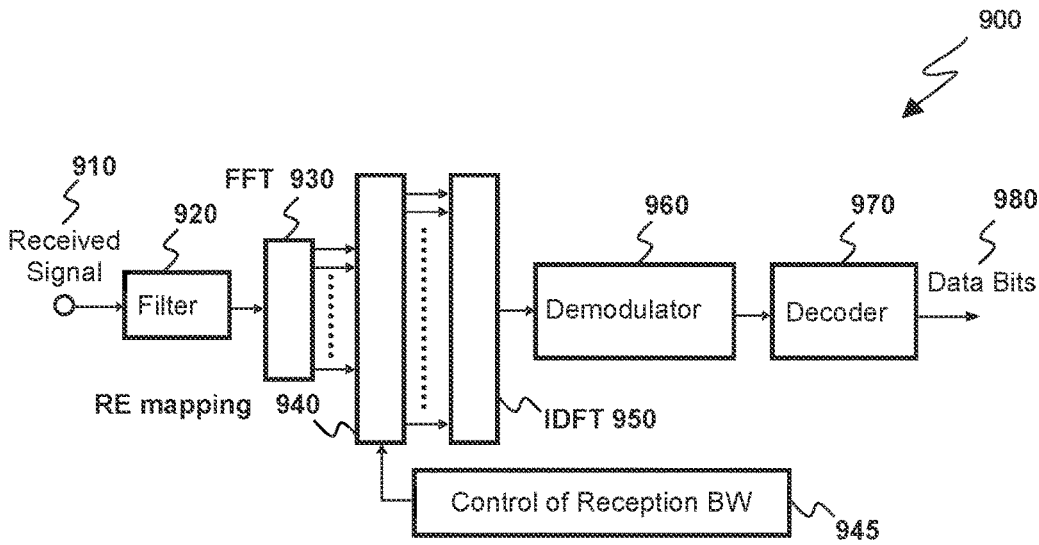
FIG. 9 illustrates a receiver block diagram for a PUSCH in a slot according to embodiments of the present disclosure.

FIG. 9 illustrates a receiver block diagram 900 for a PUSCH in a subframe according to embodiments of the present disclosure. The embodiment of the block diagram 900 illustrated in FIG. 9 is for illustration only. One or more of the components illustrated in FIG. 9 can be implemented in specialized circuitry configured to perform the noted functions or one or more of the components can be implemented by one or more processors executing instructions to perform the noted functions. FIG. 9 does not limit the scope of this disclosure to any particular implementation of the block diagram 900.

As shown in FIG. 9, a received signal 910 is filtered by filter 920. Subsequently, after a cyclic prefix is removed (not shown), unit 930 applies an FFT, REs 940 corresponding to an assigned PUSCH reception BW are selected by a reception BW selector 945, unit 950 applies an inverse DFT (IDFT), a demodulator 960 coherently demodulates data symbols by applying a channel estimate obtained from a DMRS (not shown), a decoder 970, such as a turbo decoder, decodes the demodulated data to provide an estimate of the information data bits 980.

In next generation cellular systems, various use cases are envisioned beyond the capabilities of LTE system. Termed 5G or the fifth-generation cellular system, a system capable of operating at sub-6 GHz and above-6 GHz (for example, in mmWave regime) becomes one of the requirements. In 3GPP TR 22.891, 74 5G use cases have been identified and described; those use cases can be roughly categorized into three different groups. A first group is termed "enhanced mobile broadband (eMBB)," targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per km² with less stringent the reliability, data rate, and latency requirements.

The 3GPP NR specification supports up to 32 CSI-RS antenna ports which enable a gNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 10:
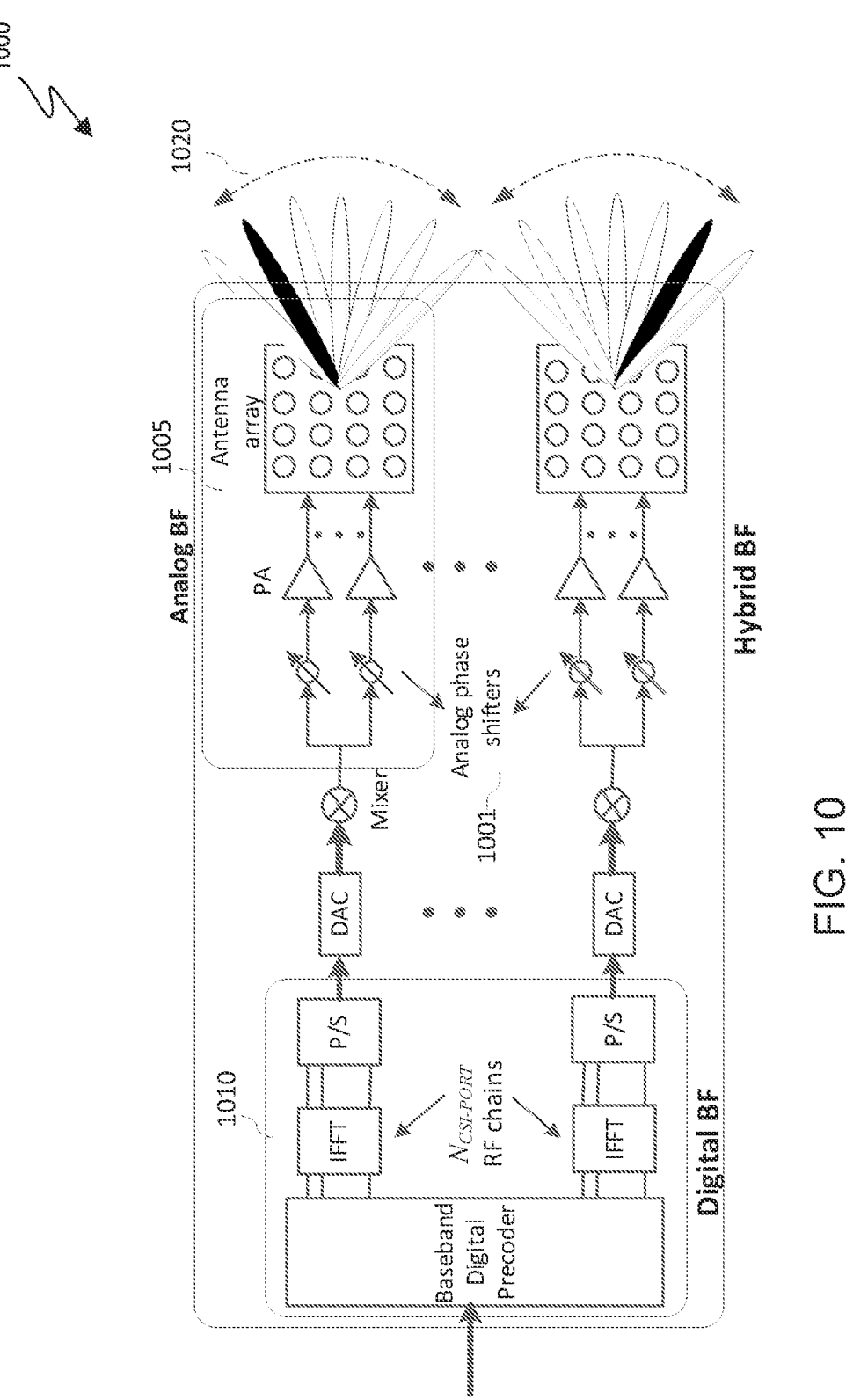
FIG. 10 illustrates an example antenna blocks or arrays forming beams according to embodiments of the present disclosure.

FIG. 10 illustrates an example antenna blocks or arrays 1000 according to embodiments of the present disclosure. For example, in various embodiments, the antenna blocks or arrays 1000 may be implemented in any of the gNBs 101-103, the TRP 200, and/or the UEs 111-116. The embodiment of the antenna blocks or arrays 1000 illustrated in FIG. 10 is for illustration only. FIG. 10 does not limit the scope of this disclosure to any particular implementation of the antenna blocks or arrays 1000.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 10. In this case, one CSI-RS port is mapped onto a large number of antenna elements which can be controlled by a bank of analog phase shifters 1001. One CSI-RS port can then correspond to one sub-array which produces a narrow analog beam through analog beamforming 1005. This analog beam can be configured to sweep across a wider range of angles 1020 by varying the phase shifter bank across symbols or subframes. The number of sub-arrays (equal to the number of RF chains) is the same as the number of CSI-RS ports $N_{CSI-PORT}$. A digital beamforming unit 1010 performs a linear combination across $N_{CSI-PORT}$ analog beams to further increase precoding gain. While analog beams are wideband (hence not frequency-selective), digital precoding can be varied across frequency sub-bands or resource blocks.

To enable digital precoding, efficient design of CSI-RS is a crucial factor. For this reason, three types of CSI reporting mechanism corresponding to three types of CSI-RS measurement can be considered: 1) 'CLASS A' CSI reporting which corresponds to non-precoded CSI-RS, 2) 'CLASS B' reporting with K=1 CSI-RS resource which corresponds to UE-specific beamformed CSI-RS, 3) 'CLASS B' reporting with K>1 CSI-RS resources which corresponds to cell-specific beamformed CSI-RS. For non-precoded (NP) CSI-RS, a cell-specific one-to-one mapping between CSI-RS port and TXRU is utilized. Here, different CSI-RS ports have the same wide beam width and direction and hence generally cell wide coverage. For beamformed CSI-RS, beamforming operation, either cell-specific or UE-specific, is applied on a non-zero-power (NZP) CSI-RS resource (including multiple ports). Here, (at least at a given time/frequency) CSI-RS ports have narrow beam widths and hence not cell wide coverage, and (at least from the eNB (or gNB) perspective) at least some CSI-RS port-resource combinations have different beam directions.

In scenarios where DL long-term channel statistics can be measured through UL signals at a serving eNodeB, UE-specific BF CSI-RS can be readily used. This is typically feasible when UL-DL duplex distance is sufficiently small. When this condition does not hold, however, some UE feedback is necessary for the eNodeB to obtain an estimate of DL long-term channel statistics (or any of its representation thereof). To facilitate such a procedure, a first BF CSI-RS transmitted with periodicity T1 (ms), and a second NP CSI-RS transmitted with periodicity T2 (ms), where T1≤T2. This approach is termed hybrid CSI-RS. The implementation of hybrid CSI-RS is largely dependent on the definition of CSI process and NZP CSI-RS resource.

In a wireless communication system, MIMO is often identified as an essential feature in order to achieve high system throughput requirements. One of the key components of a MIMO transmission scheme is the accurate CSI acquisition at the eNB (or gNB) (or TRP). For MU-MIMO, in particular, the availability of accurate CSI is necessary in order to guarantee high MU performance. For TDD systems, the CSI can be acquired using the SRS transmission relying on the channel reciprocity. For FDD systems, on the other hand, it can be acquired using the CSI-RS transmission from eNB (or gNB), and CSI acquisition and feedback from UE. In legacy FDD systems, the CSI feedback framework is "implicit" in the form of CQI/PMI/RI (also CRI and LI) derived from a codebook assuming SU transmission from eNB (or gNB).

In 5G or NR systems (REF 7, REF 8), the above-mentioned "implicit" CSI reporting paradigm from LTE is also supported and referred to as Type I CSI reporting. In addition, a high-resolution CSI reporting, referred to as Type II CSI reporting, is also supported in Release 15 specification to provide more accurate CSI information to gNB for use cases such as high-order MU-MIMO. However, the overhead of Type II CSI reporting can be an issue in practical UE implementations. One approach to reduce Type II CSI overhead is based on frequency domain (FD) compression. In Rel. 16 NR, DFT-based FD compression of the Type II CSI has been supported (referred to as Rel. 16 enhanced Type II codebook in REF 8). Some of the key components for this feature includes (a) spatial domain (SD) basis $W_1$, (b) FD basis $W_f$, and (c) coefficients $\tilde{W}_2$ that linearly combine SD and FD basis. In a non-reciprocal FDD system, a complete CSI (comprising all components) needs to be reported by the UE. However, when reciprocity or partial reciprocity does exist between UL and DL, then some of the CSI components can be obtained based on the UL channel estimated using SRS transmission from the UE. In Rel. 16 NR, the DFT-based FD compression is extended to this partial reciprocity case (referred to as Rel. 16 enhanced Type II port selection codebook in REF 8), wherein the DFT-based SD basis in $W_1$ is replaced with SD CSI-RS port selection, i.e., L out of $$\frac{P_{CSI-RS}}{2}$$

CSI-RS ports are selected (the selection is common for the two antenna polarizations or two halves of the CSI-RS ports). The CSI-RS ports in this case are beamformed in SD (assuming UL-DL channel reciprocity in angular domain), and the beamforming information can be obtained at the gNB based on UL channel estimated using SRS measurements.

In Rel. 17 NR, CSI reporting has been enhanced to support the following.

Further enhanced Type II port selection codebook: it has been known in the literature that UL-DL channel reciprocity can exist in both angular and delay domains if the UL-DL duplexing distance is small. Since delay in time domain transforms (or closely related to) basis vectors in frequency domain (FD), the Rel. 16 enhanced Type II port selection can be further extended to both angular and delay domains (or SD and FD). In particular, the DFT-based SD basis in $W_1$ and DFT-based FD basis in $W_f$ can be replaced with SD and FD port selection, i.e., L CSI-RS ports are selected in SD or/and M ports are selected in FD. The CSI-RS ports in this case are beamformed in SD (assuming UL-DL channel reciprocity in angular domain) or/and FD (assuming UL-DL channel reciprocity in delay/frequency domain), and the corresponding SD or/and FD beamforming information can be obtained at the gNB based on UL channel estimated using SRS measurements. In Rel. 17, such a codebook is supported (which is referred to as Rel. 17 further enhanced Type II port selection codebook in REF 8).

NCJT CSI reporting: When the UE can communicate with multiple TRPs that are distributed at different locations in space (e.g., within a cell), the CSI reporting can correspond to a single TRP hypothesis (i.e., CSI reporting for one of the multiple TRPs), or multi-TRP hypothesis (i.e., CSI reporting for at least two of the multiple TRPs). The CSI reporting for both single TRP and multi-TRP hypotheses are supported in Rel. 17. However, the multi-TRP CSI reporting assume a non-coherent joint transmission (NCJT), i.e., a layer (and precoder) of the transmission is restricted to be transmitted from only one TRP.

In Rel. 18 MIMO WID includes the following objectives on CSI enhancements:

Study, and if justified, specify enhancements of CSI acquisition for Coherent-JT targeting FR1 and up to 4 TRPs, assuming ideal backhaul and synchronization as well as the same number of antenna ports across TRPs, as follows:

Rel-16/17 Type-II codebook refinement for CJT mTRP targeting FDD and its associated CSI reporting, taking into account throughput-overhead trade-off.

Study, and if justified, specify CSI reporting enhancement for high/medium UE velocities by exploiting time-domain correlation/Doppler-domain information to assist DL precoding, targeting FR1, as follows:

Rel-16/17 Type-II codebook refinement, without modification to the spatial and frequency domain basis.

UE reporting of time-domain channel properties measured via CSI-RS for tracking.

The first objective extends the Rel. 17 NCJT CSI to coherent JT (CJT), and the second extends FD compression in the Rel. 16/17 codebook to include time (Doppler) domain compression. Both extensions are based on the same legacy codebook, i.e., Rel. 16/17 codebook. In this disclosure, a unified codebook design considering both extensions has been proposed.

Figure 11:
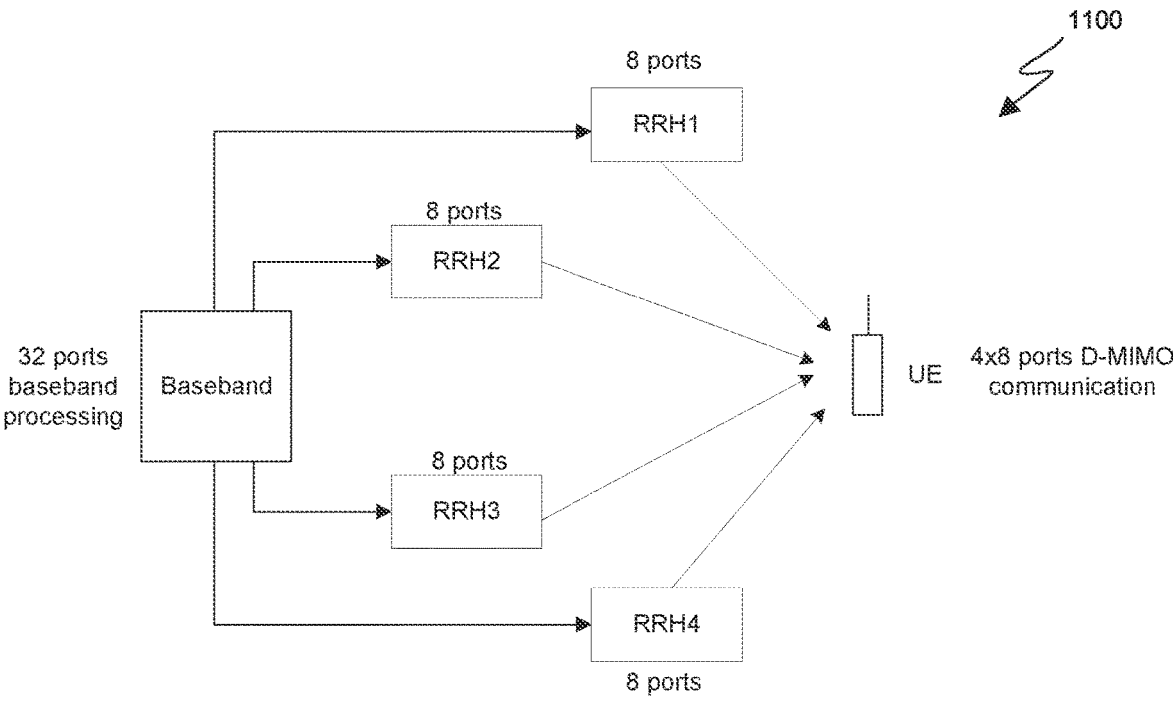
FIG. 11 illustrates an example of a MIMO system that can be referred to as a distributed MIMO (D-MIMO) or a CJT system according to embodiments of the present disclosure.

FIG. 11 illustrates an example 1100 of a MIMO system that can be referred to as a distributed MIMO (D-MIMO) or a CJT system according to embodiments of the present disclosure. The embodiment of the example 1100 of a MIMO system illustrated in FIG. 11 is for illustration only. FIG. 11 does not limit the scope of this disclosure to any particular implementation of the example 1100 of a MIMO system.

As illustrated in FIG. 11, an embodiment for CJT/DMIMO is as follows. Although NR supports up to 32 CSI-RS antenna ports, for a cellular system operating in a sub-1 GHz frequency range (e.g., less than 1 GHz), supporting large number of CSI-RS antenna ports (e.g., 32) at one site or remote radio head (RRH) or TRP is challenging due to larger antenna form factors at these frequencies (when compared with a system operating at a higher frequency such as 2 GHz or 4 GHz. At such low frequencies, the maximum number of CSI-RS antenna ports that can be co-located at a site (or RRH/TRP) can be limited, for example to 8. This limits the spectral efficiency of such systems. In particular, the MU-MIMO spatial multiplexing gains offered due to large number of CSI-RS antenna ports (such as 32) cannot be achieved. One way to operate a sub-1 GHz system with large number of CSI-RS antenna ports is based on distributing antenna ports at multiple sites (or RRHs/TRPs). The multiple sites or RRHs/TRPs can still be connected to a single (common) baseband unit, hence the signal transmitted/received via multiple distributed RRHs/TRPs can still be processed at a centralized location. For example, 32 CSI-RS ports can be distributed across 4 RRHs/TRPs, each with 8 antenna ports. As previously described, such a MIMO system can be referred to as a distributed MIMO (D-MIMO) or a CJT system.

The multiple RRHs/TRPs in a D-MIMO setup can be utilized for spatial multiplexing gain (based on CSI reporting). Since RRHs/TRPs are geographically separated, they (RRHs/TRPs) tend to contribute differently in CSI reporting. This motivates a dynamic RRH selection followed by CSI reporting condition on the RRH selection. This disclosure provides example embodiments on how channel and interference signal can be measure under different RRH selection hypotheses. Additionally, the signaling details of such a CSI reporting and CSI-RS measurement are also provided.

Various embodiments of the present disclosure that relate to time-/Doppler-domain compression are moderate to high mobility embodiments. Some embodiments recognize that when the UE speed is in a moderate or high-speed regime, the performance of the Rel. 15/16/17 codebooks starts to deteriorate quickly due to fast channel variations (which in turn is due to UE mobility that contributes to the Doppler component of the channel), and a one-shot nature of CSI-RS measurement and CSI reporting in Rel. 15/16/17. This limits the usefulness of Rel. 15/16/17 codebooks to low mobility or static UEs only. For moderate or high mobility scenarios, an enhancement in CSI-RS measurement and CSI reporting is needed, which is based on the time-domain (TD) variations or Doppler components of the channel. As described in (REF 9), the Doppler components of the channel remain almost constant over a large time duration, referred to as channel stationarity time, which is significantly larger than the channel coherence time. Note that the current (Rel. 15/16/17) CSI reporting is based on the channel coherence time, which is not suitable when the channel has significant Doppler components. The Doppler components of the channel can be calculated based on measuring a reference signal (RS) burst, where the RS can be CSI-RS or SRS. When RS is CSI-RS, the UE measures a CSI-RS burst, and use it to obtain Doppler components of the DL channel, and when RS is SRS, the gNB measures an SRS burst, and use it to obtain Doppler components of the UL channel. The obtained Doppler components can be reported by the UE using a codebook (as part of a CS report). Or, the gNB can use the obtained Doppler components of the UL channel to beamform CSI-RS for CSI reporting by the UE.

Figure 12:
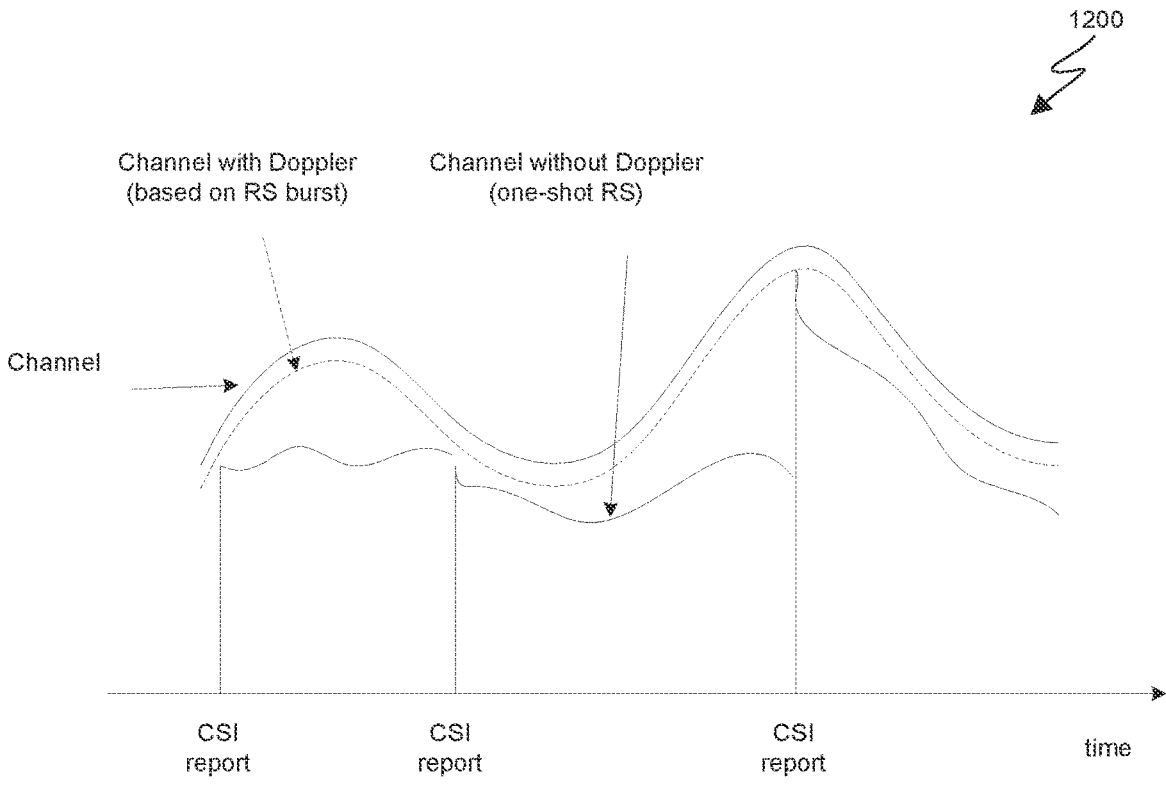
FIG. 12 illustrates channel measurement with and without Doppler components according to embodiments of the present disclosure.

FIG. 12 illustrates channel measurement with and without Doppler components 1200 according to embodiments of the present disclosure. The embodiment of the channel measurement with and without Doppler components 1200 illustrated in FIG. 12 is for illustration only. FIG. 12 does not limit the scope of this disclosure to any particular implementation of the channel measurement with and without Doppler components.

An illustration of channel measurement with and without Doppler components is shown in FIG. 12. When the channel is measured with the Doppler components (e.g., based on an RS burst), the measured channel can remain close to the actual varying channel. On the other hand, when the channel is measured without the Doppler components (e.g., based on a one-shot RS), the measured channel can be far from the actual varying channel.

Various embodiments of the present disclosure provide mechanisms for CSI acquisition at gNB. In particular, various embodiments relate to the CSI reporting based on a high-resolution (or Type II) codebook comprising spatial-, frequency- or/and time- (Doppler-) domain components for a distributed antenna structure (DMIMO). Various embodiments of the present disclosure provide mechanisms for selection of frequency domain basis vectors for multiple TRPs from a window where the window can be one/common across TRPs, or one per TRP, details of window(s): initial index (Minit) and length W, signaling: configured window, reported window, and for multiple windows: a reference window+a relative offset per TRP w.r.t. to the reference window, and details on SCI.

All the following components and embodiments are applicable for UL transmission with CP-OFDM (cyclic prefix OFDM) waveform as well as DFT-SOFDM (DFT-spread OFDM) and SC-FDMA (single-carrier FDMA) waveforms. Furthermore, all the following components and embodiments are applicable for UL transmission when the scheduling unit in time is either one subframe (which can include of one or multiple slots) or one slot.

In the present disclosure, the frequency resolution (reporting granularity) and span (reporting bandwidth) of CSI reporting can be defined in terms of frequency "subbands" and "CSI reporting band" (CRB), respectively.

A subband for CSI reporting is defined as a set of contiguous PRBs which represents the smallest frequency unit for CSI reporting. The number of PRBs in a subband can be fixed for a given value of DL system bandwidth, configured either semi-statically via higher-layer/RRC signaling, or dynamically via L1 DL control signaling or MAC control element (MAC CE). The number of PRBs in a subband can be included in CSI reporting setting.

"CSI reporting band" is defined as a set/collection of subbands, either contiguous or non-contiguous, wherein CSI reporting is performed. For example, CSI reporting band can include all the subbands within the DL system bandwidth. This can also be termed "full-band". Alternatively, CSI reporting band can include only a collection of subbands within the DL system bandwidth. This can also be termed "partial band".

The term "CSI reporting band" is used only as an example for representing a function. Other terms such as "CSI reporting subband set" or "CSI reporting bandwidth" or bandwidth part (BWP) can also be used.

In terms of UE configuration, a UE can be configured with at least one CSI reporting band. This configuration can be semi-static (via higher-layer signaling or RRC) or dynamic (via MAC CE or L1 DL control signaling). When configured with multiple (N) CSI reporting bands (e.g., via RRC signaling), a UE can report CSI associated with $n \leq N$ CSI reporting bands. For instance, >6 GHz, large system bandwidth may require multiple CSI reporting bands. The value of n can either be configured semi-statically (via higher-layer signaling or RRC) or dynamically (via MAC CE or L1 DL control signaling). Alternatively, the UE can report a recommended value of n via an UL channel.

Therefore, CSI parameter frequency granularity can be defined per CSI reporting band as follows. A CSI parameter is configured with "single" reporting for the CSI reporting band with $M_n$ subbands when one CSI parameter for all the $M_n$ subbands within the CSI reporting band. A CSI parameter is configured with "subband" for the CSI reporting band with $M_n$ subbands when one CSI parameter is reported for each of the $M_n$ subbands within the CSI reporting band.

Figure 13:
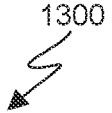
FIG. 13 illustrates an example antenna port layout according to embodiments of the present disclosure.
Figure 13:
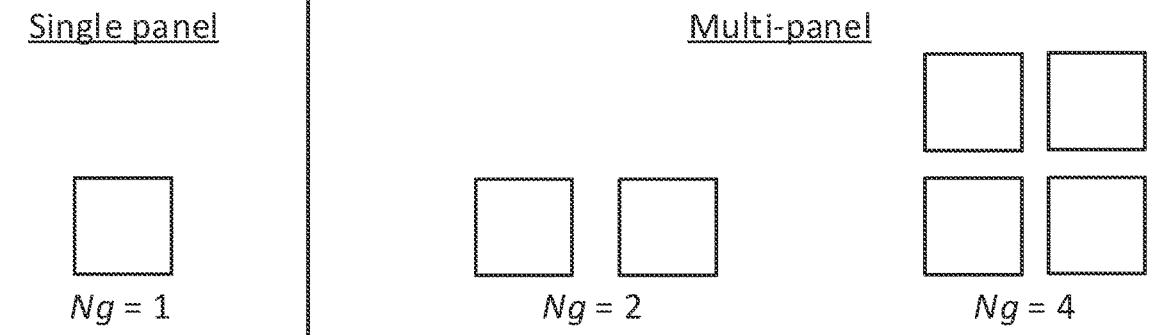

FIG. 13 illustrates an example antenna port layout 1300 according to embodiments of the present disclosure. The embodiment of the antenna port layout 1300 illustrated in FIG. 13 is for illustration only. FIG. 13 does not limit the scope of this disclosure to any particular implementation of the antenna port layout.

As illustrated in FIG. 13, $N_1$ and $N_2$ may be the number of antenna ports with the same polarization in the first and second dimensions, respectively. For 2D antenna port layouts, we have $N_1 > 1$, $N_2 > 1$, and for 1D antenna port layouts $N_1 > 1$ and $N_2 = 1$. So, for a dual-polarized antenna port layout, the total number of antenna ports is $2N_1 N_2$ when each antenna maps to an antenna port. An illustration is shown in FIG. 13 where "X" represents two antenna polarizations. In this disclosure, the term "polarization" refers to a group of antenna ports. For example, antenna ports $$j = X + 0, X + 1, \ldots, X + \frac{P_{CSIRS}}{2} - 1$$

comprise a first antenna polarization, and antenna ports $$j = X + \frac{P_{CSIRS}}{2}, X + \frac{P_{CSIRS}}{2} + 1, \ldots, X + P_{CSIRS} - 1$$

comprise a second antenna polarization, where $P_{CSIRS}$ is a number of CSI-RS antenna ports and X is a starting antenna port number (e.g., X=3000, then antenna ports are 3000, 3001, 3002, ... ). Let $N_g$ be a number of antenna panels at the gNB. When there are multiple antenna panels ($N_g > 1$), each panel may be dual-polarized antenna ports with $N_1$ and $N_2$ ports in two dimensions. This is illustrated in FIG. 13. Note that the antenna port layouts may or may not be the same in different antenna panels.

In one example, the antenna architecture of a D-MIMO or CJT system is structured. For example, the antenna structure at each RRH (or TRP) is dual-polarized (single or multi-panel as shown in FIG. 13. The antenna structure at each RRH/TRP can be the same. Or, the antenna structure at an RRH/TRP can be different from another RRH/TRP. Likewise, the number of ports at each RRH/TRP can be the same. Or, the number of ports at one RRH/TRP can be different from another RRH/TRP. In one example, $N_g = N_{RRH}$, a number of RRHs/TRPs/TRPs in the D-MIMO transmission.

In another example, the antenna architecture of a D-MIMO or CJT system is unstructured. For example, the antenna structure at one RRH/TRP can be different from another RRH/TRP.

For various embodiments, a structured antenna architecture may be assumed in the rest of the disclosure. Furthermore, for simplicity, it may be assumed that each RRH/TRP is equivalent to a panel (cf. FIG. 13), although an RRH/TRP can have multiple panels in practice. The disclosure however is not restrictive to a single panel assumption at each RRH/TRP, and can easily be extended (covers) the case when an RRH/TRP has multiple antenna panels.

In one embodiment, an RRH constitutes (or corresponds to or is equivalent to) at least one of the following:

In one example, an RRH corresponds to a TRP.

In one example, an RRH/TRP corresponds to a CSI-RS resource. A UE is configured with $K = N_{TRP} = N_{RRH} \geq 1$ non-zero-power (NZP) CSI-RS resources, and a CSI reporting is configured to be across multiple CSI-RS resources. This is similar to Class B, K>1 configuration in Rel. 14 LTE. The K NZP CSI-RS resources can belong to a CSI-RS resource set or multiple CSI-RS resource sets (e.g., K resource sets each comprising one CSI-RS resource). The details are as explained earlier in this disclosure.

In one example, an RRH/TRP corresponds to a CSI-RS resource group, where a group comprises one or multiple NZP CSI-RS resources. A UE is configured with $K \geq N_{TRP} = N_{RRH} \geq 1$ non-zero-power (NZP) CSI-RS resources, and a CSI reporting is configured to be across multiple CSI-RS resources from resource groups. This is similar to Class B, K>1 configuration in Rel. 14 LTE. The K NZP CSI-RS resources can belong to a CSI-RS resource set or multiple CSI-RS resource sets (e.g., K resource sets each comprising one CSI-RS resource). The details are as explained earlier in this disclosure. In particular, the K CSI-RS resources can be partitioned into $N_{RRH}$ resource groups. The information about the resource grouping can be provided together with the CSI-RS resource setting/configuration, or with the CSI reporting setting/configuration, or with the CSI-RS resource configuration.

In one example, an RRH/TRP corresponds to a subset (or a group) of CSI-RS ports. A UE is configured with at least one NZP CSI-RS resource comprising (or associated with) CSI-RS ports that can be grouped (or partitioned) multiple subsets/groups/parts of antenna ports, each corresponding to (or constituting) an RRH/TRP. The information about the subsets of ports or grouping of ports can be provided together with the CSI-RS resource setting/configuration, or with the CSI reporting setting/configuration, or with the CSI-RS resource configuration.

In one example, an RRH/TRP corresponds to various examples disclosed herein depending on a configuration. For example, this configuration can be explicit via a parameter (e.g., an RRC parameter). Or, it can be implicit.

In one example, when implicit, it could be based on the value of K. For example, when K>1 CSI-RS resources, an RRH corresponds to various examples disclosed herein, and when K=1 CSI-RS resource, an RRH corresponds to other examples disclosed herein.

In another example, the configuration could be based on the configured codebook. For example, an RRH corresponds to a CSI-RS resource or resource group when the codebook corresponds to a decoupled codebook (modular or separate codebook for each RRH), and an RRH corresponds to a subset (or a group) of CSI-RS ports when codebook corresponds to a coupled (joint or coherent) codebook (one joint codebook across RRHs/TRPs).

In one example, when RRH/TRP maps (or corresponds to) a CSI-RS resource or resource group, and a UE can select a subset of RRHs/TRPs (resources or resource groups) and report the CSI for the selected RRHs/TRPs (resources or resource groups), the selected RRHs/TRPs can be reported via an indicator. For example, the indicator can be a CRI or a PMI (component) or a new indicator.

In one example, when RRH maps (or corresponds to) a CSI-RS port, and a UE can select a subset of RRHs/TRPs (port groups) and report the CSI for the selected RRHs/TRPs (port groups), the selected RRHs/TRPs can be reported via an indicator. For example, the indicator can be a CRI or a PMI (component) or a new indicator.

In one example, when multiple (K>1) CSI-RS resources are configured for $N_{RRH}$ RRHs/TRPs, a decoupled (modular) codebook is used/configured, and when a single (K=1) CSI-RS resource for $N_{RRH}$ RRHs/TRPs, a joint codebook is used/configured.

As described in U.S. Pat. No. 10,659,118, issued May 19, 2020, and entitled "Method and Apparatus for Explicit CSI Reporting in Advanced Wireless Communication Systems," which is incorporated herein by reference in its entirety, a UE is configured with high-resolution (e.g., Type II) CSI reporting in which the linear combination-based Type II CSI reporting framework is extended to include a frequency dimension in addition to the first and second antenna port dimensions.

Figure 14:
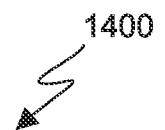
FIG. 14 illustrates a 3D grid of oversampled DFT beams according to embodiments of the present disclosure.

FIG. 14 illustrates a 3D grid of oversampled DFT beams 1400 according to embodiments of the present disclosure. The embodiment of the 3D grid of oversampled DFT beams 1400 illustrated in FIG. 14 is for illustration only. FIG. 14 does not limit the scope of this disclosure to any particular implementation of the 3D grid of oversampled DFT beams.

As illustrated, FIG. 14 shows a 3D grid 1400 of the oversampled DFT beams (1st port dim., 2nd port dim., freq. dim.) in which:

a 1st dimension is associated with the 1st port dimension, a 2nd dimension is associated with the 2nd port dimension, and a 3rd dimension is associated with the frequency dimension.

The basis sets for $1^{st}$ and $2^{nd}$ port domain representation are oversampled DFT codebooks of length-$N_1$ and length-$N_2$, respectively, and with oversampling factors $O_1$ and $O_2$, respectively. Likewise, the basis set for frequency domain representation (i.e., 3rd dimension) is an oversampled DFT codebook of length-$N_3$ and with oversampling factor $O_3$. In one example, $O_1=O_2=O_3=4$. In one example, $O_1=O_2=4$ and $O_3=1$. In another example, the oversampling factors $O_i$ belongs to $\{2, 4, 8\}$. In yet another example, at least one of $O_1$, $O_2$, and $O_3$ is higher layer configured (via RRC signaling).

As explained in Section 5.2.2.2.5 of REF 8, a UE is configured with higher layer parameter codebookType set to 'typeII-r16' for an enhanced Type II CSI reporting in which the pre-coders for all SBs and for a given layer l=1, . . . , v, where v is the associated RI value, is given by either:

$$W^l = AC_lB^H = [a_0\, a_1\, \ldots\, a_{L-1}]\begin{bmatrix} c_{l,0,0} & c_{l,0,1} & \cdots & c_{l,0,M-1} \\ c_{l,1,0} & c_{l,1,1} & \cdots & c_{l,1,M-1} \\ \vdots & \vdots & \vdots & \vdots \\ c_{l,L-1,0} & c_{l,L-1,1} & \cdots & c_{l,L-1,M-1} \end{bmatrix}$$ (Eq. 1)

$$[b_0\, b_1\, \ldots\, b_{M-1}]^H = \sum_{f=0}^{M-1}\sum_{i=0}^{L-1} c_{l,i,f}(a_i b_f^H) =$$

$$\sum_{i=0}^{L-1}\sum_{f=0}^{M-1} c_{l,i,f}(a_i b_f^H),$$

or $$W^l = \begin{bmatrix} A & 0 \\ 0 & A \end{bmatrix} C_l B^H = \begin{bmatrix} a_0 a_1 \ldots a_{L-1} & 0 \\ 0 & a_0 a_1 \ldots a_{L-1} \end{bmatrix}$$ (Eq. 2)

$$\begin{bmatrix} c_{l,0,0} & c_{l,0,1} & \cdots & c_{l,0,M-1} \\ c_{l,1,0} & c_{l,1,1} & \cdots & c_{l,1,M-1} \\ \vdots & \vdots & \vdots & \vdots \\ c_{l,L-1,0} & c_{l,L-1,1} & \cdots & c_{l,L-1,M-1} \end{bmatrix}[b_0\, b_1\, \ldots b_{M-1}]^H =$$

$$\begin{bmatrix} \sum_{f=0}^{M-1}\sum_{i=0}^{L-1} c_{l,i,f}(a_i b_f^H) \\ \sum_{f=0}^{M-1}\sum_{i=0}^{L-1} c_{l,i+L,f}(a_i b_f^H) \end{bmatrix},$$

where:

$N_1$ is a number of antenna ports in a first antenna port dimension (having the same antenna polarization), $N_2$ is a number of antenna ports in a second antenna port dimension (having the same antenna polarization), $P_{CSI\text{-}RS}$ is a number of CSI-RS ports configured to the UE, $N_3$ is a number of SB s for PMI reporting or number of FD units or number of FD components (that comprise the CSI reporting band) or a total number of precoding matrices indicated by the PMI (one for each FD unit/component), $a_i$ is a $2N_1N_2\times1$ (Eq. 1) or $N_1N_2\times1$ (Eq. 2) column vector, or $a_i$ is a $P_{CSIRS}\times1$ (Eq. 1) or $$\frac{P_{CSIRS}}{2}\times 1$$

port selection column vector, where a port selection vector is a defined as a vector which contains a value of 1 in one element and zeros elsewhere $b_f$ is a $N_3\times1$ column vector, $c_{l,i,f}$ is a complex coefficient.

In a variation, when the UE reports a subset K<2LM coefficients (where K is either fixed, configured by the gNB or reported by the UE), then the coefficient $c_{l,i,f}$ in precoder equations Eq. 1 or Eq. 2 is replaced with $x_{l,i,f}\times c_{l,i,f}$ where:

$x_{l,i,f}=1$ if the coefficient $c_{l,i,f}$ is reported by the UE according to some embodiments of this disclosure.

$x_{l,i,f}=0$ otherwise (i.e., $c_{l,i,f}$ is not reported by the UE).

The indication whether $x_{l,i,f}=1$ or 0 is according to some embodiments of this disclosure. For example, it can be via a bitmap.

In a variation, the precoder equations Eq. 1 or Eq. 2 are respectively generalized to:

$$W^l = \sum_{i=0}^{L-1}\sum_{f=0}^{M_i-1} c_{l,i,f}(a_i b_{i,f}^H),$$ (Eq. 3)

and $$W^l = \begin{bmatrix} \sum_{i=0}^{L-1}\sum_{f=0}^{M_i-1} c_{l,i,f}(a_i b_{i,f}^H) \\ \sum_{i=0}^{L-1}\sum_{f=0}^{M_i-1} c_{l,i+L,f}(a_i b_{i,f}^H) \end{bmatrix},$$ (Eq. 4)

where for a given i, the number of basis vectors is $M_i$ and the corresponding basis vectors are $\{b_{i,f}\}$. Note that $M_i$ is the number of coefficients $c_{l,i,f}$ reported by the UE for a given i, where $M_i\leq M$ (where $\{M_i\}$ or $\Sigma M_i$ is either fixed, configured by the gNB or reported by the UE). The columns of $W^l$ are normalized to norm one. For rank R or R layers (v=R), the pre-coding matrix is given by $$W^{(R)} = \frac{1}{\sqrt{R}}[W^1\ W^2\ \ldots\ W^R].$$

Eq. 2 is assumed in the rest of the disclosure. The embodiments of the disclosure, however, are general and are also application to Eq. 1, Eq. 3, and Eq. 4.

Here $$L \leq \frac{P_{CSI\text{-}RS}}{2}$$

and $M\leq N_3$. If $$L = \frac{P_{CSI\text{-}RS}}{2},$$

then A is an identity matrix, and hence not reported. Likewise, if $M=N_3$, then B is an identity matrix, and hence not reported. Assuming $M<N_3$, in an example, to report columns of B, the oversampled DFT codebook is used. For instance, $b_f=w_f$, where the quantity $w_f$ is given by:

$$w_f = \left[ 1 \quad e^{j\frac{2\pi n_{3,l}^{(f)}}{O_3 N_3}} \quad e^{j\frac{2\pi \cdot 2n_{3,l}^{(f)}}{O_3 N_3}} \quad \ldots \quad e^{j\frac{2\pi \cdot (N_3-1)n_{3,l}^{(f)}}{O_3 N_3}} \right]^T .$$

When $O_3=1$, the FD basis vector for layer $l \in \{1, \ldots, v\}$ (where v is the RI or rank value) is given by:

$$w_f = \left[ y_{0,l}^{(f)} \quad y_{1,l}^{(f)} \quad \ldots \quad y_{N_3-1,l}^{(f)} \right]^T ,$$

where $$y_{t,l}^{(f)} = e^{j\frac{2\pi t n_{3,l}^{(f)}}{N_3}}$$

and $$n_{3,l} = \left[ n_{3,l}^{(0)}, \ldots, n_{3,l}^{(M-1)} \right] \text{ where } n_{3,l}^{(f)} \in \{0, 1, \ldots, N_3 - 1\}.$$

In another example, discrete cosine transform DCT basis is used to construct/report basis B for the $3^{rd}$ dimension. The m-th column of the DCT compression matrix is simply given by:

$$[w_f]_{nm} = \begin{cases} \dfrac{1}{\sqrt{K}}, & n = 0 \\ \sqrt{\dfrac{2}{K}} \cos\dfrac{\pi(2m+1)n}{2K}, & n = 1, \ldots K-1 \end{cases},$$

and $K=N_3$, and $m=0, \ldots, N_3-1$.

Since DCT is applied to real valued coefficients, the DCT is applied to the real and imaginary components (of the channel or channel eigenvectors) separately. Alternatively, the DCT is applied to the magnitude and phase components (of the channel or channel eigenvectors) separately. The use of DFT or DCT basis is for illustration purpose only. The disclosure is applicable to any other basis vectors to construct/report A and B.

On a high level, a precoder $W^l$ can be described as follows:

$$W = A_l C_l B_l^H = W_1 \tilde{W}_2 W_f^H, \tag{Eq. 5}$$

where $A=W_1$ corresponds to the Rel. 15 $W_1$ in Type II CSI codebook (REF 8), and $B=W_f$.

The $C_l=\tilde{W}_2$ matrix includes all the required linear combination coefficients (e.g., amplitude and phase or real or imaginary). Each reported coefficient ($c_{l,i,f}=p_{l,i,f}\phi_{l,i,f}$) in $\tilde{W}_2$ is quantized as amplitude coefficient ($p_{l,i,f}$) and phase coefficient ($\phi_{l,i,f}$). In one example, the amplitude coefficient ($p_{l,i,f}$) is reported using a A-bit amplitude codebook where A belongs to $\{2, 3, 4\}$. If multiple values for A are supported, then one value is configured via higher layer signalling. In another example, the amplitude coefficient ($p_{l,i,f}$) is reported as $$p_{l,i,f} = p_{l,i,f}^{(1)} p_{l,i,f}^{(2)}$$

where:

$$p_{l,i,f}^{(1)}$$

is a reference or first amplitude which is reported using a A1-bit amplitude codebook where A1 belongs to $\{2, 3, 4\}$, and $$p_{l,i,f}^{(2)}$$

is a differential or second amplitude which is reported using a A2-bit amplitude codebook where A2$\leq$A1 belongs to $\{2, 3, 4\}$.

The above-mentioned framework (Eq. 5) represents the precoding-matrices for multiple ($N_3$) FD units using a linear combination (double sum) over 2 L SD beams and $M_v$ FD beams. This framework can also be used to represent the precoding-matrices in time domain (TD) by replacing the FD basis matrix $W_f$ with a TD basis matrix $W_t$, wherein the columns of $W_t$ comprises $M_v$ TD beams that represent some form of delays or channel tap locations. Hence, a precoder $W^l$ can be described as follows:

$$W = A_l C_l B_l^H = W_1 \tilde{W}_2 W_t^H, \tag{Eq. 5A}$$

In one example, the $M_v$ TD beams (representing delays or channel tap locations) are selected from a set of $N_3$ TD beams, i.e., $N_3$ corresponds to the maximum number of TD units, where each TD unit corresponds to a delay or channel tap location. In one example, a TD beam corresponds to a single delay or channel tap location. In another example, a TD beam corresponds to multiple delays or channel tap locations. In another example, a TD beam corresponds to a combination of multiple delays or channel tap locations.

Various embodiments of the present disclosure are applicable to both space-frequency (Eq. 5) and space-time (Eq. 5A) frameworks.

The abovementioned framework for CSI reporting based on space-frequency compression (Eq. 5) or space-time compression (Eq. 5A) frameworks can be extended in two directions:

time or Doppler domain compression (e.g., for moderate to high mobility UEs) and joint transmission across multiple RRHs/TRPs/TRP (e.g., for a DMIMO or multiple TRP systems).

Figure 15:
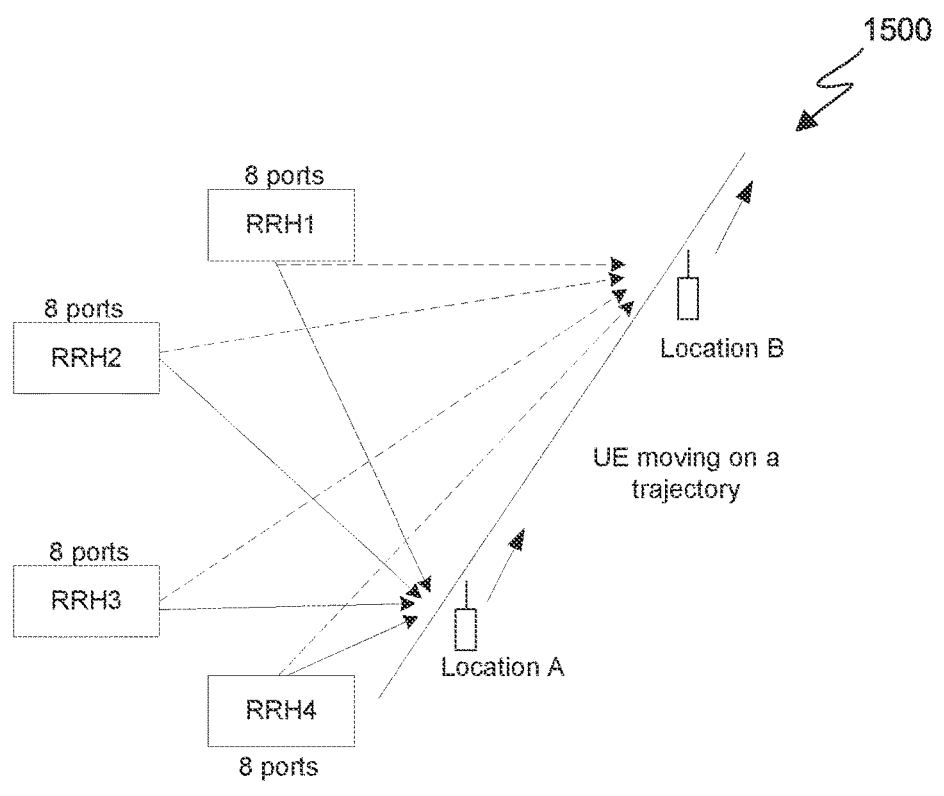
FIG. 15 illustrates an example of a UE moving on a trajectory located in a distributed MIMO (DMIMO) system according to embodiments of the present disclosure.

FIG. 15 illustrates an example 1500 of a UE moving on a trajectory located in a distributed MIMO (DMIMO) system according to embodiments of the present disclosure. The embodiment of the example 1500 of a UE moving on a trajectory located in a DMIMO system illustrated in FIG. 15 is for illustration only. FIG. 15 does not limit the scope of this disclosure to any particular implementation of the example 1500 of a UE moving on a trajectory located in a DMIMO system.

As illustrated in FIG. 15, while the UE moves from a location A to another location B at high speed (e.g., 60 kmph), the UE measures the channel and the interference (e.g., via NZP CSI-RS resources and CSI-IM resources, respectively), uses them to determine/report CSI considering CJT from multiple RRHs/TRPs. The reported CSI can be based on a codebook, which includes components considering both multiple RRHs/TRPs, and time-/Doppler-domain channel compression.

For purposes of the present disclosure, the notation $N_{TRP}$, $N_{RRH}$, and K are used interchangeably for the number of NZP CSI-RS resources (configured in one CSI-RS resource set) or number of TRPs/RRHs. Hence, $K=N_{TRP}=N_{RRH}$.

In one embodiment, a UE is configured with a CSI report for $Z \geq 1$ TRPs (across or associated with Z NZP CSI-RS resources) based on a codebook that includes components, SD and FD bases (for compression), similar to Rel. 16 enhanced Type II codebook (5.2.2.2.5, 38.214) or rel. 17 further enhanced Type II port selection codebook (5.2.2.2.7, 38.214). The value of Z can be equal to $N_{TRP}$, the number of TRPs or NZP CSI-RS resources configured for the CSI report. Or, the value of $1 \leq Z \leq N_{TRP}$, where Z can be reported by the UE (e.g., via the CSI report) or signaled to the UE (e.g., via MACE CE or/and DCI). In one example, $N_{TRP} \in \{1, 2, 3, 4\}$. For example, the selection of Z CSI-RS resources can be reported with an $N_{TRP}$-bit bitmap, $b_{N_{TRP}}, \ldots, b_1$, where the CSI-RS resources are mapped from bit $b_1$ to bit $b_{N_{TRP}}$ by their ordering in the resource set and the first of the Z selected CSI-RS resources corresponds to the nonzero bit with lowest index.

For purposes of the present disclosure, the notation N and Z are used interchangeably for the number of selected NZP CSI-RS resources or number of selected TRPs/RRHs for the CSI report. Hence, N=Z.

The precoding matrices indicated by the PMI are determined from $$\sum_{r=1}^{N} L_{\sigma_r} + M_v$$

vectors, where $\{\sigma_1, \ldots, \sigma_N\}$ are the indices of the N selected CSI-RS resources in increasing order, such that $1 \leq \sigma_1 < \ldots < \sigma_N \leq N_{TRP}$, and $\{L_{\sigma_1}, \ldots, L_{\sigma_N}\}$ are the corresponding values from the configured/selected combination of $\{L_1, \ldots, L_{N_{TRP}}\}$. For brevity of notation, $L_{\sigma_r}$ is denoted as $L_r$ in the rest of the disclosure.

At least one of the following embodiments is used/configured.

In one embodiment, the UE is configured to report a CSI for $N \geq 1$ TRPs/RRHs/TRPs (where TRP corresponds to a NZP CSI-RS resource or a subset of CSI-RS antenna ports within a NZP CSI-RS resource), the CSI determined based on a codebook comprising components: (A) two separate basis matrices $W_1$, $W_f$ for SD and FD compression, respectively, and (B) coefficients $\tilde{W}_2$. In one example, the codebook can be configured via one higher layer parameter codebookType set to 'typeII-cjt-mode2-r18', or via two higher layer parameters codebookType set to ' typeII-cjt-r18' and codebookMode set to 'Mode2'.

In particular, the precoder for layer 1 is given by:

$$W_l = A_l C_l B_l^H = \frac{1}{\gamma} W_1 \tilde{W}_2 W_f^H$$

Here, $W_1$ is a $P_{CSIRS} \times N_3$ matrix whose columns are precoding vectors for $N_3$ FD units, $W_1$ is a block diagonal matrix $$\begin{bmatrix} W_{1,1} & 0 & 0 & 0 \\ 0 & \ddots & 0 & 0 \\ 0 & 0 & W_{1,2N} \\ 0 & 0 \end{bmatrix}$$

comprising 2N blocks, where $(2(r-1)+1,2r)$-th blocks are associated with two antenna polarizations (two halves or groups of CSI-RS antenna ports) of TRP r and each of two blocks is a $$\frac{P_{CSIRS,r}}{2} \times L_r$$

SD basis or port selection matrix (similar to Rel. 16 enhanced Type II codebook or Rel. 17 enhanced Type II codebook), or $\tilde{W}_2$ is a $2L \times M_v$ coefficients matrix, where $$L = \sum_{r=1}^{N} L_r,$$

and $W_f$ is a $N_3 \times M_v$ basis matrix for FD basis matrix (similar to Rel. 16 enhanced Type II codebook). The columns of $W_f$ comprises vectors $$g_{f,l} = [y_{0,l}^{(f)} \ y_{1,l}^{(f)} \ \cdots \ y_{N_3-1,l}^{(f)}],$$

and $\gamma$ is a normalization factor.

In one example, for each $r=1, \ldots, N$, $$\begin{bmatrix} W_{1,2(r-1)+1} & 0 \\ 0 & W_{1,2r} \end{bmatrix} = \begin{bmatrix} B_r & 0 \\ 0 & B_r \end{bmatrix}$$

is a $P_{CSIRS,r} \times 2L_r$ SD basis matrix, where the $L_r$ SD basis vectors comprising columns of $B_r$ are determined the same way as in Rel. 15/16 Type II codebooks (cf. 5.2.2.2.3, REF 8).

In one example, the $M_v$ FD basis vectors, $$g_{f,l} = [y_{0,l}^{(f)} \ y_{1,l}^{(f)} \ \cdots \ y_{N_3-1,l}^{(f)}]^T, f = 0, 1, \ldots, M_v - 1,$$

are identified by $n_{3,l}$ $(l=1, \ldots, v)$ where:

$$n_{3,l} = [n_{3,l}^{(0)}, \ldots, n_{3,l}^{(M_v-1)}]$$

$$n_{3,l}^{(f)} \in \{0, 1, \ldots, N_3 - 1\}$$

29

The vector $$y_{t,l} = \left[\, y_{t,l}^{(0)} \quad y_{t,l}^{(1)} \quad \ldots \quad y_{t,l}^{(M_v-1)} \,\right]$$

comprises entries of FD basis vectors with FD index t={0, 1, . . . , $N_3$−1}, which is an (FD) index associated with the precoding matrix.

In one example, the FD basis vectors are orthogonal DFT vectors, and $$y_{t,l}^{(f)} = e^{j \frac{2\pi t m_{3,l}^{(f)}}{N_3}}.$$

In one example, the FD basis vectors are oversampled (or rotated) orthogonal DFT vectors with the oversampling (rotation) factor $O_3$, and $$y_{t,l}^{(f)} = e^{j \frac{2\pi t m_{3,l}^{(f)}}{O_3 N_3}},$$

and the $M_v$ FD basis vectors are also identified by the rotation index $q_{3,l} \in \{0, 1, . . . , O_3-1\}$. In one example, $O_3$ is fixed (e.g., 1 or 4), or configured (e.g., via RRC), or reported by the UE. In one example, the rotation factor is layer-common (one value for all layers), i.e., $q_{3,l}=q_3$.

In one example, each coefficient $x_{l,r,i,f}$ corresponding to row i, column f of the $W_{2,l,r}$ for layer l and TRP (or CSI-RS resource) r can be expressed as $$x_{l,r,i,f} = p_{l,r,\lfloor \frac{i}{L} \rfloor}^{(1)} p_{l,r,i,f}^{(2)} \varphi_{l,r,i,f}$$

similar to Rel. 16 enhanced Type II codebook (cf. Section 5.2.2.2.5, REF 8).

In one embodiment, the UE is configured to report a CSI for N≥1 RRHs/TRPs (where TRP corresponds to a NZP CSI-RS resource or a subset of CSI-RS antenna ports within a NZP CSI-RS resource), the CSI determined based on a codebook comprising components: (A) two separate basis matrices $W_1$, $W_f$ for SD and FD compression, respectively, and (B) coefficients $\tilde{W}_2$. In one example, the codebook can be configured via one higher layer parameter codebookType set to 'typeII-cjt-mode1-r18', or via two higher layer parameters codebookType set to ' typeII-cjt-r18' and codebookMode set to 'Mode1'.

In particular, the precoder for layer l is given by:

$$W_l = A_l C_l B_l^H = \frac{1}{\gamma} W_1 \tilde{W}_2 W_f^H = \frac{1}{\gamma} \begin{bmatrix} W_{1,1} \tilde{W}_{2,1} W_{f,1}^H \\ \vdots \\ W_{1,N} \tilde{W}_{2,N} W_{f,N}^H \end{bmatrix}$$

Here,
$W_l$ is a $P_{CSIRS} \times N_3$ matrix whose columns are precoding vectors for $N_3$ FD units,
$W_{1,r}$ is a block diagonal matrix $$\begin{bmatrix} B_r & 0 \\ 0 & B_r \end{bmatrix}$$

30 comprising 2 blocks that are associated with two antenna polarizations (two halves or groups of CSI-RS antenna ports) of TRP r and each of two blocks is a $$\frac{P_{CSIRS,r}}{2} \times L_r$$

SD basis or port selection matrix (similar to Rel. 16 enhanced Type II codebook or Rel. 17 enhanced Type II codebook), or $\tilde{W}_{2,r}$ is a $2L_r \times M_{v,r}$ coefficients matrix, and $W_{f,r}$ is a $N_3 \times M_{v,r}$ basis matrix for FD basis matrix (similar to Rel. 16 enhanced Type II codebook). The columns of $W_{f,r}$ comprises vectors $$g_{r,f,l} = \left[\, y_{0,l}^{(r,f)} \quad y_{1,l}^{(r,f)} \quad \ldots \quad y_{N_3-1,l}^{(r,f)} \,\right]$$

or $$g_{f,l} = \left[\, y_{0,l}^{(f_r)} \quad y_{1,l}^{(f_r)} \quad \ldots \quad y_{N_3-1,l}^{(f_r)} \,\right],$$

and
$\gamma$ is a normalization factor.

In one example, for each r=1, . . . , N, $$W_{1,r} = \begin{bmatrix} B_r & 0 \\ 0 & B_r \end{bmatrix}$$

is a $P_{CSIRS,r} \times 2L_r$ SD basis matrix, where the $L_r$ SD basis vectors comprising columns of $B_r$ are determined the same way as in Rel. 15/16 Type II codebooks (cf. 5.2.2.2.3, REF 8).

In one example, the $M_{v,r}$ FD basis vectors, $$g_{r,f,l} = \left[\, y_{0,l}^{(r,f)} \quad y_{1,l}^{(r,f)} \quad \ldots \quad y_{N_3-1,l}^{(r,f)} \,\right]^T, f = 0, 1, \ldots, M_{v,r}-1,$$

are identified by $n_{3,l,r}$ (l=1, . . . , v) where:

$$n_{3,l,r} = \left[\, n_{3,l,r}^{(0)}, \ldots, n_{3,l,r}^{(M_{v,r}-1)} \,\right]$$

$$n_{3,l,r}^{(f)} \in \{0, 1, \ldots, N_3-1\}$$

The vector $$y_{t,l,r} = \left[\, y_{t,l,r}^{(0)} \quad y_{t,l,r}^{(1)} \quad \ldots \quad y_{t,l,r}^{(M_{v,r}-1)} \,\right]$$

comprises entries of FD basis vectors with FD index t={0, 1, . . . , $N_3$−1}, which is an (FD) index associated with the precoding matrix.

In one example, the FD basis vectors are orthogonal DFT vectors, and $$y_{t,l,r}^{(f)} = e^{j\frac{2\pi t n_{3,l,r}^{(f)}}{N_3}}.$$

In one example, the FD basis vectors are oversampled (or rotated) orthogonal DFT vectors with the oversampling (rotation) factor $O_3$, and $$y_{t,l,r}^{(f)} = e^{j\frac{2\pi t n_{3,l,r}^{(f)}}{O_3 N_3}},$$

and the $M_{v,r}$ FD basis vectors are also identified by the rotation index $q_{3,l,r} \in \{0, 1, \ldots, O_3-1\}$. In one example, $O_3$ is fixed (e.g., 1 or 4), or configured (e.g., via RRC), or reported by the UE. In one example, the rotation factor is layer-common (one value for all layers), i.e., $q_{3,l,r}=q_{3,r}$.

In one example, $W_{f,r}=\mathrm{diag}(O_r)W_f$, where $$O_r = \begin{bmatrix} 1 & e^{j\frac{2\pi\psi_r}{N_3}} & e^{j\frac{2\pi 2\psi_r}{N_3}} & \ldots, & e^{j\frac{2\pi(N_3-1)\psi_r}{N_3}} \end{bmatrix}$$

is a phase offset vector with phase offset value $\psi_r$. Hence, the subscript r can be dropped (removed) from $$M_{v,r}, n_{3,l,r}, y_{0,l}^{(r,f)}, n_{3,l,r}^{(f)}, \text{ and } q_{3,l,r}.$$

In one example, corresponding to row i, column f of the $W_{2,l,r}$ for layer l and TRP (or CSI-RS resource)

$$rx_{l,r,i,f} = p_{l,r,\lfloor\frac{i}{L}\rfloor}^{(1)} p_{l,r,i,f}^{(2)} \varphi_{l,r,i,f}$$

similar to Rel. 16 enhanced Type II codebook (cf. Section 5.2.2.2.5, REF 8).

In one embodiment, a UE is configured with a CSI reporting based on a codebook which is one of the two codebooks described in various embodiments disclosed herein. In one example, this configuration can be via a higher layer parameter CodeookMode.

In one embodiment, which may be a variation of other embodiments disclosed herein, wherein the SD basis selection matrix is replaced with a SD port selection matrix. In one example, the codebook in this case can be configured via one higher layer parameter codebookType set to 'typeII-PortSelection-cjt-model-r18', or via two higher layer parameters codebookType set to 'typeII-PortSelection-cjt-r18" and codebookMode set to 'Mode2'.

In one example, $$v_{m_1^{(r,i)}, m_2^{(r,i)}}$$

is replaced with $v_{i_{1,1,r}, d+i}$ (cf. Rel. 16 Type II codebook). For TRP r, the antenna ports per polarization are selected by the index $i_{1,1}=[i_{1,1,1} \ldots i_{1,1,N}]$, where:

$$i_{1,1,r} \in \left\{0, 1, \ldots, \left\lceil \frac{P_{CSI-RS,r}}{2d} \right\rceil\right\}.$$

In one example, $$v_{m_1^{(r,i)}, m_2^{(r,i)}}$$

is replaced with $v_{m}^{(r,i)}$ (cf. Rel. 17 Type II codebook).

For TRP r, $K_{1,r}=2L_r$ ports are selected from $P_{CSI-RS}$, r ports based on $L_r$ vectors, $v_{m}^{(r,i)}$, i=0, 1, ..., $L_r-1$, which are identified by:

$$m = \begin{bmatrix} m^{(1)} \ldots m^{(N)} \end{bmatrix}$$

$$m^{(r)} = \begin{bmatrix} m^{(r,0)} \ldots m^{(r,L-1)} \end{bmatrix}$$

$$m^{(r,i)} \in \left\{0, 1, \ldots, \frac{P_{CSI-RS}}{2} - 1\right\}$$

which are indicated by the index $i_{1,2}=[i_{1,2,1} \ldots i_{1,2,N}]$, where:

$$i_{1,2,r} \in \left\{0, 1, \ldots, \binom{P_{CSI-RS,r}/2}{L_r} - 1\right\}.$$

In one embodiment, which may be a variation of other embodiments disclosed herein, wherein the SD basis selection matrix is replaced with a SD port selection matrix. In one example, the codebook in this case can be configured via one higher layer parameter codebookType set to 'typeII-PortSelection-cjt-model-r18', or via two higher layer parameters codebookType set to 'typeII-PortSelection-cjt-r18" and codebookMode set to 'Mode1'.

In one example, $$v_{m_1^{(r,i)}, m_2^{(r,i)}}$$

is replaced with $v_{i_{1,1,r}, d+i}$ (cf. Rel. 16 Type II codebook). For TRP r, the antenna ports per polarization are selected by the index $i_{1,1}=[i_{1,1,1} \ldots i_{1,1,N}]$, where:

$$i_{1,1,r} \in \left\{0, 1, \ldots, \left\lceil \frac{P_{CSI-RS,r}}{2d} \right\rceil\right\}.$$

In one example, $$v_{m_1^{(r,i)}, m_2^{(r,i)}}$$

is replaced with $v_{m}^{(r,i)}$ (cf. Rel. 17 Type II codebook).

For TRP r, $K_{1,r}=2L_r$ ports are selected from $P_{CSI-RS}$, r ports based on $L_r$ vectors, $v_{m}^{(r,i)}$, i=0, 1, ..., $L_r-1$, which are identified by:

$$m = \begin{bmatrix} m^{(1)} \ldots m^{(N)} \end{bmatrix}$$

$$m^{(r)} = \begin{bmatrix} m^{(r,0)} \ldots m^{(r,L-1)} \end{bmatrix}$$

$$m^{(r,i)} \in \left\{0, 1, \ldots, \frac{P_{CSI-RS}}{2} - 1\right\}$$

33 which are indicated by the index $i_{1,2}=[i_{1,2,1} \ldots i_{1,2,N}]$, where:

$$i_{1,2,r} \in \left\{0, 1, \ldots, \left(\frac{P_{CSI\text{-}RS,r}/2}{L_r}\right) - 1\right\}.$$

In one embodiment, which may be a variation of other embodiments disclosed herein, wherein the SD basis selection matrix is replaced with a SD port selection matrix.
In one example, $$v_{m_1^{(r,i)}, m_2^{(r,i)}}$$

is replaced with $v_{i_{1,1,r}d+1}$ (cf. Rel. 16 Type II codebook). For TRP r, the antenna ports per polarization are selected by the index $i_{1,1}=[i_{1,1,1} \ldots i_{1,1,N}]$, where:

$$i_{1,1,r} \in \left\{0, 1, \ldots, \left\lceil\frac{P_{CSI\text{-}RS,r}}{2d}\right\rceil\right\}.$$

In one example, $$v_{m_1^{(r,i)}, m_2^{(r,i)}}$$

is replaced with $v_{m^{(r,i)}}$ (cf. Rel. 17 Type II codebook).
For TRP r, $K_{1,r}=2L$, ports are selected from $P_{CSI\text{-}RS}$, r ports based on $L_r$ vectors, $v_{m^{(r,i)}}$, i=0, 1, ..., $L_r$−1, which are identified by:

$$m = [m^{(1)} \ldots m^{(N)}]$$
$$m^{(r)} = [m^{(r,0)} \ldots m^{(r,L-1)}]$$
$$m^{(r,i)} \in \left\{0, 1, \ldots, \frac{P_{CSI\text{-}RS}}{2} - 1\right\}$$

which are indicated by the index $i_{1,2}=[i_{1,2,1} \ldots i_{1,2,N}]$, where:

$$i_{1,2,r} \in \left\{0, 1, \ldots, \left(\frac{P_{CSI\text{-}RS,r}/2}{L_r}\right) - 1\right\}.$$

In one embodiment, a UE is configured with a CSI report for Z≥1 TRPs or CSI-RS resources (from a total of $N_{TRP}$ NZP CSI-RS resources) based on a codebook, where the codebook is configured according to at least one of the embodiments disclosed herein. In addition, the FD basis vectors comprising columns of $W_f$ can be determined/reported according to at least one of the following embodiments.
Let $M_{v,r}$ be the number of FD basis vectors determined/reported for rank (number of layers) v and TRP (CSI-RS resource) index r∈{1, . . . , Z}.
In one example, when the number of FD basis vectors is the same for all rank values and can be different across TRPs (CSI-RS resources), $M_{v,r}=M_r$.
In one example, when the number of FD basis vectors is the same across TRPs (CSI-RS resources) and can be different across rank values and, $M_{v,r}=M_v$.

In one example, when the number of FD basis vectors is the same for all rank values and also across TRPs (CSI-RS resources), $M_{v,r}=M$.
In one embodiment, a UE can be configured to report M or $M_r$ FD basis vectors in one-step from a total of $N_3$ basis vectors, where the M or $M_r$ FD basis vectors are common for all layers l∈{1, . . . , v} of a rank v CSI reporting. The total of $N_3$ basis vectors correspond to orthogonal DFT basis vectors, each length $N_3 \times 1$.
In one example, as described in embodiment I.1/I.4, one common/joint M FD basis vectors are determined/reported, which is used across all TRPs or CSI-RS resources, and across all layers.
In one example, the M FD basis vectors, $$g_f = [y_0^{(f)} \; y_1^{(f)} \; \ldots \; y_{N_3-1}^{(f)}]^T, f = 0, 1, \ldots, M-1,$$

are identified by $n_3$ where:

$$n_3 = [n_3^{(0)}, \ldots, n_3^{(M-1)}]$$
$$n_3^{(f)} \in \{0, 1, \ldots, N_3 - 1\}$$

which are indicated by means of the index $i_{1,6}$ (for M>1), where $i_{1,6} \in \{0, 1, \ldots, X-1\}$. The UE reports $i_{1,6}$ via the PMI included in the CSI report. In one example, $$X = \binom{N_3 - 1}{M - 1}$$

when one of the FD basis vectors is fixed, $$e.g., n_3^{(0)} = 0.$$

In one example, $$X = \binom{N_3}{M}.$$

The payload for $i_{1,6}$ reporting is $\lceil \log_2 X \rceil$ bits.
In one example, as described in various embodiments disclosed herein, $M_r$ FD basis vectors are determined/reported for each TRP (CSI-RS resource), and for a TRP, the reported $M_r$ FD basis vectors are same/common for all layers.
In one example, the $M_r$ FD basis vectors, $$g_{f,r} = [y_{0,r}^{(f)} \; y_{1,r}^{(f)} \; \ldots \; y_{N_3-1,r}^{(f)}]^T, f = 0, 1, \ldots, M_r-1,$$

are identified by $n_{3,r}$ (r=1, . . . , Z) where:

$$n_{3,r} = [n_{3,r}^{(0)}, \ldots, n_{3,r}^{(M_r-1)}]$$
$$n_{3,r}^{(f)} \in \{0, 1, \ldots, N_3 - 1\}$$

which are indicated by means of the indices $i_{1,6,r}$ (for $M_r > 1$), where $i_{1,6,r} \in \{0, 1, \ldots, X-1\}$. The UE reports $i_{1,6,r}$ (r=1, . . . , Z) via the PMI included in the CSI report. In one example, $$X = \binom{N_3 - 1}{M_r - 1}$$

when one of the FD basis vectors is fixed, $$\text{e.g., } n_{3,r}^{(0)} = 0.$$

In one example, $$X = \binom{N_3}{M_r}.$$

The payload for $i_{1,6,r}$ reporting is $\lceil \log_2 X \rceil$ bits.

In one embodiment, a UE can be configured to report $M_v$ or $M_{v,r}$ FD basis vectors in one-step from a total of $N_3$ basis vectors separately (independently) for each layer $l \in \{1, \ldots, v\}$ of a rank v CSI reporting.

In one example, as described in various embodiments disclosed herein, one common/joint $M_v$ FD basis vectors are determined/reported across all TRPs or CSI-RS resources, and for rank>1, the $M_v$ FD basis vectors are determined/reported independently for each layer l=1, . . . , v.

In one example, the $M_v$ FD basis vectors, $$g_{f,l} = \begin{bmatrix} y_{0,l}^{(f)} & y_{1,l}^{(f)} & \cdots & y_{N_3-1,l}^{(f)} \end{bmatrix}^T, f = 0, 1, \ldots, M_v - 1,$$

are identified by $n_{3,l}$ (l=1, . . . , v) where:

$$n_{3,l} = \begin{bmatrix} n_{3,l}^{(0)}, \ldots, n_{3,l}^{(M_v-1)} \end{bmatrix}$$
$$n_{3,l}^{(f)} \in \{0, 1, \ldots, N_3 - 1\}$$

which are indicated by means of the indices $i_{1,6,l}$ (for $M_v > 1$), where $i_{1,6,l} \in \{0, 1, \ldots, X-1\}$. The UE reports $i_{1,6,l}$ (l=1, . . . , v) via the PMI included in the CSI report. In one example, $$X = \binom{N_3 - 1}{M_v - 1}$$

when one of the FD basis vectors is fixed, $$\text{e.g., } n_{3,l}^{(0)} = 0.$$

In one example, $$X = \binom{N_3}{M_v}.$$

The payload for $i_{1,6,l}$ reporting is $\lceil \log_2 X \rceil$ bits.

In one example, as described in various embodiments disclosed herein, for each TRP (CSI-RS resource), $M_{v,r}$ FD basis vectors are determined/reported independently for each TRP (CSI-RS resource) and for each layer.

In one example, the $M_{v,r}$ FD basis vectors, $$g_{f,l,r} = \begin{bmatrix} y_{0,l,r}^{(f)} & y_{1,l,r}^{(f)} & \cdots & y_{N_3-1,l,r}^{(f)} \end{bmatrix}^T, f = 0, 1, \ldots, M_{v,r} - 1,$$

are identified by $n_{3,l,r}$ (l=1, . . . , v and r=1, . . . , Z) where:

$$n_{3,l,r} = \begin{bmatrix} n_{3,l,r}^{(0)}, \ldots, n_{3,l,r}^{(M_{v,r}-1)} \end{bmatrix}$$
$$n_{3,l,r}^{(f)} \in \{0, 1, \ldots, N_3 - 1\}$$

which are indicated by means of the indices $i_{1,6,l,r}$ (for $M_{v,r} > 1$), where $i_{1,6,l,r} \in \{0, 1, \ldots, X-1\}$. The UE reports $i_{1,6,l,r}$ (l=1, . . . , v and r=1, . . . , Z) via the PMI included in the CSI report. In one example, $$X = \binom{N_3 - 1}{M_{v,r} - 1}$$

when one of the FD basis vectors is fixed, $$\text{e.g., } n_{3,l,r}^{(0)} = 0.$$

In one example, $$X = \binom{N_3}{M_{v,r}}.$$

The payload for $i_{1,6,l,r}$ reporting is $\lceil \log_2 X \rceil$ bits.

Figure 16:
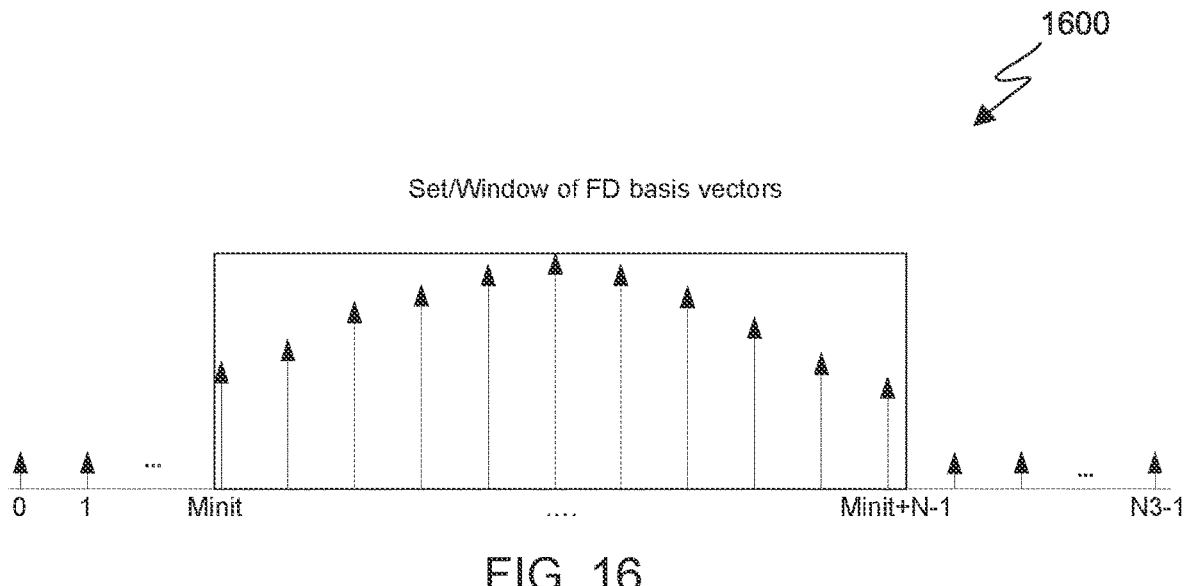
FIG. 16 illustrates an example of window-based FD basis vector selection according to embodiments of the present disclosure.

FIG. 16 illustrates an example 1600 of window-based FD basis vector selection according to embodiments of the present disclosure. The embodiment of the example 1600 of window-based FD basis vector selection illustrated in FIG. 16 is for illustration only. FIG. 16 does not limit the scope of this disclosure to any particular implementation of the example 1600 of window-based FD basis vector selection.

In one embodiment, a UE can be configured to report M or $M_r$ FD basis vectors from a set/window of $N_M$ FD basis vectors, where the M or $M_r$ FD basis vectors are common for all layers $l \in \{1, \ldots, v\}$ of a rank v CSI reporting, and the set/window is a subset of a total of $N_3$ basis vectors. In one example, $N_M \leq N_3$. In one example, $N_M < N_3$. The total of $N_3$ basis vectors correspond to orthogonal DFT basis vectors, each length $N_3 \times 1$.

The indices of the FD basis vectors in the set/window are given by $\text{mod}(M_{init}+n, N_3)$, n=0, 1, . . . , $N_M-1$, which comprises $N_M$ adjacent FD basis indices with modulo-shift by $N_3$, where $M_{init}$ is the starting index of the window. An example 1600 is shown in FIG. 16. Note that the window-based basis set/matrix $W_f$ is completely parameterized by $M_{init}$ and $N_M$. At least one of the following examples can be used/configured to determine $W_f$.

In one example, both $M_{init}$ and $N_M$ are fixed.

In one example, both $M_{init}$ and $N_M$ are configured to the UE (via RRC or/and MAC CE or/and DCI).

In one example, both $M_{init}$ and $N_M$ are reported by the UE.

In one example, $M_{init}$ is fixed and $N_M$ is configured to the UE (via RRC or/and MAC CE or/and DCI).

In one example, $M_{init}$ is fixed and $N_M$ is reported by the UE.

In one example, $M_{init}$ is configured to the UE (via RRC or/and MAC CE or/and DCI) and $N_M$ is fixed.

In one example, $M_{init}$ is configured to the UE (via RRC or/and MAC CE or/and DCI) and $N_M$ is reported by the UE.

In one example, $M_{init}$ is reported by the UE and $N_M$ is fixed.

In one example, $M_{init}$ is reported by the UE and $N_M$ is configured to the UE (via RRC or/and MAC CE or/and DCI).

For Z>1 TRPs (CSI-RS resources), $M_{init}$ can be fixed to (or configured with or reported) as the same/common value for all TRPs, or $M_{init}$ can be fixed to (or configured with or reported) same or different values across TRPs. Likewise, for Z>1 TRPs (CSI-RS resources), $N_M$ can be fixed to (or configured with or reported) the same/common value for all TRPs, or $N_M$ can be fixed to (or configured with or reported) same or different values across TRPs.

In one example, as described in various embodiments disclosed herein, one common/joint M FD basis vectors are determined/reported, which is used across all TRPs or CSI-RS resources, and across all layers.

In one example, when $M_{init}$ is fixed, it can be fixed, for example, to $M_{init}=0$, in which case the window is given by the set of FD indices $\{n=0, 1, \ldots, W-1\}$, where $W=N_M$ or $W=\min(N_M, N_3)$ or $W=N_M=aM$ where a can be fixed, e.g., a=2. The M FD basis vectors, $$g_f = \begin{bmatrix} y_0^{(f)} & y_1^{(f)} & \ldots & y_{N_3-1}^{(f)} \end{bmatrix}^T, f = 0, 1, \ldots, M-1,$$

are identified by $n_3$ where:

$$n_3 = \begin{bmatrix} n_3^{(0)}, \ldots, n_3^{(M-1)} \end{bmatrix}$$

$$n_3^{(f)} \in \{0, 1, \ldots, W-1\}$$

which are indicated by means of the index $i_{1,6}$ (for M>1), where $i_{1,6} \in \{0, 1, \ldots, X-1\}$. The UE reports $i_{1,6}$ via the PMI included in the CSI report. In one example $$X = \begin{pmatrix} W-1 \\ M-1 \end{pmatrix}$$

when one of the FD basis vectors is fixed, $$\text{e.g., } n_3^{(0)} = 0.$$

In one example, $$X = \begin{pmatrix} W \\ M \end{pmatrix}.$$

The payload for $i_{1,6}$ reporting is $\lceil \log_2 X \rceil$ bits.

In one example, when $M_{init}$ is reported, it can be reported via an indicator $i_{init}$ or $i_{1,5}$, which can be given by:

$$i_{1,5} = \begin{cases} M_{init} & M_{init} = 0 \\ M_{init} + W & M_{init} < 0 \end{cases}$$

In one example, $W=N_M=aM$ where a can be fixed, e.g., a=2. In one example, N is configured. In one example, $W=\min(N, N_3)$. The M FD basis vectors, $$g_f = \begin{bmatrix} y_0^{(f)} & y_1^{(f)} & \ldots & y_{N_3-1}^{(f)} \end{bmatrix}^T, f = 0, 1, \ldots, M-1,$$

are identified by $M_{init}$ and $n_3$ where:

$$M_{init} \in \{-W+1, -W+2, \ldots, 0\}$$

$$n_3 = \begin{bmatrix} n_3^{(0)}, \ldots, n_3^{(M-1)} \end{bmatrix}$$

$$n_3^{(f)} \in \{0, 1, \ldots, W-1\}$$

which are indicated by means of the indices $i_{1,5}$ and $i_{1,6}$ (for M>1), where $i_{1,5} \in \{0, 1, \ldots, W-1\}$ and $i_{1,6} \in \{0, 1, \ldots, X-1\}$. The UE reports $i_{1,5}$ and $i_{1,6}$ via the PMI included in the CSI report. In one example, $$X = \begin{pmatrix} W-1 \\ M-1 \end{pmatrix}$$

when one of the FD basis vectors is fixed, $$\text{e.g., } n_3^{(0)} = 0.$$

In one example, $$X = \begin{pmatrix} W \\ M \end{pmatrix}.$$

The payload for $i_{1,6}$ reporting is $\lceil \log_2 X \rceil$ bits. The payload for $i_{1,5}$ reporting is $\lceil \log_2 W \rceil$ bits.

In one example, as described in various embodiments disclosed herein, $M_r$ FD basis vectors are determined/reported for each TRP (CSI-RS resource), and for a TRP, the reported $M_r$ FD basis vectors are same/common for all layers.

In one example, the window for FD basis vector reporting is common/same across TRPs (CSI-RS resources) and $M_{init}$ is fixed. When $M_{init}$ is fixed, it can be fixed, for example, to $M_{init}=0$, in which case the window is given by the set of FD indices $\{n=0, 1, \ldots, W-1\}$, where $W=N_M$ or $W=\min(N_M, N_3)$ or $W=N_M=aM$ where a can be fixed, e.g., a=2. The $M_r$ FD basis vectors, $$g_{f,r} = \begin{bmatrix} y_{0,r}^{(f)} & y_{1,r}^{(f)} & \ldots & y_{N_3-1,r}^{(f)} \end{bmatrix}^T, f = 0, 1, \ldots, M_r-1,$$

are identified by $n_{3,r}$ (r=1, . . . , Z) where:

$$n_{3,r} = \left[ n_{3,r}^{(0)}, \ldots, n_{3,r}^{(M_r-1)} \right]$$

$$n_{3,r}^{(f)} \in \{0, 1, \ldots, W-1\}$$

which are indicated by means of the indices $i_{1,6,r}$ (for $M_r>1$), where $i_{1,6,r} \in \{0, 1, \ldots, X-1\}$. The UE reports $i_{1,6,r}$ (r=1, . . . , Z) via the PMI included in the CSI report. In one example, $$X = \binom{W-1}{M_r-1}$$

when one of the FD basis vectors is fixed, $$\text{e.g., } n_{3,r}^{(0)} = 0.$$

In one example, $$X = \binom{W}{M_r}.$$

The payload for $i_{1,6,r}$ reporting is $\lceil \log_2 X \rceil$ bits.

In one example, the window for FD basis vector reporting is common/same across TRPs (CSI-RS resources) and $M_{init}$ is reported. When $M_{init}$ is reported, it can be reported via an indicator $i_{init}$ or $i_{1,5}$, which can be given by:

$$i_{1,5} = \begin{cases} M_{init} & M_{init} = 0 \\ M_{init} + W & M_{init} < 0 \end{cases}$$

In one example, $W=N_M=aM$ where a can be fixed, e.g., a=2. In one example, $N_M$ is configured. In one example, $W=\min(N_M, N_3)$. $M_r$ FD basis vectors, $$g_{f,r} = \left[ y_{0,r}^{(f)} \; y_{1,r}^{(f)} \; \ldots \; y_{N_3-1,r}^{(f)} \right]^T, f = 0, 1, \ldots, M_r - 1,$$

are identified by $M_{init}$ and $n_{3,r}$ (r=1, . . . , Z) where:

$$M_{init} \in \{-W+1, -W+2, \ldots, 0\}$$

$$n_{3,r} = \left[ n_{3,r}^{(0)}, \ldots, n_{3,r}^{(M_r-1)} \right]$$

$$n_{3,r}^{(f)} \in \{0, 1, \ldots, W-1\}$$

which are indicated by means of the indices $i_{1,5}$ and $i_{1,6,r}$ (for $M_r>1$), where $i_{1,5} \in \{0, 1, \ldots, W-1\}$ and $i_{1,6,r} \in \{0, 1, \ldots, X-1\}$. The UE reports $i_{1,5}$ and $i_{1,6,r}$ (r=1, Z) via the PMI included in the CSI report. In one example, $$X = \binom{W-1}{M_r-1}$$

when one of the FD basis vectors is fixed, $$\text{e.g., } n_{3,r}^{(0)} = 0.$$

In one example, $$= \binom{W}{M_r}.$$

The payload for $i_{1,6,r}$ reporting is $\lceil \log_2 X \rceil$ bits. The payload for $i_{1,5}$ reporting is $\lceil \log_2 W \rceil$ bits.

In one example, the window for FD basis vector reporting is independent/separate across TRPs (CSI-RS resources), i.e., one window for each TRP, and $M_{init}$ is fixed. When $M_{init}$ is fixed, it can be fixed, for example, to $M_{init}=0$, in which case the window for TRP (CSIRS resource) r is given by the set of FD indices $\{n=0, 1, \ldots, W_r-1\}$, where $W_r=N_r$ or $W_r=\min(N_r, N_3)$ or $W_r=N_r=aM_r$ where a can be fixed, e.g., a=2. The $M_r$ FD basis vectors, $$g_{f,r} = \left[ y_{0,r}^{(f)} \; y_{1,r}^{(f)} \; \ldots \; y_{N_3-1,r}^{(f)} \right]^T, f = 0, 1, \ldots, M_r - 1,$$

are identified by $n_{3,r}$ (r=1, . . . , Z) where:

$$n_{3,r} = \left[ n_{3,r}^{(0)}, \ldots, n_{3,r}^{(M_r-1)} \right]$$

$$n_{3,r}^{(f)} \in \{0, 1, \ldots, W_r - 1\}$$

which are indicated by means of the indices $i_{1,6,r}$ (for $M_r>1$), where $i_{1,6,r} \in \{0, 1, \ldots, X-1\}$. The UE reports $i_{1,6,r}$ (r=1, . . . , Z) via the PMI included in the CSI report. In one example, $$X = \binom{W_r-1}{M_r-1}$$

when one of the FD basis vectors is fixed, $$\text{e.g., } n_{3,r}^{(0)} = 0.$$

In one example, $$X = \binom{W_r}{M_r}.$$

The payload for $i_{1,6,r}$ reporting is $\lceil \log_2 X \rceil$ bits. Note $W_r$ can be the same or different for r=1, . . . , Z.

In one example, the window for FD basis vector reporting is independent/separate across TRPs (CSI-RS resources), i.e., one window for each TRP, and $M_{init}$ is reported. When $M_{init,r}$ is reported per TRP r, it can be reported via an indicator $i_{init,r}$ or $i_{1,5,r}$, which can be given by:

$$i_{1,5,r} = \begin{cases} M_{init,r} & M_{init,r} = 0 \\ M_{init,r} + W_r & M_{init,r} < 0 \end{cases}$$

In one example, $W_r=N_r=aM_r$ where a can be fixed, e.g., a=2. In one example, $N_r$ is configured. In one example, $W_r=\min(N_r, N_3)$. $M_r$ FD basis vectors, $$g_{f,r} = \left[ y_{0,r}^{(f)} \quad y_{1,r}^{(f)} \quad \ldots \quad y_{N_3-1,r}^{(f)} \right]^T, f = 0, 1, \ldots , M_r - 1,$$

are identified by $M_{init,r}$ and $n_{3,r}$ (r=1, . . . , Z) where:

$$M_{init,r} \in \{-W_r + 1, -W_r + 2, \ldots , 0\}$$
$$n_{3,r} = \left[n_{3,r}^{(0)}, \ldots , n_{3,r}^{(M_r-1)}\right]$$
$$n_{3,r}^{(f)} \in \{0, 1, \ldots , W_r - 1\}$$

which are indicated by means of the indices $i_{1,5,r}$ and $i_{1,6,r}$ (for $M_r>1$), where $i_{1,5,r} \in \{0, 1, \ldots , W_r-1\}$ and $i_{1,6,r} \in \{0, 1, \ldots , X-1\}$. The UE reports $i_{1,5,r}$ and $i_{1,6,r}$ (r=1, . . . , Z) via the PMI included in the CSI report. In one example, $$X = \binom{W_r - 1}{M_r - 1}$$

when one of the FD basis vectors is fixed, $$\text{e.g., } n_{3,r}^{(0)} = 0.$$

In one example, $$X = \binom{W_r}{M_r}.$$

The payload for $i_{1,6,r}$ reporting is $\lceil \log_2 X \rceil$ bits. The payload for $i_{1,5,r}$ reporting is $\lceil \log_2 W_r \rceil$ bits.

In one example, $M_{init,r}=M_{init}$ when the same (one) value for $M_{init}$ is reported for all TRPs, and in this case, it can be reported via an indicator $i_{init}$ or $i_{1,5}$. Note $W_r$ can be the same or different for r=1, . . . , Z.

In one example, $M_{init,r}$ can be the same or different across TRPs, and in this case, $W_r$ can be the same or different for r=1, . . . , Z.

In one example, which may be a variation of other examples disclosed herein, for one TRP r*, $M_{init,r*}$ belongs to a first set of values, and for remaining TRPs r≠r*, $M_{init,r*}$ belongs to a second set of values, where the two sets of values are different. For example, $M_{init,r*} \in \{-W_r+1, -W_r+2, \ldots , 0\}$ for r=r*, and $M_{init,r} \in \{-N_3+1, -N_3+2, \ldots , 0\}$ for r≠r*. The rest of the details are the same as in example II.3.2.4. The one (reference) TRP can be fixed (e.g., TRP of CSI-RS resource with index r*=0), or configured (e.g., via RRC or MAC CE or DCI), or reported by the UE (e.g., as part of the CSI report). In one example, the reference TRP is the strongest TRP (i.e., the TRP whose power or sum of square of coefficient amplitudes is the maximum/largest among Z TRPs). In one example the reference TRP is the TRP associated with strongest coefficient or SCI. The payload for $i_{1,6,r}$ reporting is $\lceil \log_2 X \rceil$ bits. The payload for $i_{1,5,r}$ reporting is $\lceil \log_2 W_r \rceil$ bits for r=r* and $\lceil \log_2 N_3 \rceil$ bits for r≠r*.

In one example, the window for FD basis vector reporting is independent/separate across TRPs (CSI-RS resources), i.e., one window for each TRP, and $M_{init}$ for one (reference) TRP is fixed and $M_{init}$ for each of the remaining Z–1 TRPs is reported. The one (reference) TRP can be fixed (e.g., TRP of CSI-RS resource with index r=0), or configured (e.g., via RRC or MAC CE or DCI), or reported by the UE (e.g., as part of the CSI report). In one example, the reference TRP is the strongest TRP (i.e., the TRP whose power or sum of square of coefficient amplitudes is the maximum/largest among Z TRPs). In one example the reference TRP is the TRP associated with strongest coefficient or SCI. Let r* is the index of the reference TRP. The $M_{init,r*}$ can be fixed to $M_{init,r*}=0$. The $M_{init,r}$ of each of the remaining TRPs with r≠r*is reported. The details are the same as in various examples disclosed herein. In particular, $i_{1,5,r*}=0$ (not reported), for each r≠r*, index $i_{1,5,r}$ is reported and indicates $M_{init,r}$.

$$i_{1,5,r} = \begin{cases} M_{init,r} & M_{init,r} = 0 \\ M_{init,r} + W_r & M_{init,r} < 0 \end{cases}$$

In one example, $W_r=N_r=aM_r$ where a can be fixed, e.g., a=2. In one example, $N_r$ is configured. In one example, $W_r=\min(N_r, N_3)$. $M_r$ FD basis vectors, $$g_{f,r} = \left[ y_{0,r}^{(f)} \quad y_{1,r}^{(f)} \quad \ldots \quad y_{N_3-1,r}^{(f)} \right]^T, f = 0, 1, \ldots , M_r - 1,$$

are identified by $M_{init,r}$ and $n_{3,r}$ (r=1, . . . , Z) where:

$$\text{For } r \neq r^*, M_{init,r} \in \{-W_r + 1, -W_r + 2, \ldots , 0\}$$
$$n_{3,r} = \left[n_{3,r}^{(0)}, \ldots , n_{3,r}^{(M_r-1)}\right]$$
$$n_{3,r}^{(f)} \in \{0, 1, \ldots , W_r - 1\}$$

which are indicated by means of the indices $i_{1,5,r}$ and $i_{1,6,r}$ (for $M_r>1$), where $i_{1,5,r} \in \{0, 1, \ldots , W_r-1\}$ for r≠r* and $i_{1,6,r} \in \{0, 1, \ldots , X-1\}$. The UE reports $i_{1,5,r}$ (for r≠r*) and $i_{1,6,r}$ (r=1, . . . , Z) via the PMI included in the CSI report. In one example, $$X = \binom{W_r - 1}{M_r - 1}$$

when one of the FD basis vectors is fixed, $$\text{e.g., } n_{3,r}^{(0)} = 0.$$

In one example, $$X = \binom{W_r}{M_r}.$$

The payload for $i_{1,6,r}$ reporting is $\lceil \log_2 X \rceil$ bits. For r≠r*, the payload for $i_{1,5,r}$ reporting is $\lceil \log_2 W_r \rceil$ bits.

In one example, which may be a variation of other examples disclosed herein, for remaining TRPs r≠r*, $M_{init,r}$ belongs to different set of values. For example, $M_{init,r} \in \{-N_3+1, -N_3+2, \ldots, 0\}$ for $r \neq r^*$. The rest of the details are the same as in various examples disclosed herein. The payload for $i_{1,5,r}$ reporting is 0 bits for $r=r^*$ and $\lceil \log_2 N_3 \rceil$ bits for $r \neq r^*$.

In one embodiment, a UE can be configured to report $M_v$ or $M_{v,r}$ FD basis vectors from a set/window of N FD basis vectors, where the $M_v$ or $M_{v,r}$ FD basis vectors are selected freely (independently) for each layer $l \in \{1, \ldots, v\}$ of a rank v CSI reporting, and the set/window is a subset of a total of $N_3$ basis vectors. In one example, $N_M \leq N_3$. In one example, $N_M < N_3$. The details of the window of basis vectors are as described in various embodiments disclosed herein.

In one example, as described in various embodiments disclosed herein, one common/joint $M_v$ FD basis vectors are determined/reported across all TRPs or CSI-RS resources, and for rank>1, the $M_v$ FD basis vectors are determined/reported independently for each layer $l=1, \ldots, v$.

In one example, when $M_{init}$ is fixed, it can be fixed, for example, to $M_{init}=0$, in which case the window is given by the set of FD indices $\{n=0, 1, \ldots, W-1\}$, where $W=N_M$ or $W=\min(N_M, N_3)$ or $W=N_M=aM_v$ where a can be fixed, e.g., $a=2$. The $M_v$ FD basis vectors, $$g_{f,l} = \begin{bmatrix} y_{0,l}^{(f)} & y_{1,l}^{(f)} & \cdots & y_{N_3-1,l}^{(f)} \end{bmatrix}^T, f = 0, 1, \ldots, M_v - 1,$$

are identified by $n_{3,l}$ ($l=1, \ldots, v$) where:

$$n_{3,l} = \begin{bmatrix} n_{3,l}^{(0)}, \ldots, n_{3,l}^{(M_v-1)} \end{bmatrix}$$

$$n_{3,l}^{(f)} \in \{0, 1, \ldots, W-1\}$$

which are indicated by means of the indices $i_{1,6,l}$ (for $M_v > 1$), where $i_{1,6,l} \in \{0, 1, \ldots, X-1\}$. The UE reports $i_{1,6,l}$ ($l=1, \ldots, v$) via the PMI included in the CSI report. In one example, $$X = \begin{pmatrix} W-1 \\ M_v-1 \end{pmatrix}$$

when one of the FD basis vectors is fixed, $$e.g., n_{3,l}^{(0)} = 0.$$

In one example, $$X = \begin{pmatrix} W \\ M_v \end{pmatrix}.$$

The payload for i to reporting is $\lceil \log_2 X \rceil$ bits.

In one example, when $M_{init}$ is reported, it can be reported via an indicator $i_{init}$ or $i_{1,5}$, which can be given by:

$$i_{1,5} = \begin{cases} M_{init} & M_{init} = 0 \\ M_{init} + W & M_{init} < 0 \end{cases}$$

In one example, $W=N_M=aM_v$ where a can be fixed, e.g., $a=2$. In one example, $N_M$ is configured. In one example, $W=\min(N_M, N_3)$. The $M_v$ FD basis vectors, $$g_{f,l} = \begin{bmatrix} y_{0,l}^{(f)} & y_{1,l}^{(f)} & \cdots & y_{N_3-1,l}^{(f)} \end{bmatrix}^T, f = 0, 1, \ldots, M_v - 1,$$

are identified by $M_{init}$ and $n_{3,l}$ ($l=1, \ldots, v$) where:

$$M_{init} \in \{-W+1, -W+2, \ldots, 0\}$$

$$n_{3,l} = \begin{bmatrix} n_{3,l}^{(0)}, \ldots, n_{3,l}^{(M_v-1)} \end{bmatrix}$$

$$n_{3,l}^{(f)} \in \{0, 1, \ldots, W-1\}$$

which are indicated by means of the indices $i_{1,5}$ and $i_{1,6,l}$ (for $M_v > 1$), where $i_{1,5} \in \{0, 1, \ldots, W-1\}$ and $i_{1,6,l} \in \{0, 1, \ldots, X-1\}$. The UE reports $i_{1,5}$ and $i_{1,6,l}$ ($l=1, \ldots, v$) via the PMI included in the CSI report. In one example, $$X = \begin{pmatrix} W-1 \\ M_v-1 \end{pmatrix}$$

when one of the FD basis vectors is fixed, $$e.g., n_{3,l}^{(0)} = 0.$$

In one example, $$X = \begin{pmatrix} W \\ M_v \end{pmatrix}.$$

The payload for $i_{1,6,l}$ reporting is $\lceil \log_2 X \rceil$ bits. The payload for $i_{1,5}$ reporting is $\lceil \log_2 W \rceil$ bits.

In one example, as described in various embodiments disclosed herein, for each TRP (CSI-RS resource), $M_{v,r}$ FD basis vectors are determined/reported independently for each TRP (CSI-RS resource) and for each layer.

In one example, the window for FD basis vector reporting is common/same across TRPs (CSI-RS resources) and $M_{init}$ is fixed. When $M_{init}$ is fixed, it can be fixed, for example, to $M_{init}=0$, in which case the window is given by the set of FD indices $\{n=0, 1, \ldots, W-1\}$, where $W=N_M$ or $W=\min(N_M, N_3)$ or $W=N=aM_{v,r}$ where a can be fixed, e.g., $a=2$. The $M_{v,r}$ FD basis vectors, $$g_{f,l,r} = \begin{bmatrix} y_{0,l,r}^{(f)} & y_{1,l,r}^{(f)} & \cdots & y_{N_3-1,l,r}^{(f)} \end{bmatrix}^T, f = 0, 1, \ldots, M_{v,r} - 1,$$

are identified by $n_{3,l,r}$ ($l=1, \ldots, v$ and $r=1, Z$) where:

$$n_{3,l,r} = \begin{bmatrix} n_{3,l,r}^{(0)}, \ldots, n_{3,l,r}^{(M_{v,r}-1)} \end{bmatrix}$$

$$n_{3,l,r}^{(f)} \in \{0, 1, \ldots, W-1\}$$

which are indicated by means of the indices $i_{1,6,l,r}$ (for $M_{v,r} > 1$), where $i_{1,6,l,r} \in \{0, 1, \ldots, X-1\}$. The UE reports $i_{1,6,l,r}$ ($l=1, \ldots, v$ and $r=1, \ldots, Z$) via the PMI included in the CSI report. In one example, $$X = \binom{W-1}{M_{u,r}-1}$$

when one of the FD basis vectors is fixed, $$e.g., n_{3,l,r}^{(0)} = 0.$$

In one example, $$X = \binom{W}{M_{u,r}}.$$

The payload for $i_{1,6,l,r}$ reporting is $\lceil \log_2 X \rceil$ bits.

In one example, the window for FD basis vector reporting is common/same across TRPs (CSI-RS resources) and $M_{init}$ is reported. When $M_{init}$ is reported, it can be reported via an indicator $i_{init}$ or $i_{1,5}$, which can be given by:

$$i_{1,5} = \begin{cases} M_{init} & M_{init} = 0 \\ M_{init} + W & M_{init} < 0 \end{cases}$$

In one example, $W=N_M=aM$ where a can be fixed, e.g., a=2. In one example, $N_M$ is configured. In one example, $W=\min(N_M, N_3)$. The $M_{v,r}$ FD basis vectors, $$g_{f,l,r} = \left[ y_{0,l,r}^{(f)} \quad y_{1,l,r}^{(f)} \quad \ldots \quad y_{N_3-1,l,r}^{(f)} \right]^T, f = 0, 1, \ldots, M_{u,r} - 1,$$

are identified by $M_{init}$ and $n_{3,l,r}$ (l=1, . . . , v and r=1, . . . , Z) where:

$$M_{init} \in \{-W+1, -W+2, \ldots, 0\}$$

$$n_{3,l,r} = \left[ n_{3,l,r}^{(0)}, \ldots, n_{3,l,r}^{(M_{u,r}-1)} \right]$$

$$n_{3,l,r}^{(f)} \in \{0, 1, \ldots, W-1\}$$

which are indicated by means of the indices $i_{1,5}$ and $i_{1,6,l,r}$ (for $M_{v,r}>1$), where $i_{1,5} \in \{0, 1, \ldots, W-1\}$ and $i_{1,6,l,r} \in \{0, 1, \ldots, X-1\}$. The UE reports $i_{1,5}$ and $i_{1,6,l,r}$ (l=1, . . . , v and r=1, . . . , Z) via the PMI included in the CSI report. In one example, $$X = \binom{W-1}{M_v-1}$$

when one of the FD basis vectors is fixed, $$e.g., n_{3,l,r}^{(0)} = 0.$$

In one example, $$X = \binom{W}{M_{u,r}}.$$

The payload for $i_{1,6,l,r}$ reporting is $\lceil \log_2 X \rceil$ bits. The payload for $i_{1,5}$ reporting is $\lceil \log_2 W \rceil$ bits.

In one example, the window for FD basis vector reporting is independent/separate across TRPs (CSI-RS resources), i.e., one window for each TRP, and $M_{init}$ is fixed. When $M_{init}$ is fixed, it can be fixed, for example, to $M_{init}=0$, in which case the window for TRP (CSIRS resource) r is given by the set of FD indices {n=0, 1, . . . , $W_r-1$}, where $W_r=N_r$ or $W_r=\min(N_r, N_3)$ or $W_r=N_r=aM_r$ where a can be fixed, e.g., a=2. The $M_{v,r}$ FD basis vectors, $$g_{f,l,r} = \left[ y_{0,l,r}^{(f)} \quad y_{1,l,r}^{(f)} \quad \ldots \quad y_{N_3-1,l,r}^{(f)} \right]^T, f = 0, 1, \ldots, M_{u,r} - 1,$$

are identified by $n_{3,l,r}$ (l=1, . . . , v and r=1, . . . ,Z) where:

$$n_{3,l,r} = \left[ n_{3,l,r}^{(0)}, \ldots, n_{3,l,r}^{(M_{u,r}-1)} \right]$$

$$n_{3,l,r}^{(f)} \in \{0, 1, \ldots, W_r - 1\}$$

which are indicated by means of the indices $i_{1,6,l,r}$ (for $M_{v,r}>1$), where $i_{1,6,l,r} \in \{0, 1, \ldots, X-1\}$. The UE reports $i_{1,6,l,r}$ (l=1, . . . , v and r=1, . . . , Z) via the PMI included in the CSI report. In one example, $$X = \binom{W_r-1}{M_{u,r}-1}$$

when one of the FD basis vectors is fixed, $$e.g., n_{3,l,r}^{(0)} = 0.$$

In one example, $$X = \binom{W_r}{M_{u,r}}.$$

The payload for $i_{1,6,l,r}$ reporting is $\lceil \log_2 X \rceil$ bits.

In one example, the window for FD basis vector reporting is independent/separate across TRPs (CSI-RS resources), i.e., one window for each TRP, and $M_{init}$ is reported. When $M_{init,r}$ is reported per TRP r, it can be reported via an indicator $i_{init,r}$ or $i_{1,5,r}$, which can be given by:

$$i_{1,5,r} = \begin{cases} M_{init,r} & M_{init,r} = 0 \\ M_{init,r} + W_r & M_{init,r} < 0 \end{cases}$$

In one example, $W_r=N_r=aM_r$ where a can be fixed, e.g., a=2. In one example, $N_r$ is configured. In one example, $W_r=\min(N_r, N_3)$. The $M_{v,r}$ FD basis vectors, $$g_{f,l,r} = \left[ y_{0,l,r}^{(f)} \quad y_{1,l,r}^{(f)} \quad \ldots \quad y_{N_3-1,l,r}^{(f)} \right]^T, f = 0, 1, \ldots, M_{u,r} - 1,$$

are identified by $M_{init,r}$ and $n_{3,l,r}$ ($l=1, \ldots, v$ and $r=1, \ldots, Z$) where:

$$M_{init,r} \in \{-W_r + 1, -W_r + 2, \ldots, 0\}$$

$$n_{3,l,r} = \left[ n_{3,l,r}^{(0)}, \ldots, n_{3,l,r}^{(M_{v,r}-1)} \right]$$

$$n_{3,l,r}^{(f)} \in \{0, 1, \ldots, W_r - 1\}$$

which are indicated by means of the indices $i_{1,5,r}$ and $i_{1,6,l,r}$ (for $M_{v,r}>1$), where $i_{1,5,r} \in \{0, 1, \ldots, W_r-1\}$ and $i_{1,6,l,r} \in \{0, 1, \ldots, X-1\}$. The UE reports $i_{1,5,r}$ and $i_{1,6,l,r}$ ($l=1, \ldots, v$ and $r=1, \ldots, Z$) via the PMI included in the CSI report. In one example, $$X = \begin{pmatrix} W_r - 1 \\ M_{v,r} - 1 \end{pmatrix}$$

when one of the FD basis vectors is fixed, $$e.g., n_{3,l,r}^{(0)} = 0.$$

In one example, $$X = \begin{pmatrix} W_r \\ M_{v,r} \end{pmatrix}.$$

The payload for reporting $i_{1,6,l,r}$ is $\lceil \log_2 X \rceil$ bits. The payload for $i_{1,5,r}$ reporting is $\lceil \log_2 W_r \rceil$ bits.

In one example, $M_{init,r}=M_{init}$ when the same (one) value for $M_{init}$ is reported for all TRPs, and in this case, it can be reported via an indicator $i_{init}$ or $i_{1,5}$. Note $W_r$ can be the same or different for $r=1, \ldots, Z$.

In one example, $M_{init,r}$ can be the same or different across TRPs, and in this case, $W_r$ can be the same or different for $r=1, \ldots, Z$.

In one example, which may be a variation of other examples disclosed herein, for one TRP $r^*$, $M_{init,r^*}$ belongs to a first set of values, and for remaining TRPs $r \neq r^*$, $M_{init,r^*}$ belongs to a second set of values, where the two sets of values are different. For example, $M_{init,r^*} \in \{-W_r+1, -W_r+2, \ldots, 0\}$ for $r=r^*$, and $M_{init,r} \in \{-N_3+1, -N_3+2, \ldots, 0\}$ for $r \neq r^*$. The rest of the details are the same as in example II.4.2.4. The one (reference) TRP can be fixed (e.g., TRP of CSI-RS resource with index $r^*=0$), or configured (e.g., via RRC or MAC CE or DCI), or reported by the UE (e.g., as part of the CSI report). In one example, the reference TRP is the strongest TRP (i.e., the TRP whose power or sum of square of coefficient amplitudes is the maximum/largest among Z TRPs). In one example the reference TRP is the TRP associated with strongest coefficient or SCI. The payload for $i_{1,6,l,r}$ reporting is $\lceil \log_2 X \rceil$ bits. The payload for $i_{1,5,r}$ reporting is $\lceil \log_2 W_r \rceil$ bits for $r=r^*$ and $\lceil \log_2 N_3 \rceil$ bits for $r \neq r^*$.

In one example, the window for FD basis vector reporting is independent/separate across TRPs (CSI-RS resources), i.e., one window for each TRP, and $M_{init}$ for one (reference) TRP is fixed and $M_{init}$ for each of the remaining $Z-1$ TRPs is reported. The one (reference) TRP can be fixed (e.g., TRP of CSI-RS resource with index $r=0$), or configured (e.g., via RRC or MAC CE or DCI), or reported by the UE (e.g., as part of the CSI report). In one example, the reference TRP is the strongest TRP (i.e., the TRP whose power or sum of square of coefficient amplitudes is the maximum/largest among Z TRPs). In one example the reference TRP is the TRP associated with strongest coefficient or SCI. Let $r^*$ is the index of the reference TRP. The $M_{init,r^*}$ can be fixed to $M_{init,r^*}=0$. The $M_{init,r}$ of each of the remaining TRPs with $r \neq r^*$ is reported. The details are the same as in example II.4.2.4. In particular, $i_{1,5,r^*}=0$ (not reported), for each $r \neq r^*$, index $i_{1,5,r}$ is reported and indicates $M_{init,r}$.

$$i_{1,5,r} = \begin{cases} M_{init,r} & M_{init,r} = 0 \\ M_{init,r} + W_r & M_{init,r} < 0 \end{cases}$$

In one example, $W_r=N_r=aM_r$ where a can be fixed, e.g., a=2. In one example, $N_r$ is configured. In one example, $W_r=\min(N_r, N_3)$. The $M_{v,r}$ FD basis vectors, $$g_{f,l,r} = \left[ y_{0,l,r}^{(f)} \ y_{1,l,r}^{(f)} \ \ldots \ y_{N_3-1,l,r}^{(f)} \right]^T, f = 0, 1, \ldots, M_{v,r} - 1,$$

are identified by $M_{init,r}$ and $n_{3,l,r}$ ($l=1, \ldots, v$ and $r=1, \ldots, Z$) where:

$$For \ r \neq r^*, M_{init,r} \in \{-W_r + 1, -W_r + 2, \ldots, 0\}$$

$$n_{3,l,r} = \left[ n_{3,l,r}^{(0)}, \ldots, n_{3,l,r}^{(M_{v,r}-1)} \right]$$

$$n_{3,l,r}^{(f)} \in \{0, 1, \ldots, W_r - 1\}$$

which are indicated by means of the indices $i_{1,5,r}$ and $i_{1,6,l,r}$ (for $M_{v,r}>1$), where $i_{1,5,r} \in \{0, 1, \ldots, W_r-1\}$ for $r \neq r^*$ and $i_{1,6,l,r} \in \{0, 1, \ldots, X-1\}$. The UE reports $i_{1,5,r}$ (for $r \neq r^*$) and $i_{1,6,l,r}$ ($l=1, \ldots, v$ and $r=1, \ldots, Z$) via the PMI included in the CSI report. In one example, $$X = \begin{pmatrix} W_r & -1 \\ M_{v,r} & -1 \end{pmatrix}$$

when one of the FD basis vectors is fixed, $$e.g., n_{3,l,r}^{(0)} = 0.$$

In one example,
$$X = \begin{pmatrix} W_r \\ M_{v,r} \end{pmatrix}.$$

The payload for $i_{1,6,l,r}$ reporting is $\lceil \log_2 X \rceil$ bits. For $r \neq r^*$, the payload for $i_{1,5,r}$ reporting is $\lceil \log_2 W_r \rceil$ bits.

In one example, which may be a variation of other examples disclosed herein, for remaining TRPs $r \neq r^*$, $M_{init,r}$ belongs to different set of values. For example, $M_{init,r} \in \{-N_3+1, -N_3+2, \ldots, 0\}$ for $r \neq r^*$. The rest of the details are the same as in various examples disclosed herein. The payload for $i_{1,5,r}$ reporting is 0 bits for $r=r^*$ and $\lceil \log_2 N_3 \rceil$ bits for $r \neq r^*$.

In one embodiment, the UE is configured to report M or $M_r$ or $M_v$ or $M_{v,r}$ FD basis vectors according to window-based embodiments and free selection embodiments disclosed herein, based on a condition. The condition is according to at least one of the following examples.

In one example, the reporting is according to window-based embodiments disclosed herein when $N_3 > t$ and is according to free selection embodiments disclosed herein when $N_3 \leq t$.

In one example, the reporting is according to window-based embodiments disclosed herein when $N_3 \geq t$ and is according to free selection embodiments disclosed herein when $N_3 < t$.

In one example, the reporting is according to window-based embodiments disclosed herein when $N_3 < t$ and is according to free selection embodiments disclosed herein when $N_3 \geq t$.

In one example, the reporting is according to window-based embodiments disclosed herein when $N_3 \leq t$ and is according to free selection embodiments disclosed herein when $N_3 > t$.

In one example, the reporting is according to window-based embodiments disclosed herein when $N_{TRP}$ or $Z > k$ and is according to free selection embodiments disclosed herein when $N_{TRP}$ or $Z \leq k$.

In one example, the reporting is according to window-based embodiments disclosed herein when $N_{TRP}$ or $Z_3 \geq k$ and is according to free selection embodiments disclosed herein when $N_{TRP}$ or $Z < k$.

In one example, the reporting is according to window-based embodiments disclosed herein when $N_{TRP}$ or $Z < k$ and is according to free selection embodiments disclosed herein when $N_{TRP}$ or $Z \geq k$.

In one example, the reporting is according to window-based embodiments disclosed herein when $N_{TRP}$ or $Z \leq k$ and is according to free selection embodiments disclosed herein when $N_{TRP}$ or $Z > k$.

In one example, the reporting is according to window-based embodiments disclosed herein when corresponding both conditions in examples disclosed herein are satisfied and is according to free selection embodiments disclosed herein when corresponding both conditions in examples disclosed herein are satisfied. Here, (A, B) belong to $\{(1,5), (1,6), (1, 7), (1, 8), (2, 5), (2, 6), (2, 7), (2, 8), (3, 5), (3, 6), (3, 7), (3, 8), (4, 5), (4, 6), (4, 7), (4,8)\}$.

Here, t is a threshold that can be fixed (e.g., t=19) or configured or reported by the UE. Here, k is a threshold that can be fixed (e.g., k=2) or configured or reported by the UE.

In one embodiment, the UE is configured with a CSI report based on a codebook, where as described in above, the codebook can be configured to be one of the following:

(C1)      codebookType=type-II-cjt-r18      and codebookMode=Mode1

(C2)      codebookType=type-II-cjt-r18      and codebookMode=Mode2

(C3)   codebookType=type-II-PortSelection-cjt-r18   and codebookMode=Mode1

(C4)   codebookType=type-II-PortSelection-cjt-r18   and codebookMode=Mode2.

For these codebook configuration, C1 through C4, the UE is further configured to determine/report FD basis vectors according to at least one of the following examples.

In one example, the UE is further configured to determine/report FD basis vectors according to the same scheme for all codebook configuration C1-C4, where the same scheme to determine/report FD basis vectors is according to one of the examples in various embodiments disclosed herein. In one example, this same scheme can be various examples disclosed herein.

In one example, the UE is further configured to determine/report FD basis vectors according to a scheme that is configured for all codebook configuration C1-C4, where the configured scheme to determine/report FD basis vectors is according to one of the examples in various embodiments disclosed herein. In one example, this configured scheme can be various examples disclosed herein.

In one example, the UE is further configured to determine/report FD basis vectors according to two different schemes (scheme A and scheme B), where scheme A is used for S1, and scheme B is used for S2.

In one example, $S1=\{C1\}$, $S2=\{C2,C3,C4\}$.

In one example, $S1=\{C2\}$, $S2=\{C1,C3,C4\}$.

In one example, $S1=\{C3\}$, $S2=\{C1,C2,C4\}$.

In one example, $S1=\{C4\}$, $S2=\{C1,C2,C3\}$.

In one example, $S1=\{C1,C2\}$, $S2=\{C3,C4\}$.

In one example, $S1=\{C1,C3\}$, $S2=\{C2,C4\}$.

In one example, $S1=\{C1,C4\}$, $S2=\{C2,C3\}$.

In one example, scheme A is according to various examples disclosed herein and scheme B is according to various examples disclosed herein.

In one example, the UE is further configured to determine/report FD basis vectors according to three different schemes (scheme A, scheme B, and scheme C), where scheme A is used for S1, scheme B is used for S2, and scheme C is used S3.

In one example, $S1=\{C1\}$, $S2=\{C2\}$, $S3=\{C3,C4\}$.

In one example, $S1=\{C1\}$, $S2=\{C3\}$, $S3=\{C2,C4\}$.

In one example, $S1=\{C1\}$, $S2=\{C4\}$, $S3=\{C2,C3\}$.

In one example, $S1=\{C2\}$, $S2=\{C3\}$, $S3=\{C1,C4\}$.

In one example, $S1=\{C2\}$, $S2=\{C4\}$, $S3=\{C1,C4\}$.

In one example, $S1=\{C3\}$, $S2=\{C4\}$, $S3=\{C1,C2\}$.

In various examples, scheme A is according to various examples disclosed herein, scheme B is according to various examples disclosed herein, and scheme C is according to various examples disclosed herein.

In one example, when the codebook is according to (C1) or (C2), then at least one of the following examples is used.

In one example, the FD basis vectors are determined/reported according to the same for the Rel. 16 enhanced Type II codebook.

In one example, the FD basis vectors are determined/reported according to the same for the Rel. 17 further enhanced Type II port selection codebook.

When the number of FD basis vectors=1 (M=1), then

For one TRP, the FD basis vector is fixed, e.g., to FD basis vector with index 0, i.e., an all-one vector [1, 1, . . . , 1]. For the remaining TRPs, the FD basis vector is reported.

In one example, when the codebook is according to (C3) or (C4), then at least one of the following examples is used.

In one example, the FD basis vectors are determined/reported according to the same for the Rel. 17 further enhanced Type II port selection codebook.

In one example, the FD basis vectors are determined/reported according to the same for the Rel. 16 enhanced Type II codebook.

When the number of FD basis vectors=1 (M=1), then

For one TRP, the FD basis vector is fixed, e.g., to FD basis vector with index 0, i.e., an all-one vector [1, 1, . . . , 1]. For the remaining TRPs, the FD basis vector is reported.

In one embodiment, when $M_{init}$ for different TRPs (CSI-RS resources) are determined separately/independently (cf. various examples disclosed herein), then the different $M_{init}$ values can be determined (or reported) relative to (or w.r.t.) to a reference TRP (CSI-RS resource). In this case, the different (relative) $M_{init}$ values can be equivalently described as 'relative' FD offsets, i.e., $M_{init,r}$ for a TRP r equals a relative FD offset for the TRP r denoted as $O_r$ or $\psi_r$ (as described earlier). In one example, the reference TRP is denoted as r*, as described earlier in this disclosure. In one example, the reference TRP or CSI-RS resource can be the first (index r=0 or r=1) of the N selected CSI-RS resources. For the reference TRP, we can assume that $M_{init,r*}=O_{r*}=\psi_{r*}=0$. For the remaining TRPs (r≠r*), $M_{init,r}$ or $O_r$ or $\psi_r$ is determined and hence needs reporting.

In one example, r*=1, and when codebookMode is set to 'mode1', N−1 phase offsets for r=2, . . . , N CSI-RS resources are reported by the UE.

In one example, r*=1, and when codebookMode is set to 'mode1', phase offsets are not reported, and $\psi_r$=0 for r=1, . . . , N.

In one example, for the case when $L_r$=L for all r, the indicators $i_{2,3,l}$, $i_{2,4,l}$, and $i_{1,7,l}$ can be described as follows.

The amplitude coefficient indicators $i_{2,3,l}$ and $i_{2,4,l}$, for l=1, . . . , v, are:

$$i_{2,3,l} = \left[ k_{l,0}^{(1)} \quad k_{l,1}^{(1)} \right]$$

$$k_{l,p}^{(1)} = \left[ k_{l,p,0}^{(2)} \ \cdots \ k_{l,p,Z-1}^{(2)} \right]$$

$$i_{2,4,l} = \left[ k_{l,0}^{(2)} \ \cdots \ k_{l,M_v-1}^{(2)} \right]$$

$$k_{l,f}^{(2)} = \left[ k_{l,0,f}^{(2)} \ \cdots \ k_{l,2L-1,f}^{(2)} \right]$$

$$k_{l,i,f}^{(2)} = \left[ k_{l,i,f,0}^{(2)} \ \cdots \ k_{l,i,f,Z-1}^{(2)} \right]$$

$$k_{l,p,r}^{(1)} \in \{1, \dots, 15\}$$

$$k_{l,i,f,r}^{(2)} \in \{0, \dots, 7\}.$$

for l=1, . . . , v.

The phase coefficient indicator $i_{2,5,l}$, for l=1, . . . , v, is:

$$i_{2,5,l} = \left[ c_{l,0} \ \cdots \ c_{l,M_v-1} \right]$$

$$c_{l,f} = [c_{l,0,f} \ \cdots \ c_{l,2L-1,f}]$$

$$c_{l,i,f} = [c_{l,i,f,0} \ \cdots \ c_{l,i,f,Z-1}]$$

$$c_{l,i,f,r} \in \{0, \dots, 15\}.$$

for l=1, . . . , v.

The bitmap whose nonzero bits identify which coefficients in $i_{2,4,l}$ and $i_{2,5,l}$ are reported, is indicated by $i_{1,7,l}$ $$i_{1,7,l} = \left[ k_{l,0}^{(3)} \ \cdots \ k_{l,M_v-1}^{(3)} \right]$$

$$k_{l,f}^{(3)} = \left[ k_{l,0,f}^{(3)} \ \cdots \ k_{l,2L-1,f}^{(3)} \right]$$

$$k_{l,i,f}^{(3)} = \left[ k_{l,i,f,0}^{(3)} \ \cdots \ k_{l,i,f,Z-1}^{(3)} \right]$$

$$k_{l,i,f,r}^{(3)} \in \{0, 1\}$$

for l=1, . . . , v. In one example, $$K_l^{NZ} = \sum_{r=0}^{Z-1} \sum_{i=0}^{2L-1} \sum_{f=0}^{M_v-1} k_{l,i,f,r}^{(3)} \le K_0$$

is the number of nonzero coefficients for layer l=1, . . . , v and $$K^{NZ} = \sum_{l=1}^{v} K_l^{NZ} \le 2K_0$$

is the total number of nonzero coefficients.

In one example, for the case when $L_r$ can be different across r values, L needs to be replaced with $L_r$. In that case, the amplitude coefficient indicator $i_{2,4,l}$, and the bitmap indicator $i_{1,7,l}$ for layer l=1, . . . , v, can be given by:

$$i_{2,4,l} = [i_{2,4,l,1} \ \dots \ i_{2,4,l,Z}]$$

$$i_{2,4,l,r} = \left[ k_{l,0,r}^{(2)} \ \cdots \ k_{l,M_v-1,r}^{(2)} \right]$$

$$k_{l,f,r}^{(2)} = \left[ k_{l,0,f,r}^{(2)} \ \cdots \ k_{l,2L_r-1,f,r}^{(2)} \right]$$

$$k_{l,i,f,r}^{(2)} \in \{0, \dots, 7\}$$

$$i_{1,7,l} = [i_{1,7,l,1} \ \dots \ i_{1,7,l,Z}]$$

$$i_{1,7,l,r} = \left[ k_{l,0,r}^{(3)} \ \cdots \ k_{l,M_v-1,r}^{(3)} \right]$$

$$k_{l,f,r}^{(3)} = \left[ k_{l,0,f,r}^{(3)} \ \cdots \ k_{l,2L_r-1,f,r}^{(3)} \right]$$

$$k_{l,i,f,r}^{(3)} \in \{0, 1\}$$

In one embodiment, there is one strongest coefficient across all Z TRPs and there can be remapping of FD indices performed w.r.t. the FD index of the strongest coefficient.

In one example, for the case when $L_r$=L, let $$f_l^* \in \{0, 1, \dots, M_v - 1\}$$

be the index of $i_{2,4,l}$, $$i_l^* \in \{0, 1, \dots, 2L - 1\}$$

be the index of $$k_{l,f_l^*}^{(2)},$$

and $$r_l^* \in \{0, 1, \dots, Z - 1\}$$

be the index of $$k_{l,i_l^*,f_l^*}^{(2)},$$

which identify the strongest coefficient of layer l, i.e., the element $$k_{l,i_l^*,f_l^*,r_l^*}^{(2)}$$

of $i_{2,4,l}$, for l=1, . . . , v.

US 12,700,977 B2

53

In one example, for the case when $L_r$ can be different across r values, let $$f_l^* \in \{0, 1, \ldots, M_v - 1\}$$

and $$I_l^* \in \left\{0, 1, \ldots, 2\sum_{r=1}^{Z} L_r - 1\right\}$$

be the indices which identify the strongest coefficient of layer l, for l=1, . . . , v, i.e., the element $$k_{l,i_l^*,f_l^*,r_l^*}^{(2)}$$

of $i_{2,4,l}$, where the indices $$r_l^* \in \{1, \ldots, Z\}, i_l^* \in \{0, \ldots, 2L_{r_l^*} - 1\}$$

are such that $$I_l^* = 2\sum_{k=1}^{r_l^*-1} L_k + i_l^*.$$

The codebook indices of $n_{3,l,r}$ can be remapped with respect to $$n_{3,l,r}^{(f_l^*)}$$

as $$n_{3,l,r}^{(f)} = \left(n_{3,l,r}^{(f)} - n_{3,l,r}^{(f_l^*)}\right) \bmod N_3,$$

such that $$n_{3,l,r_l^*}^{(f_l^*)} = 0,$$

after remapping. The index f is remapped with respect to $$f_l^*$$

as $$f = (f - f_l^*) \bmod M_{v,r},$$

54 such that the index of the strongest coefficient is $$f_l^* = 0$$

$$(l = 1, \ldots, v),$$

after remapping. The indices of $i_{2,4,l}$, $i_{2,5,l}$ and $i_{1,7,l}$ indicate amplitude coefficients, phase coefficients and bitmap after remapping.

When the FD basis vectors are the same for all TRPs or CSI-RS resources, the subscript r from $$n_{3,l,r} \text{ and } n_{3,l,r}^{(f_l^*)}$$

can be dropped. Hence, the codebook indices of $n_{3,l}$ are remapped with respect to $$n_{3,l}^{(f_l^*)}$$

as $$n_{3,l}^{(f)} = \left(n_{3,l}^{(f)} - n_{3,l}^{(f_l^*)}\right) \bmod N_3,$$

such that $$n_{3,l}^{(f_l^*)} = 0,$$

after remapping. The index f is remapped with respect to $$f_l^*$$

as $$f = (f - f_l^*) \bmod M_v,$$

such that the index of the strongest coefficient is $$f_l^* = 0,$$

for each layer l=1, . . . , v, after remapping. The indices of $i_{2,4,l}$, $i_{2,5,l}$ and $i_{1,7,l}$ indicate amplitude coefficients, phase coefficients and bitmap after remapping.

In one example, a joint indicator $$(I_l^*)$$

is used to indicate $$(i_l^*, r_l^*).$$

For the case when $L_r = L$, the strongest coefficient of layer 1 is identified by the joint indicator $i_{1,8,l} \in \{0, 1, \ldots, 2LZ-1\}$, which is obtained as follows. When $r \in \{0, 1, \ldots, Z-1\}$ $$i_{1,8,l} = I_l^* = 2Lr_l^* + i_l^* \text{ or}$$

$$i_{1,8,l} = I_l^* = Zi_l^* + r_l^* \text{ for}$$

$$l = 1, \ldots, v. \text{ Or, when } r \in \{1, \ldots, Z\}$$

$$i_{1,8,l} = I_l^* = 2L(r_l^* - 1) + i_l^* \text{ or}$$

$$i_{1,8,l} = I_l^* = Zi_l^* + (r_l^* - 1).$$

For the case when $L_r$ can be different across r values, the strongest coefficient of layer 1 is identified by the joint indicator $$i_{1,8,l} \in \left\{0, 1, \ldots, 2\sum_{r=1}^{Z} L_r - 1\right\},$$

which is obtained as:

$$i_{1,8,l} = I_l^* \in \left\{0, 1, \ldots, 2\sum_{r=1}^{Z} L_r - 1\right\}.$$

The payload for reporting $i_{1,8,l}$ therefore is $$\lceil \log_2(2LZ) \rceil \text{ or } \left\lceil \log_2\left(2\sum_{r=1}^{Z} L_r\right) \right\rceil$$

bits. Similar to Rel. 16 enhanced Type II codebook (5.2.2.2.5, 38.214), $$k^{(1)}_{l,\left|\frac{i_l^*}{L_{r_l^*}}\right|} \text{ or}$$

$$k^{(1)}_{l,\left|\frac{i_l^*}{L}\right|,r_l^*} = 15,$$

$$k^{(2)}_{l,i_l^*,0,r_l^*} = 7,$$

$$k^{(3)}_{l,i_l^*,0,r_l^*} = 1$$

and $c_{l,i^*_l,0,r^*_l} = 0$ ($l=1, \ldots, v$). The indicators $$k^{(1)}_{l,\left|\frac{i_l^*}{L_{r_l^*}}\right|} \text{ or}$$

$$k^{(1)}_{l,\left|\frac{i_l^*}{L}\right|,r_l^*},$$

$$k^{(2)}_{l,i_l^*,0,r_l^*} \text{ and } c_{l,i_l^*,0,r_l^*}$$

are not reported for $l=1, \ldots, v$. Note that $$f_l^* = 0$$

due to the remapping.

In one example, depending on the rank value v, for rank>1 (i.e., v>1, e.g., $1 < v \leq 4$), the SCI is obtained and reported as above, and for rank=1 (v=1), the SCI is obtained (from the bitmap) as follows. For the case when $$L_r = L,$$

$$i_{1,8,l} = \left(\sum_{i=0}^{i_1^*} \sum_{r=0}^{r_1^*} k^{(3)}_{1,i,0,r}\right) - 1 \text{ or } i_{1,8,l} = \left(\sum_{r=0}^{r_1^*} \sum_{i=0}^{i_1^*} k^{(3)}_{1,i,0,r}\right) - 1 \text{ or } i_{1,8,l} =$$

$$\left(\sum_{i=0}^{i_1^*} \sum_{r=0}^{Z-1} k^{(3)}_{1,i,0,r}\right) - 1 \text{ or } i_{1,8,l} = \left(\sum_{r=0}^{r_1^*} \sum_{i=0}^{2L-1} k^{(3)}_{1,i,0,r}\right) - 1,$$

and reported using $\lceil \log_2 K^{NZ} \rceil$ or $\lceil \log_2(2LZ) \rceil$ bits.

For the case when $L_r$ can be different across r values, the strongest coefficient of layer 1 is identified by the joint indicator $$i_{1,8,l} \in \left\{0, 1, \ldots, 2\sum_{r=1}^{Z} L_r - 1\right\},$$

which is obtained according to at least one of the following examples.

In one example, the strongest coefficient of layer $l=1, \ldots, v$ is identified by:

$$i_{1,8,l} \in \left\{0, 1, \ldots, 2\sum_{r=1}^{Z} L_r - 1\right\},$$

which, depending on the rank value v is obtained as follows:

$$i_{1,8,l} = \begin{cases} \left(\displaystyle\sum_{r=1}^{r_l^*-1} \sum_{i=0}^{2L_r-1} k^{(3)}_{1,i,0,r}\right) + \displaystyle\sum_{i=0}^{i_l^*} k^{(3)}_{1,i,0,r_l^*} - 1 & v = 1 \\ I_l^* & 1 < v \leq 4 \end{cases}$$

for $l=1, \ldots, v$.

In one example, let $$S_{r,V} = \sum_{i=0}^{V} k^{(3)}_{1,i,0,r}$$

where $$\sum_{r=1}^{0} S_{r,2L_r-1} = 0,$$

then $i_{1,8,l}$ is obtained as follows:

$$i_{1,8,l} = \begin{cases} \displaystyle\sum_{r=1}^{r_l^*-1} S_{r,2L_r-1} + S_{r_l^*,i_l^*} - 1 & v = 1 \\ I_l^* & 1 < v \leq 4 \end{cases}$$

In one example, let $$S_{r_l^*-1} = \sum_{r=1}^{r_l^*-1} \sum_{i=0}^{2L_r-1} k^{(3)}_{1,i,0,r},$$

where $S_0 = 0$, then $i_{1,8,l}$ is obtained as follows:

$$i_{1,8,l} = \begin{cases} S_{r_l^*} + \sum_{i=0}^{i_l^*} k_{1,i,0,r_l^*}^{(3)} - 1 & \upsilon = 1 \\ I_l^* & 1 < \upsilon \le 4 \end{cases}.$$

In one example, $i_{1,8,l}$ is obtained as follows:

$$i_{1,8,l} = \begin{cases} \sum_{I=0}^{I_l^*} \kappa_{1,I,0}^{(3)} - 1 & \upsilon = 1 \\ I_l^* & 1 < \upsilon \le 4 \end{cases}.$$

where let $$\kappa_{1,I,0}^{(3)} = k_{1,i,0,r}^{(3)},$$

where I is an index which maps to an index pair (i, r) of an SD index i and CSI-RS resource r, and is given by $$I = 2 \sum_{k=1}^{r-1} L_r + i.$$

For a given I, the index pair (i, r) can be obtained as follows:

- For $k = 1, \ldots , Z,$
  - if $\left\lfloor \dfrac{I}{2\sum_{n=1}^{k} L_n} \right\rfloor = 0,$
    - $r = k$
    - $i = I - 2\sum_{n=1}^{k-1} L_n$
    - Stop
  - Else, continue.

Alternatively, for a given I, the index pair (i, r) can be obtained as follows:

For $k = 1, \ldots , Z,$ if $I - 2\sum_{n=1}^{k} L_n + 1 \le 0,$ $r = k$ $i = I - 2\sum_{n=1}^{k-1} L_n$ Stop Else, continue.

In one example, two separate indicators are used to indicate $$(i_l^*, r_l^*).$$

The TRP (CSI-RS resource) index $$r_l^*$$

is identified by a first indicator $i_{1,9,l} \in \{0, 1, \ldots , Z-1\}$, and the corresponding strongest coefficient of layer 1 is identified by the second indicator $i_{1,8,l} \in \{0, 1, \ldots , 2L-1\}$, which are obtained as follows:

$$i_{1,8,l} = i_l^* \text{ and } i_{1,9,l} = r_l^*$$

for $l=1, \ldots , v$. The payload for reporting $i_{1,8,l}$ and $i_{1,9,l}$ therefore are $\lceil \log_2(2\,L) \rceil$ bits and $\lceil \log_2(Z) \rceil$ bits, respectively. Similar to Rel. 16 enhanced Type II codebook (5.2.2.2.5, 0.56.214), $$k_{l,\left\lfloor \frac{i_l^*}{L} \right\rfloor, r_l^*}^{(1)} = 15,$$

$$k_{l,i_l^*,0,r_l^*}^{(2)} = 7,$$

$$k_{l,i_l^*,0,r_l^*}^{(3)} = 1$$

and $c_{l,i^*_l,0,r^*_l} = 0$ ($l=1, \ldots , v$). The indicators $$k_{l,\left\lfloor \frac{i_l^*}{L} \right\rfloor, r_l^*}^{(1)},$$

$$k_{l,i_l^*,0,r_l^*}^{(2)}$$

and $c_{l,i^*_l,0,r^*_l}$ are not reported for $l=1, \ldots , v$. Note that $$f_l^* = 0$$

due to the remapping.

In one example, for rank>1 (i.e., v>1, e.g., 1<v≤4), the SCI is obtained and reported as above, and for rank=1 (v=1), the SCI is obtained (from the bitmap) as $$i_{1,8,l} = \sum_{i=0}^{i_1^*} k_{1,i,0,r_1^*}^{(3)} - 1,$$

and reported using $$\lceil \log_2 K_{1,r_1^*}^{NZ} \rceil \text{ or } \lceil \log_2 (2LM_v) \rceil$$

bits, where $$K_{1,r_1^*}^{NZ} = \sum_{i=0}^{2L-1} \sum_{f=0}^{M_v-1} k_{l,i,f,r_1^*}^{(3)}$$

is the number of nonzero coefficients for TRP (CSI-RS resource) index $$r_l^*.$$

In one embodiment, there is one strongest coefficient across all Z TRPs and there is no remapping of FD indices performed.

In one example, for the case when $L_r = L$, let $$f_l^* \in \{0, 1, \ldots, M_v - 1\}$$

be the index of $i_{2,4,l}$, $i^*_l \in \{0, 1, \ldots, 2L-1\}$ be the index of $$k_{l,i_l^*}^{(2)},$$

and $r^*_l \in \{0, 1, \ldots, Z-1\}$ be the index of $$k_{l,i_l^*,f_l^*}^{(2)},$$

which identify the strongest coefficient of layer 1, i.e., the element $$k_{l,i_l^*,f_l^*,r_l^*}^{(2)}$$

of $i_{2,4,l}$, of $l=1, \ldots, v$.

In one example, for the case when $L_r$ can be different across r values, let $$f_l^* \in \{0, 1, \ldots, M_v - 1\} \text{ and } I_l^* \in \left\{0, 1, \ldots, \sum_{r=1}^{Z} K_{1,r} - 1\right\}$$

be the indices which identify the strongest coefficient of layer 1, for $l=1, \ldots, v$, i.e., the element $$k_{l,i_l^*,f_l^*,r_l^*}^{(2)} \text{ of } i_{2,4,l},$$

where the indices $$r_l^* \in \{1, \ldots, Z\}, i_l^* \in \{0, \ldots, K_{1,r} - 1\}$$

are such that $$I_l^* = 2\sum_{k=1}^{r_l^*-1} L_k + i_l^* = \sum_{k=1}^{r_l^*-1} K_{1,r} + i_l^*.$$

$K_{1,r}$ ports are selected from the $P_{CSI\text{-}RS}$ ports of the r-th selected CSI-RS resource, for r=1, . . . , Z, based on $L_r$ vectors, $$v_{m_r^{(i)}}, i = 0, 1, \ldots, L_r - 1,$$

which are indicated by $i_{1,2}$, where:

$$i_{1,2} = [i_{1,2,1} \ldots i_{1,2,Z}]$$

$$i_{1,2,r} \in \left\{0, 1, \ldots, \left(\binom{\frac{P_{CSI\text{-}RS}}{2}}{L_r}\right) - 1\right\}$$

Let $$m = [m_1 \ldots m_Z]$$

$$m_r = [m_r^{(0)} \ldots m_r^{(L_r-1)}]$$

$$m_r^{(i)} \in \left\{0, 1, \ldots, \frac{P_{CSI\text{-}RS}}{2} - 1\right\}$$

the index $i_{1,2,r}$ for the r-th selected CSI-RS resource, r=1, . . . , Z, is obtained from the $L_r$ elements of $m_r$, as described in Clause 5.2.2.2.7 of TS 38.214 for the indicator $i_{1,2}$, obtained from the L elements of m. Vector $$v_{m_r^{(i)}}$$

is a $P_{CSI\text{-}RS}/2$-element column vector containing a value of 1 in the element of index $$m_r^{(i)}$$

and zeros elsewhere, and where the first element is the element of index 0.

In one example, a joint indicator is used to indicate $$(i_l^*, f_l^*, r_l^*).$$

For the case when $L_r = L$, the strongest coefficient of layer l=1, . . . , v is identified by the index:

$$i_{1,8,l} \in \{0, 1, \ldots, 2LM_vZ - 1\}$$

which is found from:

$$i_{1,8,l} = 2LM_v r_l^* + 2L f_l^* + i_l^*, \text{ or}$$

$$i_{1,8,l} = 2LM_v r_l^* + M_v i_l^* + f_l^*, \text{ or}$$

$$i_{1,8,l} = M_v Z i_l^* + M_v r_l^* + f_l^*, \text{ or}$$

$$i_{1,8,l} = M_v Z i_l^* + Z f_l^* + r_l^*, \text{ or}$$

-continued $$i_{1,8,l} = 2LZf_l^* + 2Lr_l^* + i_l^*, \text{ or}$$

$$i_{1,8,l} = 2LZf_l^* + Zi_l^* + r_l^*$$

for l=1, . . . , v.

For the case when $L_r$ can be different across r values (example B above), the strongest coefficient of layer 1 is identified by the joint indicator $$i_{1,8,l} \in \left\{ 0, 1, \dots, 2M_v \sum\nolimits_{r=1}^{Z} L_r - 1 \right\} = \left\{ 0, 1, \dots, M_v \sum\nolimits_{r=1}^{Z} K_{1,r} - 1 \right\},$$

which is obtained as:

$$i_{1,8,l} = f_l^* \sum\nolimits_{r=1}^{Z} K_{1,r} + l_l^*.$$

In one example, $M_v = M$.

The payload for reporting $i_{1,8,l}$ therefore is $\lceil \log_2(2LM_vZ) \rceil$ or $$\left\lceil \log_2 \left( 2M_v \sum\nolimits_{r=1}^{Z} L_r \right) \right\rceil = \left\lceil \log_2 \left( M_v \sum\nolimits_{r=1}^{Z} K_{1,r} \right) \right\rceil$$

bits. Similar to Rel. 16 enhanced Type II codebook (5.2.2.2.5, 38.214), $$k_{l, \left\lfloor \frac{i_l^*}{L} \right\rfloor, r_l^*}^{(1)} = 15,$$

$$k_{l, i_l^*, f_l^*, r_l^*}^{(2)} = 7,$$

$$k_{l, i_l^*, f_l^*, r_l^*}^{(3)} = 1$$

and $$c_{l, i_l^*, f_l^*, r_l^*} = 0 \ (l = 1, \dots, v).$$

The indicators $$k_{l, \left\lfloor \frac{i_l^*}{L} \right\rfloor, r_l^*}^{(1)}, k_{l, i_l^*, f_l^*, r_l^*}^{(2)}$$

and $$c_{l, i_l^*, f_l^*, r_l^*}.$$

are not reported for l=1, . . . , v.

In one example, for rank>1 (i.e., v>1, e.g., 1<v≤4), the SCI is obtained and reported as above, and for rank=1 (v=1), the SCI is obtained (from the bitmap) as $$i_{1,8,l} = \left( \sum\nolimits_{r=0}^{Z-1} \sum\nolimits_{i=0}^{2L-1} \sum\nolimits_{f=0}^{M_v-1} k_{l,i,f,r}^{(3)} \right) - 1 \text{ or}$$

-continued $$i_{1,8,l} = \left( \sum\nolimits_{i=0}^{2L-1} \sum\nolimits_{f=0}^{M_v-1} \sum\nolimits_{r=0}^{Z-1} k_{l,i,f,r}^{(3)} \right) - 1,$$

and reported using $\lceil \log_2 K^{NZ} \rceil$ or $\lceil \log_2(2LM_vZ) \rceil$ bits.

In one example, two indicators are used to indicate $$(i_l^*, f_l^*) \text{ and } r_l^*$$

separately. The TRP (CSI-RS resource) index $$r_l^*$$

is identified by a first indicator $i_{1,9,l} \in \{0, 1, \dots, Z-1\}$, and the corresponding strongest coefficient of layer 1 is identified by the second indicator $i_{1,8,l} \in \{0, 1, \dots, 2LM_v-1\}$, which are obtained as follows:

$$i_{1,8,l} = 2Lf_l^* + i_l^* \text{ or } i_{1,8,l} = M_v i_l^* + f_l^*, \text{ and } i_{1,9,l} = r_l^*$$

for l=1, . . . , v. The payload for reporting $i_{1,8,l}$ and $i_{1,9,l}$ therefore are $\lceil \log_2(2LM_v) \rceil$ bits and $\lceil \log_2(Z) \rceil$ bits, respectively. Similar to Rel. 16 enhanced Type II codebook (5.2.2.2.5, 38.214), $$k_{l, i_l^*, f_l^*, r_l^*}^{(2)} = 7, k_{l, i_l^*, f_l^*, r_l^*}^{(3)} = 1 \text{ and } c_{l, i_l^*, f_l^*, r_l^*} = 0 \ (l = 1, \dots, v).$$

The indicators $$k_{l, \left\lfloor \frac{i_l^*}{L} \right\rfloor, r_l^*}^{(1)},$$

$$k_{l, i_l^*, f_l^*, r_l^*}^{(2)}$$

and $$c_{l, i_l^*, f_l^*, r_l^*}$$

are not reported for l=1, . . . , v.

In one example, for rank>1 (i.e., v>1, e.g., 1<v≤4), the SCI is obtained and reported as above, and for rank=1 (v=1), the SCI is obtained (from the bitmap) as $$i_{1,8,l} = \left( \sum\nolimits_{i=0}^{i_1^*} \sum\nolimits_{f=0}^{M_v-1} k_{1,i,f,r_1^*}^{(3)} \right) - 1 \text{ or } i_{1,8,l} = \left( \sum\nolimits_{f=0}^{f_l^*} \sum\nolimits_{i=0}^{2L-1} k_{1,i,f,r_1^*}^{(3)} \right) - 1,$$

and reported using $\lceil \log_2 K_{1,r_1^*}^{NZ} \rceil$ or $\lceil \log_2(2LM_v) \rceil$ bits, where $K_{1,r_1^*}^{NZ} = \sum\nolimits_{i=0}^{2L-1} \sum\nolimits_{f=0}^{M_v-1} k_{l,i,f,r_1^*}^{(3)}$ is the number of nonzero coefficients for TRP (CSI-RS resource) index $$r_l^*.$$

In one example, two indicators are used to indicate $$(i_l^*, r_l^*) \text{ and } f_l^*$$

separately. The FD index $$f_l^*$$

is identified by a first indicator $i_{1,9,l} \in \{0, 1, \ldots, M_v-1\}$, and the corresponding strongest coefficient of layer l is identified by the second indicator $i_{1,8,l} \in \{0, 1, \ldots, 2LZ-1\}$, which are obtained as follows:

$$i_{1,8,l} = 2Lr_l^* + i_l^* \text{ or } i_{1,8,l} = Zi_l^* + r_l^*, \text{ and } i_{1,9,l} = f_l^*,$$

for l=1, . . . , v. The payload for reporting $i_{1,8,l}$ and $i_{1,9,l}$ therefore are $\lceil \log_2(2LZ) \rceil$ bits and $\lceil \log_2(M_v) \rceil$ bits, respectively. Similar to Rel. 16 enhanced Type II codebook (5.2.2.5, 38.214), $$k_{l,i_l^*,f_l^*,r_l^*}^{(2)} = 7, \; k_{l,i_l^*,f_l^*,r_l^*}^{(3)} = 1 \text{ and } c_{l,i_l^*,f_l^*,r_l^*} = 0 \; (l = 1, \ldots, v).$$

The indicators $$k_{l,\lfloor\frac{i_l^*}{L}\rfloor,r_l^*}^{(1)}, k_{l,i_l^*,f_l^*,r_l^*}^{(2)}$$

and $$c_{l,i_l^*,f_l^*,r_l^*}$$

are not reported for l=1, . . . , v.

In one example, for rank>1 (i.e., v>1, e.g., 1<v≤4), the SCI is obtained and reported as above, and for rank=1 (v=1), the SCI is obtained (from the bitmap) as $$i_{1,8,l} = \left(\sum_{i=0}^{i_1^*}\sum_{r=0}^{Z-1} k_{1,i,f_1^*,r}^{(3)}\right) - 1 \text{ or } i_{1,8,l} = \left(\sum_{r=0}^{r_l^*}\sum_{i=0}^{2L-1} k_{1,i,f_1^*,r}^{(3)}\right) - 1,$$

and reported using $$\left\lceil \log_2 K_{1,f_1^*}^{NZ} \right\rceil \text{ or } \lceil \log_2(2LZ) \rceil \text{ bits, where } K_{1,f_1^*}^{NZ} = \sum_{i=0}^{2L-1}\sum_{r=0}^{Z-1} k_{1,i,f_1^*,r}^{(3)}$$

is the number of nonzero coefficients for TRP (CSI-RS resource) index $$f_l^*.$$

In one example, two indicators are used to indicate $$(f_l^*, r_l^*) \text{ and } i_l^*$$

separately. The SD index $$i_l^*$$

is identified by a first indicator $i_{1,8,l} \in \{0, 1, \ldots, 2L-1\}$, and the corresponding strongest coefficient of layer l is identified by the second indicator $i_{1,9,l} \in \{0, 1, \ldots, M_vZ-1\}$, which are obtained as follows:

$$i_{1,8,l} = i_l^* \text{ and } i_{1,9,l} = Zf_l^* + r_l^* \text{ or } i_{1,9,l} = M_vr_l^* + f_l^*,$$

for l=1, . . . , v. The payload for reporting $i_{1,8,l}$ and $i_{1,9,l}$ therefore are $\lceil \log_2(2L) \rceil$ bits and $\lceil \log_2(M_vZ) \rceil$ bits, respectively. Similar to Rel. 16 enhanced Type II codebook (5.2.2.5, 38.214), $$k_{l,i_l^*,f_l^*,r_l^*}^{(2)} = 7, \; k_{l,i_l^*,f_l^*,r_l^*}^{(3)} = 1 \text{ and } c_{l,i_l^*,f_l^*,r_l^*} = 0 \; (l = 1, \ldots, v).$$

The indicators $$k_{l,\lfloor\frac{i_l^*}{L}\rfloor,r_l^*}^{(1)}, k_{l,i_l^*,f_l^*,r_l^*}^{(2)}$$

and $$c_{l,i_l^*,f_l^*,r_l^*}$$

are not reported for l=1, . . . , v.

In one example, for rank>1 (i.e., v>1, e.g., 1<v≤4), the SCI is obtained and reported as above, and for rank=1 (v=1), the SCI is obtained (from the bitmap) as $$i_{1,8,l} = \left(\sum_{f=0}^{f_1^*}\sum_{r=0}^{Z-1} k_{1,i_1^*,f,r}^{(3)}\right) - 1 \text{ or } i_{1,8,l} = \left(\sum_{r=0}^{r_1^*}\sum_{f=0}^{M_v-1} k_{1,i_1^*,f,r}^{(3)}\right) - 1,$$

and reported using $$\left\lceil \log_2 K_{1,i_1^*}^{NZ} \right\rceil \text{ or } \lceil \log_2(M_vZ) \rceil$$

bits, where $$K_{1,i_1^*}^{NZ} = \sum_{f=0}^{M_v-1}\sum_{r=0}^{Z-1} k_{1,i_1^*,f,r}^{(3)}$$

is the number of nonzero coefficients for TRP (CSI-RS resource) index $$f_l^*.$$

In one example, three indicators are used to indicate $$i_l^*, f_l^*, \text{ and } r_l^*$$

separately. The SD index $$i_l^*$$

is identified by a first indicator $i_{1,8,l} \in \{0, 1, \ldots, 2L-1\}$, the FD index $$f_l^*$$

is identified by a second indicator $i_{1,9,l} \in \{0, 1, \ldots, M_v-1\}$, and the TRP index $$r_l^*$$

is identified by a second indicator $i_{1,10,l} \in \{0, 1, \ldots, Z-1\}$, which are obtained as follows:

$$i_{1,8,l} = i_l^* \text{ and } i_{1,9,l} = f_l^* \text{ and } i_{1,10,l} = r_l^*,$$

for l=1, . . . , v. The payload for reporting $i_{1,8,l}$, $i_{1,9,l}$, and $i_{1,10,l}$ therefore are $\lceil \log_2(2L) \rceil$ bits, $\lceil \log_2(M_v) \rceil$ bits, and $\lceil \log_2(Z) \rceil$ bits, respectively. Similar to Rel. 16 enhanced Type II codebook (5.2.2.2.5, 38.214), $$k_{l,i_l^*,f_l^*,r_l^*}^{(2)} = 7, k_{l,i_l^*,f_l^*,r_l^*}^{(3)} = 1$$

and $$c_{l,i_l^*,f_l^*,r_l^*} = 0(l = 1, \ldots, v).$$

The indicators $$k_{l,\left\lfloor \frac{i_l^*}{L} \right\rfloor, r_l^*}^{(1)}, k_{l,i_l^*,f_l^*,r_l^*}^{(2)}$$

and $$c_{l,i_l^*,f_l^*,r_l^*}$$

are not reported for l=1, . . . , v.

In one embodiment, there is one strongest coefficient for each TRP (i.e., Z SCIs in total), and there can be remapping of FD indices performed w.r.t. the FD index of one of the Z strongest coefficients, the details of the remapping are as described in embodiment III.1. Let $$r_l^*$$

be the index w.r.t. which the remapping is applied. Let $$f_{l,r_l}^* \in \{0, 1, \ldots, M_v - 1\}$$

be the index of $i_{2,4,l}$, $$i_{l,r_l}^* \in \{0, 1, \ldots, 2L - 1\}$$

be the index of $$k_{l,f_{l,r_l}^*}^{(2)},$$

and $r_l \in \{0, 1, \ldots, Z-1\}$ be the index of $$k_{l,i_{l,r_l}^*,f_{l,r_l}^*}^{(2)},$$

which identify the strongest coefficient of layer l and TRP $r_l$, i.e., the element $$k_{l,i_{l,r_l}^*,f_{l,r_l}^*,r_l}^{(2)}$$

of $i_{2,4,l}$, for l=1, . . . , v.

The strongest coefficients of layer l are identified by indicators $i_{1,8,l,r_l}(r_l=1, \ldots, Z)$, where:

$$i_{1,8,l,r_l^*} \in \{0, 1, \ldots, 2L - 1\} \text{ and }$$

$$i_{1,8,l,r_l} \in \{0, 1, \ldots, 2LM_v - 1\} \text{ for } r_l \neq r_l^*$$

which are obtained as follows:

$$i_{1,8,l,r_l^*} = i_{l,r_l^*}^*$$

$$i_{1,8,l,r_l} = 2Lf_{l,r_l}^* + i_{l,r_l}^* \text{ or } M_v i_{l,r_l}^* + f_{l,r_l}^* \text{ for } r_l \neq r_l^*$$

for l=1, . . . , v. The payload for reporting $i_{1,8,l,r_l^*}$ and $i_{1,8,l,l}$ therefore are $\lceil \log_2(2L) \rceil$ bits, and $\lceil \log_2(2LM_v) \rceil$ bits. Similar to Rel. 16 enhanced Type II codebook (5.2.2.2.5, 38.214), For $r_l = r^*_l$:

$$k^{(1)}_{l,\left\lfloor \frac{i^*_{l,r^*_l}}{L} \right\rfloor, r^*_l} = 15, k^{(2)}_{l,i^*_{l,r^*_l},0,r^*_l} = 7, k^{(3)}_{l,i^*_{l,r^*_l},0,r^*_l} = 1 \text{ and}$$

$$c_{l,i^*_{l,r^*_l},0,r^*_l} = 0 (l = 1, \ldots, v).$$

The indicators $$k^{(1)}_{l,\left\lfloor \frac{i^*_{l,r^*_l}}{L} \right\rfloor, r^*_l}, k^{(2)}_{l,i^*_{l,r^*_l},0,r^*_l} \text{ and } c_{l,i^*_{l,r^*_l},0,r^*_l}$$

are not reported for l=1, . . . , v.

Note that $$f^*_{l,r^*_l} = 0$$

due to the remapping.

For $r_l \neq r^*_l$:

$$k^{(1)}_{l,\left\lfloor \frac{i^*_{l,r_l}}{L} \right\rfloor, r_l} = 15, k^{(2)}_{l,i^*_{l,r_l},f^*_{l,r_l},r_l} = 7, k^{(3)}_{l,i^*_{l,r_l},f^*_{l,r_l},r_l} = 1$$

$$\text{and } c_{l,i^*_{l,r_l},f^*_{l,r_l},r_l} = 0 (l = 1, \ldots, v).$$

The indicators $$k^{(1)}_{l,\left\lfloor \frac{i^*_{l,r_l}}{L} \right\rfloor, r_l}, k^{(2)}_{l,i^*_{l,r_l},f^*_{l,r_l},r_l} \text{ and } c_{l,i^*_{l,r_l},f^*_{l,r_l},r_l}$$

are not reported for l=1, . . . , v.

The TRP index $r^*_l$ can be identified by a second indicator $i_{1,10,l} \in \{0, 1, \ldots, Z-1\}$. The payload for reporting $i_{1,10,l}$ therefore is $\lceil \log_2(Z) \rceil$ bits.

In one example, for rank>1 (i.e., v>1, e.g., 1<v≤4), the SCI is obtained and reported as above, and for rank=1 (v=1), the SCI is obtained (from the bitmap) as $$i_{1,8,l,r} = \left( \sum_{i=0}^{i^*_1} k^{(3)}_{1,i,0,r} \right) - 1$$

and reported using $$\lceil \log_2 K^{NZ}_{1,r} \rceil \text{ or } \lceil \log_2(2L) \rceil$$

bits.

In one embodiment, there is one strongest coefficient for each TRP (i.e., Z SCIs in total), and there can be remapping of FD indices performed w.r.t. the FD index of one of the Z strongest coefficients, the details of the remapping are as described in various embodiments disclosed herein. Let $r^*_l$ be the index w.r.t. which the remapping is applied. Let $f^*_{l,r_l} \in \{0, 1, \ldots, M_v-1\}$ be the index of $i_{2,4,l}$, $i^*_{l,r_l} \in \{0, 1, \ldots, 2L-1\}$ be the index of $$k^{(2)}_{l,i^*_{l,r_l},}$$

and $r_l \in \{0, 1, \ldots, Z-1\}$ be the index of $$k^{(2)}_{l,i^*_{l,r_l},f^*_{l,r_l},}$$

which identify the strongest coefficient of layer l and TRP $r_l$, i.e., the element $$k^{(2)}_{l,i^*_{l,r_l},f^*_{l,r_l},r_l}$$

of $i_{2,4,l}$, for l=1, . . . , v.

The strongest coefficients of layer l are identified by indicators $i_{1,8,l,r_l}(r_l=1, \ldots, Z)$, where:

$$i_{1,8,l,r^*_l} \in \{0, 1, \ldots, 2LZ - 1\} \text{ and}$$

$$i_{1,8,l,r_l} \in \{0, 1, \ldots, 2LM_v - 1\} \text{ for } r_l \neq r^*_l$$

which are obtained as follows:

$$i_{1,8,l,r^*_l} = Zi^*_{l,r^*_l} + r^*_l \text{ or } 2Lr^*_l + i^*_{l,r^*_l}$$

$$i_{1,8,l,r_l} = 2Lf^*_{l,r_l} + i^*_{l,r_l} \text{ or } M_v i^*_{l,r_l} + f^*_{l,r_l} \text{ for } r_l \neq r^*_l$$

for l=1, . . . , v. Note that $i_{1,8,l,r^*_l}$ is a joint indicator to indicate $(r^*_l, i^*_{l,r^*_l})$. The payload for reporting $i_{1,8,l,r^*_l}$ and $i_{1,8,l,r_l}$ therefore are $\lceil \log_2(2LZ) \rceil$ bits, and $\lceil \log_2(2LM_v) \rceil$ bits. Similar to Rel. 16 enhanced Type II codebook (5.2.2.2.5, 38.214), For $r_l = r^*_l$:

$$k^{(1)}_{l,\left\lfloor \frac{i^*_{l,r^*_l}}{L} \right\rfloor, r^*_l} = 15, k^{(2)}_{l,i^*_{l,r^*_l},0,r^*_l} = 7, k^{(3)}_{l,i^*_{l,r^*_l},0,r^*_l} = 1 \text{ and}$$

$$c_{l,i^*_{l,r^*_l},0,r^*_l} = 0 (l = 1, \ldots, v).$$

The indicators $$k^{(1)}_{l,\left\lfloor \frac{i^*_{l,r^*_l}}{L} \right\rfloor, r^*_l}, k^{(2)}_{l,i^*_{l,r^*_l},0,r^*_l} \text{ and } c_{l,i^*_{l,r^*_l},0,r^*_l}$$

are not reported for l=1, . . . , v. Note that $f^*_{l,r^*_l}=0$ due to the remapping.

For $r_l \neq r^*_l$:

$$k^{(1)}_{l,\left\lfloor \frac{i^*_{l,r_l}}{L} \right\rfloor, r_l} = 15, k^{(2)}_{l,i^*_{l,r_l},f^*_{l,r_l},r_l} = 7, k^{(3)}_{l,i^*_{l,r_l},f^*_{l,r_l},r_l} = 1 \text{ and}$$

$$c_{l,i^*_{l,r_l},f^*_{l,r_l},r_l} = 0 (l = 1, \ldots, v).$$

The indicators $$k^{(1)}_{l,\left\lceil\frac{i^*_{l,r_l}}{L}\right\rceil,r_l}, k^{(2)}_{l,i^*_{l,r_l},f^*_{l,r_l},r_l} \text{ and } c_{l,i^*_{l,r_l},f^*_{l,r_l},r_l}$$

are not reported for l=1, . . . , v.

In one example, for rank>1 (i.e., v>1, e.g., 1<v≤4), the SCI is obtained and reported as above, and for rank=1 (v=1), the SCI is obtained (from the bitmap) as $$i_{1,8,l,r} = \left(\sum_{i=0}^{i^*_1} k^{(3)}_{1,i,f,r}\right) - 1$$

and reported using $$\lceil \log_2 K^{NZ}_{1,r}\rceil \text{ or } \lceil \log_2(2L)\rceil$$

bits for one TRP, and as $$i_{1,8,l,r} = \left(\sum_{i=0}^{i^*_1}\sum_{f=0}^{M_v-1} k^{(3)}_{1,i,f,r}\right) - 1$$

and reported using $$\lceil \log_2 K^{NZ}_{1,r}\rceil \text{ or } \lceil \log_2(2LM_v)\rceil$$

bits for other TRPs.

In one embodiment, there is one strongest coefficient for each TRP (i.e., Z SCIs in total), and there is no remapping of FD indices performed.

The strongest coefficients of layer 1 are identified by indicators $i_{1,8,l,r_l}$(r$_l$=1, . . . , Z), where:

$$i_{1,8,l,r_l} \in \{0, 1, \ldots, 2LM_v - 1\}$$

which are obtained as follows:

$$i_{1,8,l,r_l} = 2Lf^*_{l,r_l} + i^*_{l,r_l} \text{ or } M_v i^*_{l,r_l} + f^*_{l,r_l}$$

for l=1, . . . , v. The payload for reporting $i_{1,8,l,r_l}$ therefore is $\lceil \log_2(2LM_v)\rceil$ bits. Similar to Rel. 16 enhanced Type II codebook (5.2.2.2.5, 38.214), $$k^{(1)}_{l,\left\lceil\frac{i^*_{l,r_l}}{L}\right\rceil,r_l} = 15, k^{(2)}_{l,i^*_{l,r_l},f^*_{l,r_l},r_l} = 7, k^{(3)}_{l,i^*_{l,r_l},f^*_{l,r_l},r_l} = 1 \text{ and}$$

$$c_{l,i^*_{l,r_l},f^*_{l,r_l},r_l} = 0(l = 1, \ldots, v).$$

The indicators $$k^{(1)}_{l,\left\lceil\frac{i^*_{l,r_l}}{L}\right\rceil,r_l}, k^{(2)}_{l,i^*_{l,r_l},f^*_{l,r_l},r_l} \text{ and } c_{l,i^*_{l,r_l},f^*_{l,r_l},r_l}$$

are not reported for l=1, . . . , v.

In one example, for rank>1 (i.e., v>1, e.g., 1<v≤4), the SCI is obtained and reported as above, and for rank=1 (v=1), the SCI is obtained (from the bitmap) as $$i_{1,8,l,r} = \left(\sum_{i=0}^{i^*_1}\sum_{f=0}^{M_v-1} k^{(3)}_{1,i,f,r}\right) - 1$$

and reported using $$\lceil \log_2 K^{NZ}_{1,r}\rceil \text{ or } \lceil \log_2(2LM_v)\rceil$$

bits.

Figure 17:
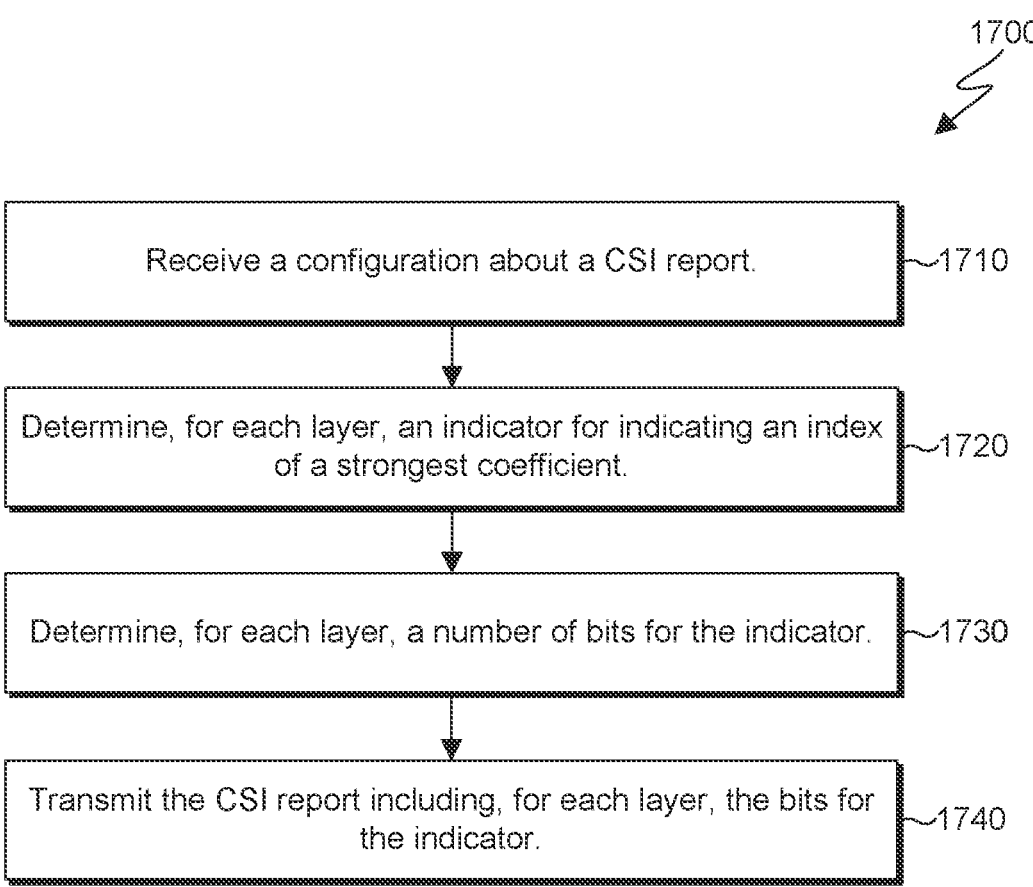
FIG. 17 illustrates an example of a method performed by a UE according to embodiments of the present disclosure.

FIG. 17 illustrates an example method 1700 performed by a UE in a wireless communication system according to embodiments of the present disclosure. The method 1700 of FIG. 17 can be performed by any of the UEs 111-116 of FIG. 1, such as the UE 116 of FIG. 3, and a corresponding method can be performed by any of the BSs 101-103 of FIG. 1, such as BS 102 of FIG. 2. The method 1700 is for illustration only and other embodiments can be used without departing from the scope of the present disclosure.

The method 1700 begins with the UE receiving a configuration about a CSI report (1710). For example, in 1710, the configuration includes information about (i) N$_{TRPg}$ non-zero power (NZP) CSI-reference signal (RS) resources, where N$_{TRP}$≥1, and (ii) a parameter codebookType set to type-II-CJT-r18 or type-II-PortSelection-CJT-r18.

The UE then, based on the configuration, determines, for each layer l=1, . . . , v, an indicator $i_{1,8,l}$ for indicating an index (i*$_l$, f*$_l$, r*$_l$) of a strongest coefficient among $$K^{NZ}_l$$

coefficients (1720). For example, in 1720 where $$K^{NZ}_l$$

is a total number of non-zero coefficients that are associated with Z NZP CSI-RS resources, and Z≤N$_{TRP}$.

The UE then, based on the configuration, determines, for each layer l=1, . . . , v, a number of bits P$_l$ for the indicator $i_{1,8,l}$ (1730). For example, in 1730, when codebookType=type-II-CJT-r18, a value of P$_l$ depends on a value of $$K^{NZ}_l,$$

when v=1, and a value of $$\sum_{r=1}^{Z} L_r,$$

when $1 < v \leq 4$. When codebookType=type-II-PortSelection-CJT-r18, the value of $P_l$ depends on a value of $$2M_v \sum_{r=1}^{Z} L_r$$

for all values of v. Here, v is a total number of layers, $L_r$ is a number of first basis vectors associated with an r-th NZP CSI-RS resource from the Z NZP CSI-RS resources, where $r=1, \ldots, Z$, $M_v$ is a number of second basis vectors, $$i_l^* \in \{0, \ldots, 2L_{r_l^*} - 1\}, f_l^* \in \{0, 1, \ldots, M_v - 1\}, \text{ and } r_l^* \in \{1, \ldots, Z\}.$$

The UE then transmits the CSI report including, for each layer l, $P_l$ bits for the indicator $i_{1,8,l}$ (1740).

In various embodiments, when codebookType=type-II-CJT-r18, $$P_l = P_1 = \lceil \log_2 K_1^{NZ} \rceil$$

when v=1 and $$P_l = \left\lceil \log_2\left(2\sum_{r=1}^{Z} L_r\right) \right\rceil$$

when $1 < v \leq 4$. For example, $$i_{1,8,l} \in \left\{0, 1, \ldots, 2\sum_{r=1}^{Z} L_r - 1\right\}$$

and is obtained as:

$$i_{1,8,l} = \begin{cases} \sum_{l=0}^{I_1^*} \kappa_{1,l,0}^{(3)} - 1 & v = 1 \\ I_l^* & 1 < v \leq 4 \end{cases}$$

where $$\kappa_{1,I,0}^{(3)} = \kappa_{1,i,0,r}^{(3)},$$

and I is an index given by $$I = 2\sum_{r=1}^{r-1} L_r + i, \kappa_{l,i,f,r}^{(3)} = 0$$

or 1 to indicate a coefficient with an index (i, f, r) being zero or non-zero, respectively, and $$I_l^* \in \left\{0, 1, \ldots, 2\sum_{r=1}^{Z} L_r - 1\right\}$$

and is given by $$I_l^* = 2\sum_{kr=1}^{r_l^*-1} L_k + i_l^*.$$

In various embodiments, when codebookType=type-II-PortSelection-CJT-r18, $$P_l = \left\lceil \log_2\left(M_v \sum_{r=1}^{Z} K_{1,r}\right) \right\rceil.$$

For example, $$i_{1,8,l} = f_l^* \sum_{r=1}^{Z} K_{1,r} + I_l^*$$

and is obtained as:

$$i_{1,8,l} = f_l^* \sum_{r=1}^{Z} K_{1,r} + I_l^*$$

where $$I_l^* \in \left\{0, 1, \ldots, \sum_{r=1}^{Z} K_{1,r} - 1\right\}$$

and is given by $$I_l^* = \sum_{r=1}^{r_l^*-1} K_{1,r} - i_l^*$$

and $K_{1,r} = 2L_r$.

In various embodiments, when codebookType=type-II-CJT-r18, the UE may, for each layer l, remap indices of second basis vectors $$n_{3,l}^{(f)},$$

where f=0, $\ldots$, $M_v - 1$, with respect to $$n_{3,l}^{(f_l^*)}$$

as $$n_{3,l}^{(f)} = \left(n_{3,l}^{(f)} - n_{3,l}^{(f_l^*)}\right) \bmod N_3,$$

such that $$n_{3,l}^{(f_l^*)} = 0,$$

after remapping and remap each index f with respect to $$f_l^*$$

as $$f = (f - f_l^*) \bmod M_v,$$

such that $f^*_l = 0$, after remapping.

In various embodiments, the configuration includes a parameter codebookMode, and when codebookMode=mode1, the UE determines a second basis vector offset $O_r$ for each NZP CSI-RS resource r such that $O_1 = 0$, and $O_r \in \{0, 1, \ldots, N_3 - 1\}$ for $r = 2, \ldots, Z$, and transmits the CSI report including an indicator indicating a value of $O_r$ for each $r = 2, \ldots, Z$.

In various embodiments, when codebookType=type-II-CJT-r18, the first basis vectors comprise DFT vectors and, when codebookType=type-II-PortSelection-CJT-r18, the first basis vectors comprise port selection vectors. The second basis vectors comprise DFT vectors with indices belonging to a window of indices given by $\bmod(M_{init} + n, N_3)$, where $n = 0, 1, \ldots, W - 1$, and $W < N_3$. Further, when codebookType=type-II-CJT-r18, the CSI report include an indicator indicating a value of $M_{init}$, and when codebookType=type-II-PortSelection-CJT-r18, $M_{init} = 0$.

Any of the above variation embodiments can be utilized independently or in combination with at least one other variation embodiment.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) in a $3^{rd}$ generation partnership project (3GPP) communication system, the UE comprising:
a transceiver configured to receive a configuration about a channel state information (CSI) report, the configuration including information about (i) $N_{TRP}$ non-zero power (NZP) CSI-reference signal (RS) resources, where $N_{TRP} \geq 1$, and (ii) a parameter codebookType set to type-II-CJT-r18 or type-II-PortSelection-CJT-r18, where TRP is an abbreviation of transmit and receive point and CJT is an abbreviation of a coherent joint transmission; and
a processor operably coupled to the transceiver, the processor, based on the configuration, configured to determine, for each layer $l = 1, \ldots, v$:

an indicator $i_{1,8,l}$ for indicating a strongest coefficient among $$K_l^{NZ}$$

coefficients, where $$K_l^{NZ}$$

is a total number of non-zero coefficients that are associated with Z NZP CSI-RS resources, and $Z \leq N_{TRP}$, and
wherein the transceiver is further configured to transmit the CSI report including, for each layer $l = 1, \ldots, v$, $P_l$ bits for the indicator $i_{1,8,l}$,
wherein:
when codebookType=type-II-CJT-r18, a value of $P_l$ depends on:
a value of $$K_l^{NZ},$$

when $v = 1$, and
a value of $$\sum_{r=1}^{Z} L_{\sigma_r},$$

when $1 < v \leq 4$, and
when codebookType=type-II-PortSelection-CJT-r18, the value of $P_l$ depends on a value of $$2M_v \sum_{r=1}^{Z} L_{\sigma_r}$$

for all values of v, and
wherein v is a rank, $L_{\sigma_r}$ is a number of first vectors associated with an r-th NZP CSI-RS resource from the Z NZP CSI-RS resources, where $r = 1, \ldots, Z$, $M_v$ is a number of second vectors.

2. The UE of claim 1, wherein, when codebookType=type-II-CJT-r18:

$$P_l = P_1 = \lceil \log_2 K_1^{NZ} \rceil$$

when $v = 1$, and $$P_l = \lceil \log_2 \left( 2 \sum_{r=1}^{Z} L_{\sigma_r} \right) \rceil$$

when $1 < v \leq 4$.

3. The UE of claim 2, wherein $$i_{1,8,l} \in \left\{ 0, 1, \ldots, 2 \sum_{r=1}^{Z} L_{\sigma_r} - 1 \right\}$$

and is obtained as:

$$i_{1,8,l} = \begin{cases} \sum_{l=0}^{r_1^*} \kappa_{1,l,0}^{(3)} - 1 & v = 1 \\ I_l^* & 1 < v \le 4 \end{cases}$$

where:

$$\kappa_{1,l,0}^{(3)} = k_{1,i,0,r}^{(3)},$$

and I is an index given by $$I = 2\sum_{k=1}^{r-1} L_{\sigma_k} + i,$$

$$k_{l,i,f,r}^{(3)} = 0$$

or 1 to indicate a coefficient with an index (i, f, r) being zero or non-zero, respectively, $$I_l^* \in \left\{ 0, 1, \ldots, 2\sum_{r=1}^{Z} L_{\sigma_r} - 1 \right\}$$

and is given by $$I_l^* = 2\sum_{k=1}^{r_l^*-1} L_{\sigma_k} + i_l^*,$$

and $$i_l^* \in \{0, \ldots, 2L_{r_l^*} - 1\}, \text{ and } r_l^* \in \{1, \ldots, Z\}.$$

4. The UE of claim 1, wherein, when codebookType=type-II-PortSelection-CJT-r18, $$P_l = \left\lceil \log_2\left(M_v \sum_{r=1}^{Z} K_{1,r}\right) \right\rceil.$$

5. The UE of claim 4, wherein $$i_{1,8,l} \in \left\{ 0, 1, \ldots, 2M_v \sum_{r=1}^{Z} L_{\sigma_r} - 1 \right\}$$

and is obtained as:

$$i_{1,8,l} = f_l^* \sum_{r=1}^{Z} K_{1,r} + I_l^*$$

where $$I_l^* \in \left\{ 0, 1, \ldots, \sum_{r=1}^{z} K_{1,r} - 1 \right\}$$

and is given by $$I_l^* \in \sum_{r=1}^{r_l^*-1} K_{1,r} - i_l^*$$

and $K_{1,r}=2L_r$, and $$i_l^* \in \{0, \ldots, 2L_{r_l^*} - 1\}, f_l^* \in \{0, 1, \ldots, M_v - 1\}, \text{ and } r_l^* \in \{1, \ldots, Z\}.$$

6. The UE of claim 1, wherein, when codebookType=type-II-CJT-r18, the processor is further configured to, for each layer l:

remap indices of second vectors $$n_{3,l}^{(f)},$$

where f=0, . . . , $M_v$−1, with respect to $$n_{3,l}^{(f_l^*)}$$

as $$n_{3,l}^{(f)} = \left( n_{3,l}^{(f)} - n_{3,l}^{(f_l^*)} \right)$$

mod $N_3$, such that $$n_{3,l}^{(f)} = 0,$$

after remapping, and remap each index f with respect to $$f_l^*$$

as $$f = (f - f_l^*) \bmod M_v,$$

such that $$f_l^* = 0,$$

after remapping.

7. The UE of claim 1, wherein:

the configuration includes a parameter codebookMode, and when codebookMode=mode1:

the processor is further configured to determine a second vector offset $O_r$ for each NZP CSI-RS resource such that $O_1=0$, and $O_r \in \{0, 1, \ldots, N_3-1\}$ for r=2, . . . , Z, and the transceiver is further configured to transmit the CSI report including an indicator indicating a value of $O_r$ for each $r \in \{2, \ldots, Z\}$.

8. The UE of claim 1, wherein:

when codebookType=type-II-CJT-r18, the first vectors comprise discrete Fourier transform (DFT) vectors, when codebookType=type-II-PortSelection-CJT-r18, the first vectors comprise port selection vectors, the second vectors comprise DFT vectors with indices belonging to a window of indices given by $\mathrm{mod}(M_{init}+n, N_3)$, where n=0, 1, . . . , W−1, and $W < N_3$, when codebookType=type-II-CJT-r18, the CSI report include an indicator indicating a value of $M_{init}$, and when codebookType=type-II-PortSelection-CJT-r18, $M_{init}=0$.

9. A base station (BS) in a $3^{rd}$ generation partnership project (3GPP) communication system, the BS comprising:

a processor; and a transceiver operably coupled to the processor, the transceiver configured to:

transmit a configuration about a channel state information (CSI) report, the configuration including information about (i) $N_{TRP}$ non-zero power (NZP) CSI-reference signal (RS) resources, where $N_{TRP} \geq 1$, and (ii) a parameter codebookType set to type-II-CJT-r18 or type-II-PortSelection-CJT-r18, where TRP is an abbreviation of transmit and receive point and CJT is an abbreviation of a coherent joint transmission; and receive the CSI report including, for each layer l=1, . . . , v, a $P_l$ bits for an indicator $i_{1,8,l}$, wherein the indicator $i_{1,8,l}$ is for indicating a strongest coefficient among $$K_l^{NZ}$$

coefficients, where $$K_l^{NZ}$$

is a total number of non-zero coefficients that are associated with Z NZP CSI-RS resources, and $Z \leq N_{TRP}$, wherein:

when codebookType=type-II-CJT-r18, a value of $P_l$ depends on:

a value of $$K_l^{NZ},$$

when v=1, and a value of $$\sum_{r=1}^{Z} L_{\sigma_r},$$

when 1<v≤4, and when codebookType=type-II-PortSelection-CJT-r18, the value of $P_l$ depends on a value of $$2M_v \sum_{r=1}^{Z} L_{\sigma_r},$$

for all values of v, and wherein v is a rank $L_{\sigma_r}$ is a number of first vectors associated an r-th NZP CSI-RS resource from the Z NZP CSI-RS resources, where r=1, . . . , Z, $M_v$ is a number of second vectors.

10. The BS of claim 9, wherein, when codebookType=type-II-CJT-r18:

$$P_l = P_1 = \lceil \log_2(K_1^{NZ}) \rceil$$

when v=1, and $$P_l = \left\lceil \log_2\left(2 \sum_{r=1}^{Z} L_{\sigma_r}\right) \right\rceil$$

when 1<v≤4.

11. The BS of claim 10, wherein $$i_{1,8,l} \in \left\{ 0, 1, \ldots, 2\sum_{r=1}^{Z} L_{\sigma_r} - 1 \right\}$$

and is obtained as:

$$i_{1,8,l} = \begin{cases} \sum_{I=0}^{I_l^*} \kappa_{1,I,0}^{(3)} - 1 & v = 1 \\ I_l^* & 1 < v \leq 4 \end{cases}$$

where:

$$\kappa_{1,I,0}^{(3)} = k_{1,i,0,r}^{(3)},$$

and I is an index given by $$I = 2\sum_{k=1}^{r-1} L_{\sigma_k} + i,$$

$$k_{i,i,f,r}^{(3)} = 0 \text{ or } 1$$

to indicate a coefficient with an index (i, f, r) being zero or non-zero, respectively, $$I_l^* \in \left\{ 0, 1, \ldots, 2\sum_{r=1}^{Z} L_{\sigma_r} - 1 \right\}$$

and is given by $$I_l^* = 2\sum_{k=1}^{r_l^*-1} L_{\sigma_k} + i_l^*,$$

and $$i_l^* \in \{0, \ldots, 2L_{r_l^*} - 1\}, \text{ and } r_l^* \in \{1, \ldots, Z\}.$$

12. The BS of claim 9, wherein, when codebookType=type-II-PortSelection-CJT-r18, $$P_l = \left\lceil \log_2\left(M_v \sum_{r=1}^{Z} K_{1,r}\right)\right\rceil.$$

13. The BS of claim 12, wherein $$i_{1,8,l} \in \left\{0, 1, \ldots, 2M_v \sum_{r=1}^{Z} L_{\sigma_r} - 1\right\}$$

and is obtained as:

$$i_{1,8,l} = f_l^* \sum_{r=1}^{Z} K_{1,r} + I_l^*$$

where $$I_l^* \in \left\{0, 1, \ldots, \sum_{r=1}^{Z} K_{1,r} - 1\right\}$$

and is given by $$I_l^* = \sum_{r=1}^{r_l^*-1} K_{1,r} + i_l^*$$

and $K_{1,r}=2L_r$, and $$i_l^* \in \{0, \ldots, 2L_{r_l^*} - 1\}, f_l^* \in \{0, 1, \ldots, M_v - 1\}, \text{ and } r_l^* \in \{1, \ldots, Z\}.$$

14. The BS of claim 9, wherein, when codebookType=type-II-CJT-r18, for each layer l:

indices of second vectors $$n_{3,l}^{(f)},$$

where f=0, . . . , $M_v$–1, are remapped with respect to $$n_{3,l}^{(f_l^*)}$$

as $$n_{3,l}^{(f)} = \left(n_{3,l}^{(f)} - n_{3,l}^{(f_l^*)}\right)$$

mod $N_3$, such that $$n_{3,l}^{(f_l^*)} = 0,$$

after remapping, and
each index f is remapped with respect to $$f_l^*$$

as $$f = (f - f_l^*)$$

mod $M_v$, such that $$f_l^* = 0,$$

after remapping.

15. The BS of claim 9, wherein:
the configuration includes a parameter codebookMode, and
when codebookMode=mode1, the transceiver is further configured to receive the CSI report including an indicator indicating a value of a second vector offset $O_r$ for each NZP CSI-RS resource such that $O_1$=0, and $O_r \in \{0, 1, \ldots, N_3-1\}$ for r=2, . . . , Z.

16. The BS of claim 9, wherein:
when codebookType=type-II-CJT-r18, the first vectors comprise discrete Fourier transform (DFT) vectors,
when codebookType=type-II-PortSelection-CJT-r18, the first vectors comprise port selection vectors,
the second vectors comprise DFT vectors with indices belonging to a window of indices given by mod($M_{init}$+ n, $N_3$), where n=0, 1, . . . , W–1, and W<$N_3$,
when codebookType=type-II-CJT-r18, the CSI report includes an indicator indicating a value of $M_{init}$, and
when codebookType=type-II-PortSelection-CJT-r18, $M_{init}$=0.

17. A method performed by a user equipment (UE) in a 3$^{rd}$ generation partnership project (3GPP) communication system, the method comprising:
receiving a configuration about a channel state information (CSI) report, the configuration including information about (i) $N_{TRP}$ non-zero power (NZP) CSI-reference signal (RS) resources, where $N_{TRP} \geq 1$, and (ii) a parameter codebookType set to type-II-CJT-r18 or type-II-PortSelection-CJT-r18, where TRP is an abbreviation of transmit and receive point and CJT is an abbreviation of a coherent joint transmission;
determining, based on the configuration, for each layer l=1, . . . , v:
an indicator $i_{1,8,l}$ for indicating a strongest coefficient among $$K_l^{NZ}$$

coefficients, where $$K_l^{NZ}$$

is a total number of non-zero coefficients that are associated with Z NZP CSI-RS resources, and $Z \leq N_{TRP}$, transmitting the CSI report including, for each layer $l=1, \ldots, v$, $P_l$ bits for the indicator $i_{1,8,l}$, wherein:

when codebookType=type-II-CJT-r18, a value of $P_l$ depends on:

a value of $$K_l^{NZ},$$

when v=1, and
a value of $$\sum_{r=1}^{Z} L_{\sigma_r},$$

when $1 < v \leq 4$, and
when codebookType=type-II-PortSelection-CJT-r18, the value of $P_l$ depends on a value of $$2M_v \sum_{r=1}^{Z} L_{\sigma_r}$$

for all values of v, and wherein v is a rank, $L_{\sigma_r}$ is a number of first vectors associated with an r-th NZP CSI-RS resource from the Z NZP CSI-RS resources, where $r=1, \ldots, Z$, $M_v$ is a number of second vectors.

18. The method of claim 17, wherein, when codebookType=type-II-CJT-r18:

$$P_l = P_1 = \left\lceil \log_2 K_1^{NZ} \right\rceil$$

when $v=1$, and $$P_l = \left\lceil \log_2 \left( 2 \sum_{r=1}^{Z} L_{\sigma_r} \right) \right\rceil$$

when $1 < v \leq 4$.

19. The method of claim 18, wherein $$I = 2 \sum_{k=1}^{r-1} L_{\sigma_k} + i$$

and is obtained as:

$$i_{1,8,l} = \begin{cases} \sum_{l=0}^{I_1^*} \kappa_{1,l,0}^{(3)} - 1 & v = 1 \\ I_l^* & 1 < v \leq 4 \end{cases}$$

where:

$$\kappa_{1,l,0}^{(3)} = k_{1,i,0,r}^{(3)},$$

and I is an index given by $$I = 2 \sum_{k=1}^{r-1} L_{\sigma_k} + i,$$

$$k_{l,i,f,r}^{(3)} = 0$$

or 1 to indicate a coefficient with an index (i, f, r) being zero or non-zero, respectively, $$I_l^* \in \left\{ 0, 1, \ldots, 2 \sum_{r=1}^{Z} L_{\sigma_r} - 1 \right\}$$

and is given by $$I_l^* = 2 \sum_{k=1}^{r_l^* - 1} L_{\sigma_k} + i_l^*,$$

and $$i_l^* \in \left\{ 0, \ldots, 2L_{r_l^*} - 1 \right\}, \text{ and } r_l^* \in \{1, \ldots, Z\}.$$

20. The method of claim 17, wherein, when codebookType=type-II-PortSelection-CJT-r18, $$P_l = \left\lceil \log_2 \left( M_v \sum_{r=1}^{Z} K_{1,r} \right) \right\rceil.$$

* * * * *